United States Patent
Kume et al.

(10) Patent No.: US 12,030,514 B2
(45) Date of Patent: Jul. 9, 2024

(54) PRESENTATION CONTROL DEVICE AND NON-TRANSITORY COMPUTER READABLE STORAGE MEDIUM

(71) Applicant: DENSO CORPORATION, Kariya (JP)

(72) Inventors: Takuya Kume, Kariya (JP); Yuuta Matsumoto, Kariya (JP); Kunihiko Chiba, Kariya (JP); Kazuki Kojima, Kariya (JP); Shiori Maneyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 123 days.

(21) Appl. No.: 17/946,511

(22) Filed: Sep. 16, 2022

(65) Prior Publication Data
US 2023/0013492 A1    Jan. 19, 2023

Related U.S. Application Data

(63) Continuation of application No. PCT/JP2021/010653, filed on Mar. 16, 2021.

(30) Foreign Application Priority Data

Mar. 31, 2020   (JP) ................................ 2020-062631
Feb. 12, 2021   (JP) ................................ 2021-021023

(51) Int. Cl.
*B60W 50/14*    (2020.01)
*B60K 35/00*    (2024.01)
(Continued)

(52) U.S. Cl.
CPC ............. *B60W 50/14* (2013.01); *B60K 35/00* (2013.01); *B60W 60/0051* (2020.02); *B60W 60/0057* (2020.02); *B60W 60/0059* (2020.02); *B60K 35/28* (2024.01); *B60K 35/29* (2024.01); *B60K 2360/172* (2024.01); *B60K 2360/191* (2024.01); *B60W 2050/146* (2013.01)

(58) Field of Classification Search
None
See application file for complete search history.

(56) References Cited

U.S. PATENT DOCUMENTS

2018/0046185 A1    2/2018  Sato et al.
2019/0039618 A1    2/2019  Mori

FOREIGN PATENT DOCUMENTS

JP    2005324661 A    11/2005
JP    2017107502 A    6/2017
(Continued)

*Primary Examiner* — Thomas S McCormack
(74) *Attorney, Agent, or Firm* — Harness, Dickey & Pierce, P.L.C.

(57) ABSTRACT

When transitioning from both prohibition state that prohibit a specific action and a hand release during an execution of the autonomous driving to a specific action permission state that permits a driver to execute a specific action other than a driving operation, a presentation control device presents information indicating that the transition is allowable prior to information indicating that the transition is executed. When transitioning from a hand release permission state that prohibits the specific action and permits hand release from a steering wheel to the specific action permission state, the presentation control device presents the information indicating that the transition is allowable and the information indicating that the transition is executed at a same time.

26 Claims, 36 Drawing Sheets

(51) Int. Cl.
*B60K 35/28* (2024.01)
*B60K 35/29* (2024.01)
*B60W 60/00* (2020.01)

(56) References Cited

FOREIGN PATENT DOCUMENTS

| | | |
|---|---|---|
| JP | 2018027726 A | 2/2018 |
| WO | WO-2017154396 A1 | 9/2017 |

PRESENTATION CONTROL DEVICE AND NON-TRANSITORY COMPUTER READABLE STORAGE MEDIUM

CROSS REFERENCE TO RELATED APPLICATIONS

The present application is a continuation application of International Patent Application No. PCT/JP2021/010653 filed on Mar. 16, 2021, which designated the U.S. and claims the benefit of priority from Japanese Patent Applications No. 2020-062631 filed on Mar. 31, 2020 and No. 2021-021023 filed on Feb. 12, 2021. The entire disclosures of all of the above applications are incorporated herein by reference.

TECHNICAL FIELD

The disclosure herein relates to techniques for controlling the presentation of information to drivers of vehicles capable of performing autonomous driving.

BACKGROUND

A conceivable technique teaches a technique for switching from a manual driving operation to an autonomous driving operation.

SUMMARY

According to an example, when transitioning from both prohibition state that prohibit a specific action and a hand release during an execution of the autonomous driving to a specific action permission state that permits a driver to execute a specific action other than a driving operation, a presentation control device presents information indicating that the transition is allowable prior to information indicating that the transition is executed. When transitioning from a hand release permission state that prohibits the specific action and permits hand release from a steering wheel to the specific action permission state, the presentation control device presents the information indicating that the transition is allowable and the information indicating that the transition is executed at a same time.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
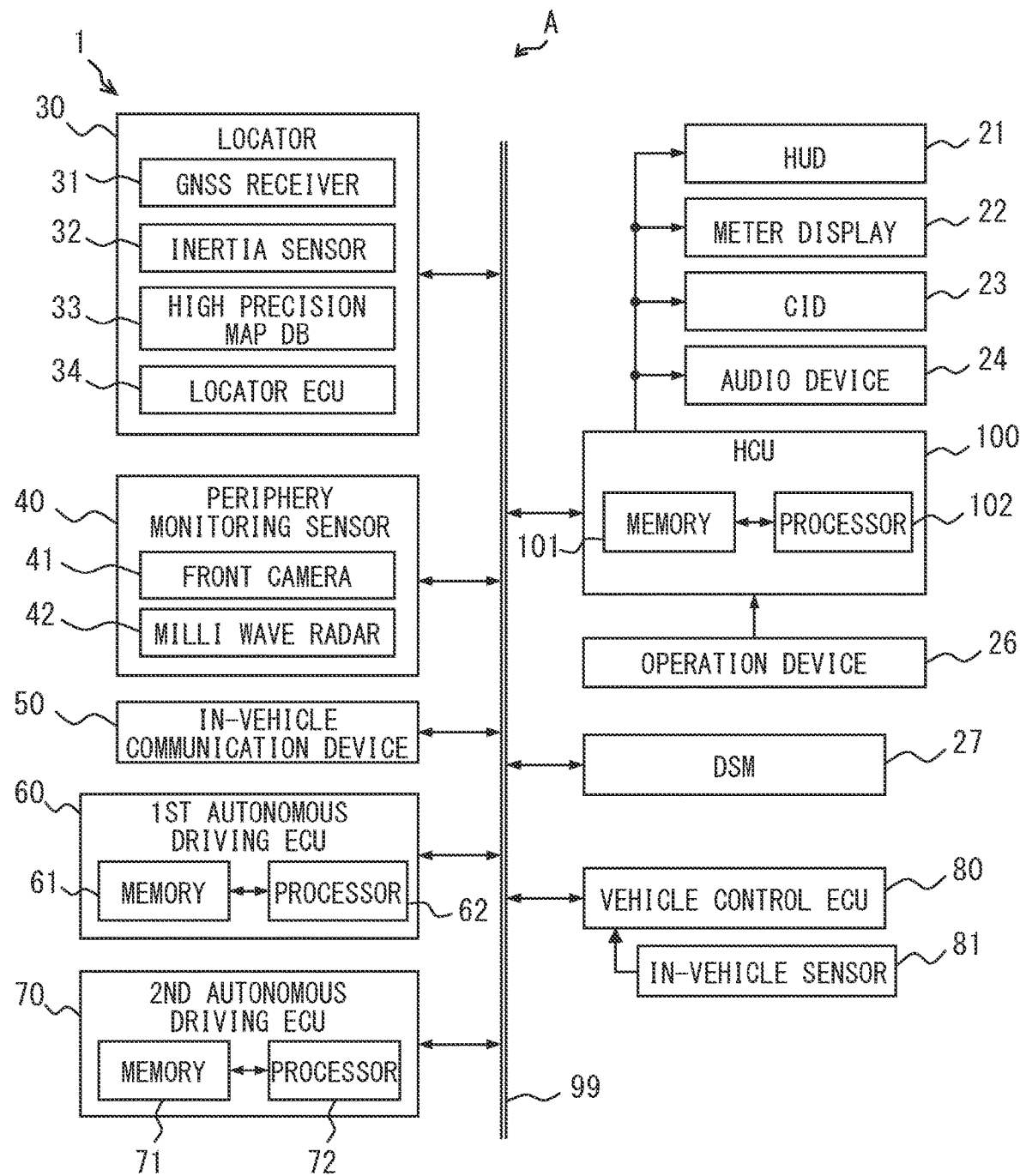
FIG. 1 is a diagram showing a system including an HCU.

Here, depending on the control content of autonomous driving, there is a possibility that a situation occurs in which a driver is permitted to perform a specific action other than a driving operation, for example, which is defined as a second task, and a situation occurs in which the driver is prohibited from performing the specific action. It is not described in a conceivable technique to present highly convenient information according to the transition of such a situation.

Present embodiments provide a presentation control device, a non-transitory computer readable storage medium and a presentation control program capable of presenting highly convenient information.

One of the described presentation control devices is a presentation control device that controls the presentation of information to the driver of a vehicle capable of performing autonomous driving.

The presentation control device includes:
a determination unit that identifies a specific action permission state that allows the driver to perform a specific action other than a driving operation during autonomous driving, a hand-release permission state that prohibits the specific action and permits hand release from the steering wheel during autonomous driving, and a both prohibition state that prohibits both the specific action and the hand release during autonomous driving, determines whether a transition is allowable between each state, and determines an execution of the transition; and a presentation control unit that presents both prohibition transition allowable information indicating that the transition from the both prohibition state to the specific action permission state is allowable, both prohibition transition execution information indicating that the transition from the both prohibition state to the specific action permission state is executed, hand release transition allowable information indicating that the transition from the hand release permission state to the specific action permission state is allowable, and hand release transition execution information indicating that the transition from the hand release permission state to the specific action permission state is executed.

When executing the transition from the both prohibition state to the specific action permission state, the presentation control unit presents the both prohibition transition allowable information prior to the both prohibition transition execution information. When executing the transition from the hand release permission state to the specific action permission state, the presentation control unit presents the hand release transition allowable information and the hand release transition execution information at the same time.

One of the described presentation control programs is a presentation control program that includes instructions stored in a storage medium and executed by a processor in order to control the presentation of information to a driver of a vehicle capable of performing autonomous driving.

The instructions include:
a determination process for identifying a specific action permission state that allows the driver to perform a specific action other than a driving operation during autonomous driving, a hand-release permission state that prohibits the specific action and permits hand release from the steering wheel during autonomous driving, and a both prohibition state that prohibits both the specific action and the hand release during autonomous driving, determining whether a transition is allowable between each state, and determining an execution of the transition; and a presentation control process for presenting both prohibition transition allowable information indicating that the transition from the both prohibition state to the specific action permission state is allowable, both prohibition transition execution information indicating that the transition from the both prohibition state to the specific action permission state is executed, hand release transition allowable information indicating that the transition from the hand release permission state to the specific action permission state is allowable, and hand release transition execution information indicating that the transition from the hand release permission state to the specific action permission state is executed.

When executing the transition from the both prohibition state to the specific action permission state, the presentation control process provides to present the both prohibition transition allowable information prior to the both prohibition transition execution information. When executing the transition from the hand release permission state to the specific action permission state, the presentation control process provides to present the hand release transition allowable information and the hand release transition execution information at the same time.

According to these descriptions, when a transition is made from the both prohibition state to a specific action permission state, the both prohibition transition allowable information is presented prior to the both prohibition transition execution information. When a transition is made from the hand release permission state to the specific action permission state, both the hand release transition allowable information and the hand release transition execution information are presented at the same time. Therefore, in the case of a transition from the hand release permission state to the specific action permission state, which is highly likely to have released the hand in advance, the driver can recognize the hand release transition allowable information and the hand release transition execution information at the same time. As described above, a presentation control device and a presentation control program capable of presenting highly convenient information can be provided.

One of the described presentation control devices is a presentation control device that controls the presentation of information to the driver of a vehicle capable of performing autonomous driving.

The presentation control device includes:
a determination unit that identifies a specific action permission state that allows the driver to perform a specific action other than a driving operation during autonomous driving, a hand-release permission state that prohibits the specific action and permits hand release from the steering wheel during autonomous driving, a both prohibition state that prohibits both the specific action and the hand release during autonomous driving, determines whether a transition is allowable between each state, and determines an execution of the transition, and an autonomous driving prohibition state that prohibits an execution of the autonomous driving operation; and a presentation control unit that presents manual driving transition allowable information indicating that the transition from the autonomous driving prohibition state to the specific action permission state is allowable, manual driving transition execution information indicating that the transition from the autonomous driving prohibition state to the specific action permission state is executed, hand release transition allowable information indicating that the transition from the hand release permission state to the specific action permission state is allowable, and hand release transition execution information indicating that the transition from the hand release permission state to the specific action permission state is executed.

When executing the transition from the autonomous driving prohibition state to the specific action permission state, the presentation control unit presents the manual driving transition allowable information prior to the manual driving transition execution information. When executing the transition from the hand release permission state to the specific action permission state, the presentation control unit presents the hand release transition allowable information and the hand release transition execution information at the same time.

One of the described presentation control programs is a presentation control program that includes instructions stored in a storage medium and executed by a processor in order to control the presentation of information to a driver of a vehicle capable of performing autonomous driving.

The instructions include:
  a determination process for identifying a specific action permission state that allows the driver to perform a specific action other than a driving operation during autonomous driving, a hand-release permission state that prohibits the specific action and permits hand release from the steering wheel during autonomous driving, a both prohibition state that prohibits both the specific action and the hand release during autonomous driving, determining whether a transition is allowable between each state, and determining an execution of the transition, and an autonomous driving prohibition state that prohibits an execution of the autonomous driving operation; and
  a presentation control process for presenting manual driving transition allowable information indicating that the transition from the autonomous driving prohibition state to the specific action permission state is allowable, manual driving transition execution information indicating that the transition from the autonomous driving prohibition state to the specific action permission state is executed, hand release transition allowable information indicating that the transition from the hand release permission state to the specific action permission state is allowable, and hand release transition execution information indicating that the transition from the hand release permission state to the specific action permission state is executed.

When executing the transition from the autonomous driving prohibition state to the specific action permission state, the presentation control process provides to present the manual driving transition allowable information prior to the manual driving transition execution information. When executing the transition from the hand release permission state to the specific action permission state, the presentation control process provides to present the hand release transition allowable information and the hand release transition execution information at the same time.

According to these descriptions, when a transition is made from the autonomous driving prohibition state to a specific action permission state, the autonomous driving prohibition transition allowable information is presented prior to the autonomous driving prohibition transition execution information. When a transition is made from the hand release permission state to the specific action permission state, both the hand release transition allowable information and the hand release transition execution information are presented at the same time. Therefore, in the case of a transition from the hand release permission state to the specific action permission state, which is highly likely to have released the hand in advance, the driver can recognize the hand release transition allowable information and the hand release transition execution information at the same time. As described above, a presentation control device and a presentation control program capable of presenting highly convenient information can be provided.

One of the described presentation control devices is a presentation control device that controls the presentation of information to the driver of a vehicle capable of performing autonomous driving.

The presentation control device includes:
  a determination unit that determines whether it is in a state in which a driver of the vehicle is ready for a specific action permission state that permits the driver to perform a specific action other than a driving operation during an execution of autonomous driving, and the driver has executed an operation that permits a transition to the specific action permission state; and
  a presentation control unit that presents transition allowable information indicating that a transition from a specific action prohibition state to a specific action permission state is allowable, and transition execution information indicating the execution of a transition from the specific action prohibition state to the specific action permission state.

When the determination unit determines at least one of the state not ready for the specific action permission state and the state of the operation not executed, the presentation control unit presents the transition allowable information prior to the transition execution information. When the determination unit determines both the state ready for the specific action permission state and the state of the operation executed, the presentation control unit presents the transition allowable information and the transition execution information at the same time.

One of the described presentation control programs is a presentation control program that includes instructions stored in a storage medium and executed by a processor in order to control the presentation of information to a driver of a vehicle capable of performing autonomous driving.

The instructions include:
  a determination process for determining whether it is in a state in which a driver of the vehicle is ready for a specific action permission state that permits the driver to perform a specific action other than a driving operation during an execution of autonomous driving, and the driver has executed an operation that permits a transition to the specific action permission state; and
  a presentation control process for presenting transition allowable information indicating that a transition from a specific action prohibition state to a specific action permission state is allowable, and transition execution information indicating the execution of a transition from the specific action prohibition state to the specific action permission state.

When determining at least one of the state not ready for the specific action permission state and the state of the operation not executed, the presentation control process provides to present the transition allowable information prior to the transition execution information. When determining both the state ready for the specific action permission state and the state of the operation executed, the presentation control process provides to present the transition allowable information and the transition execution information at the same time.

According to these descriptions, when it is determined that the driver is ready for the specific action permission state and the driver has executed the operation for permitting the transition to the specific action permission state, the transition allowable information and the transition execution information are presented at the same time. Therefore, the transition execution information can be recognized by the driver together with the transition allowable information in a situation where the transition to the specific action permission state can be performed immediately. Therefore, it may be possible to present highly convenient information.

First Embodiment

A presentation control device according to a first embodiment will be described with reference to FIGS. 1 to 24. The presentation control device of the first embodiment is provided by an HCU (Human Machine Interface Control Unit) 100 mounted on the vehicle A. The HCU 100 comprises an HMI (Human Machine Interface) system used in a vehicle A together with a plurality of display devices, an audio device 24, an operation device 26, and the like. The HMI system has an input interface function that accepts an operation made by an occupant (for example, a driver) of the vehicle A, and an output interface function that presents information to the driver. The HCU 100 is connected to the locator 30, the periphery monitoring sensor 40, the in-vehicle communication device 50, the first autonomous driving ECU 60, the second autonomous driving ECU 70, the DSM27, and the vehicle control ECU 80 via a communication bus 99 or the like.

The locator 30 generates position information of the vehicle by a complex positioning method that combines multiple types and pieces of acquired information. The locator 30 includes a GNSS (Global Navigation Satellite System) receiver 31, an inertia sensor 32, and a map database (hereinafter, map DB) 33, and a locator ECU 34. The GNSS receiver 31 receives positioning signals from multiple positioning satellites. The inertial sensor 32 is a sensor that detects the inertial force acting on the vehicle A. The inertia sensor 32 includes a gyro sensor and an acceleration sensor, for example.

The map DB 33 is a nonvolatile memory, and stores map data such as link data, node data, road shape, structures and the like. The map data may include a three-dimensional map including feature points of road shapes and buildings. The three-dimensional map may be generated by REM (Road Experience Management) based on captured images. Further, the map data may include traffic regulation information, road construction information, meteorological information, signal information and the like. The map data stored in the map DB updates regularly or at any time based on the latest information received by the in-vehicle communication device 50.

The locator ECU 34 mainly includes a microcomputer equipped with a processor, a memory, an input/output interface, and a bus connecting these elements. The locator ECU 34 combines the positioning signals received by the GNSS receiver 31, the map data of the map DB 33, and the measurement results of the inertia sensors 32 to sequentially detect the vehicle position (hereinafter, subject vehicle position) of the vehicle A. The vehicle position may include, for example, coordinates of latitude and longitude. The vehicle position may be measured using a travel distance obtained from signals sequentially output from the vehicle speed sensor mounted on the vehicle A. When a three-dimensional map provided by a road shape and a point group of feature points of a structure is used as map data, the locator ECU 34 may specify the position of the own vehicle by using the three-dimensional map and the detection results of the periphery monitoring sensor 40 without using the GNSS receiver 31.

The periphery monitoring sensor 40 is an autonomous sensor that monitors a periphery environment of the vehicle A. The periphery monitoring sensor 40 can detect moving objects and stationary objects in a detection range around the subject vehicle A. For example, the moving objects may include pedestrians, cyclists, non-human animals, and other vehicles, and the stationary objects may include falling objects on the road, guardrails, curbs, road markings, lane markings, structures beside the road. The periphery monitoring sensor 40 provides the detection information of detecting an object around the vehicle A to the first autonomous driving ECU 60, the second autonomous driving ECU 70, and the like through the communication bus 99.

The periphery monitoring sensor 40 includes a front camera 41, one or more millimeter wave radars 42, and the like as detection configurations for object detection. The front camera 41 outputs, as detection information, at least one of image data obtained by photographing a front range of the vehicle A or an analysis result of the image data. The multiple millimeter wave radars 42 are arranged, for example, on front and rear bumpers of the vehicle A at intervals from one another. The millimeter wave radars 42 emit millimeter waves or quasi-millimeter waves toward the front range, a front side range, a rear range, and a rear side range of the vehicle A. Each millimeter wave radar 42 generates detection information by a process of receiving millimeter waves reflected by moving objects, stationary objects, or the like. The periphery monitoring sensor 40 may include other detection configurations such as LiDAR (Light Detection and Ranging/Laser Imaging Detection and Ranging) that detects a point group of feature points of a construction, and a sonar that receives reflected waves of ultrasonic waves.

The in-vehicle communication device 50 is a communication module mounted on the vehicle A. The in-vehicle communication device 50 has at least a V2N (Vehicle to cellular Network) communication function in line with communication standards such as LTE (Long Term Evolution) and 5G, and sends and receives radio waves to and from base stations around the vehicle A. The in-vehicle communication device 50 may further have functions such as road-to-vehicle (Vehicle to roadside Infrastructure, hereinafter "V2I") communication and inter-vehicle (Vehicle to Vehicle, hereinafter "V2V") communication. The in-vehicle communication device 50 enables cooperation between a cloud system and an in-vehicle system (Cloud to Car) by V2N communication. By mounting the in-vehicle communication device 50, the vehicle A as a connected car is able to connect to the Internet. The in-vehicle communication device 50 acquires the traffic congestion information distributed from the traffic information center or the like and provides it to the second autonomous driving ECU 70, the HCU 100, or the like.

The first autonomous driving ECU 60 and the second autonomous driving ECU 70 are configured to mainly include a computer including a processor 62, 72, a memory 61, 71, an input/output interface, and a bus connecting them, respectively. The first autonomous driving ECU 60 and the second autonomous driving ECU 70 are ECUs capable of executing autonomous driving control that partially or substantially completely controls the traveling of the vehicle A.

The first autonomous driving ECU 60 has a partially autonomous driving function that partially substitutes for the driving operation of the driver. The second autonomous driving ECU 70 has an autonomous driving function capable of substituting for a driver's driving operation. For example, the first autonomous driving ECU 60 enables partial automated driving control (advanced driving assistance) of the level 2 or lower in the autonomous driving level specified by US Society of Automotive Engineers. That is, the first autonomous driving ECU 60 makes it possible to carry out autonomous driving control in which peripheral monitoring is required for the driver. In other words, the first autonomous operation ECU 60 enables autonomous driving operation in which the second task described later is prohibited.

For example, the first autonomous driving ECU 60 can execute one or both of the longitudinal control and the lateral control of the vehicle A. Here, the longitudinal direction is a direction that coincides with the front-rear direction of the vehicle A, and the lateral direction is a direction that coincides with the width direction of the vehicle A. The first autonomous driving ECU 60 executes acceleration and deceleration control of the vehicle A as longitudinal control. Further, the first autonomous driving ECU 60 executes the steering angle control of the steering wheel of the vehicle A as the lateral control.

Figure 2:
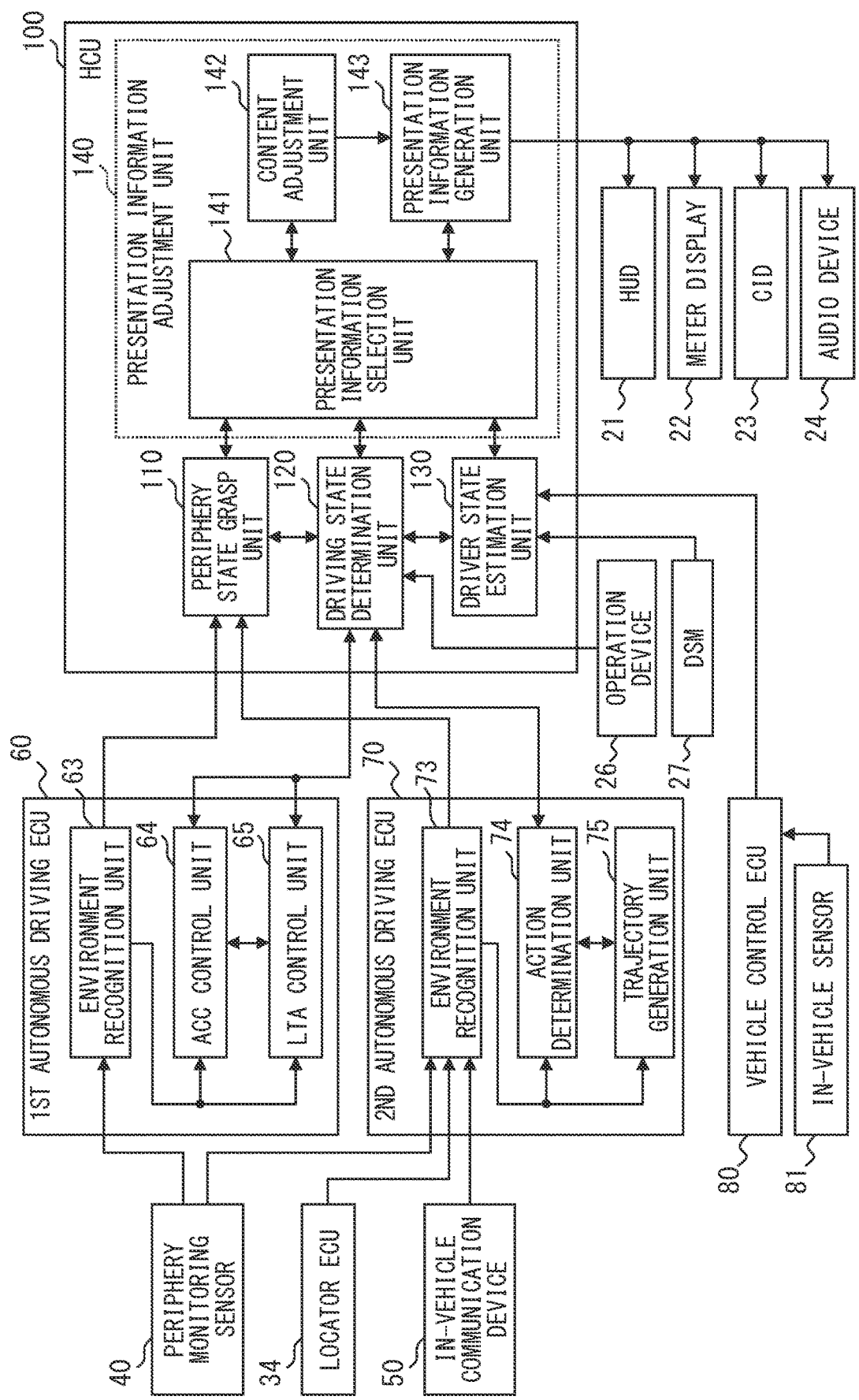
FIG. 2 is a block diagram showing an example of a function executed by the HCU.
Figure 3:
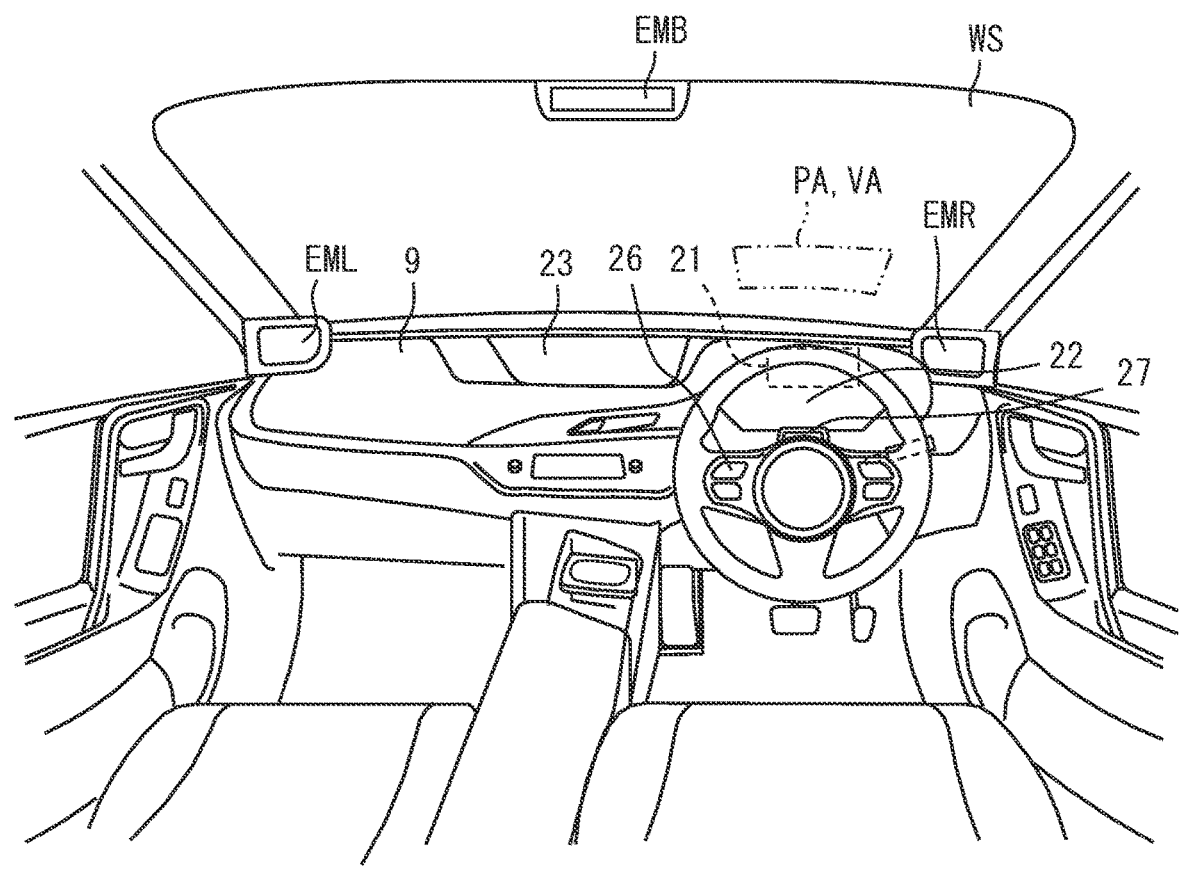
FIG. 3 is a diagram showing a vehicle interior.

The first autonomous driving ECU 60 establishes a plurality of functional units that realize the above-mentioned advanced driving support by causing the processor 62 to execute a plurality of instructions according to the driving support program stored in the memory 61. Specifically, as shown in FIG. 2, the first autonomous driving ECU 60 provides an environment recognition unit 63, an ACC control unit 64, an LTA control unit 65, and the like as functional units.

The environment recognition unit 63 recognizes a traveling environment around the vehicle A based on the detection information acquired from the periphery monitoring sensor 40. The environment recognition unit 63 provides the analysis result of the detection information carried out for the driving environment recognition to the ACC control unit 64 and the LTA control unit 65 as the analyzed detection information. As an example, the environment recognition unit 63 generates information (lane information) indicating the relative position and shape of the left and right lane markings or roadsides of the lane in which the vehicle A is currently traveling (hereinafter referred to as the current lane) as the analyzed detection information. In addition, the environment recognition unit 63 generates information (preceding vehicle information) indicating the presence or absence of a preceding vehicle in the current lane and the position and speed of the preceding vehicle when there is a preceding vehicle as the analyzed detection information. The environment recognition unit 63 sequentially provides the preceding vehicle information to the ACC control unit 64, and sequentially provides the lane information to the LTA control unit 65. The environment recognition unit 63 may be configured to recognize the MD area, the AD area, the ST section, and the non-ST section, which will be described later.

Based on the preceding vehicle information, the ACC control unit 64 executes ACC (Adaptive Cruise Control) control that realizes constant speed traveling of the vehicle A at a target speed or traveling following the preceding vehicle. The LTA control unit 65 executes LTA (Lane Tracing Assist) control for maintaining the vehicle A in the lane based on the lane information. Specifically, the control units 64 and 65 generate an acceleration and deceleration control instruction or a steering angle control instruction and sequentially provide them to the vehicle control ECU 80 described later. The ACC control is an example of longitudinal control, and the LTA control is an example of lateral control.

The first autonomous driving ECU 60 realizes level 2 autonomous driving operation by executing both the ACC control and the LTA control. The first autonomous driving ECU 60 may be capable of realizing level 1 autonomous driving operation by executing either the ACC control or the LTA control.

On the other hand, the second autonomous driving ECU 70 enables autonomous driving control of level 3 or higher in the above-mentioned autonomous driving level. That is, the second autonomous driving ECU 70 enables the autonomous driving operation in which the driver is allowed to interrupt the peripheral monitoring. In other words, the second autonomous driving ECU 70 makes it possible to perform automated driving in which the second task is permitted.

Here, the second task is an action other than a driving operation permitted to the driver, and is a predetermined specific action. In the automatic driving period in which the vehicle A is automatically driven by the level 3 autonomous driving function of the second autonomous driving ECU 70, the driver in this case is a person (an occupant) who will take over the control right of the driving operation from the autonomous driving system when leaving the restriction area or in an emergency case. The driver may be legally permitted to perform a second task until a request to perform a driving operation by the autonomous driving system, that is a request to switch the driving operation (i.e., Take Over Request), is made.

The second task may be referred to as a secondary activity, another activity, or the like. The second task must not prevent the driver from responding to the request to take over the driving operation from the autonomous driving system. As an example, viewing of contents such as videos, operation of smartphones, reading, and eating are assumed as second tasks.

The second autonomous driving ECU 70 establishes a plurality of functional units that realize the above-mentioned autonomous driving support by causing the processor 72 to execute a plurality of instructions according to the autonomous driving program stored in the memory 71. Specifically, the second autonomous driving ECU 70 provides an environment recognition unit 73, an action determination unit 74, a trajectory generation unit 75, and the like as functional units.

The environment recognition unit 73 recognizes the driving environment around the vehicle A based on the detection information acquired from the periphery monitoring sensor 40, the vehicle position and map data acquired from the locator ECU 34, the communication information acquired from the in-vehicle communication device 50, and the like. As an example, the environment recognition unit 73 recognizes the position of the current lane of the vehicle A, the shape of the current lane, the relative position and the relative speed of the moving body around the vehicle A, and the like. The environment recognition unit 73 sequentially provides the above recognition results to the action determination unit 74 and the trajectory generation unit 75.

In addition, the environment recognition unit 73 identifies the manual driving area (i.e., MD area) and the autonomous driving area (i.e., AD area) in the traveling area of the vehicle A, identifies the ST section and the non-ST section in the AD area, and sequentially outputs the recognition result to the HCU 100.

The MD area is an area where autonomous driving is prohibited. In other words, the MD area is an area where the driver performs all of the longitudinal control, lateral control and peripheral monitoring of the vehicle A. For example, the MD area is an area where the travel path is a general road.

The AD area is an area where autonomous driving is permitted. In other words, the AD area is an area in which the system of the vehicle A can substitute one or more of the longitudinal control, the lateral control and the peripheral monitoring. For example, the AD area is an area where the travelling path is a highway or a motorway.

The AD area is divided into a non-ST section capable of autonomous driving at level 2 or lower and an ST section capable of autonomous driving at level 3 or higher. In the first embodiment, it is assumed that the non-ST section where the level 1 autonomous driving operation is permitted and the non-ST section where the level 2 autonomous driving operation is permitted are equivalent.

The ST section is, for example, a traveling section (i.e., a traffic jam section) in which traffic jam occurs. Further, the ST section is, for example, a traveling section in which a high-precision map is prepared. The periphery state grasp unit 110 determines that the vehicle A is travelling in the ST section when the traveling speed of the vehicle A is within the threshold range for a predetermined period of time. Alternatively, the periphery state grasp unit 110 may determine whether or not the vehicle is running in the ST section by combining the position of the own vehicle and the traffic jam information acquired from the in-vehicle communication device 50. In addition to the traffic jam section, the periphery state grasp unit 110 may set a section in which a specific state other than the traffic jam is satisfied with respect to the surrounding environment of the vehicle A as an ST section.

The action determination unit 74 determines the future action scheduled for the vehicle A based on the recognition result of the traveling environment. Specifically, when the action determination unit 74 has acquired the instruction to start autonomous driving in collaboration with the HCU 100 described later, the type of behavior that the vehicle A should take in order to arrive at the destination is determined as the future action. The type includes, for example, going straight, turning right, turning left, changing lanes, and the like. Further, when the action determination unit 74 determines that it is necessary to transfer the driving control right to the driver, the action determination unit 74 generates a replacement request and provides it to the HCU 100.

The trajectory generation unit 75 generates a travel trajectory of the vehicle A in a section in which autonomous driving is executable, based on the recognition result of the travel environment and the determined future action. The travel trajectory includes, for example, a target position of the vehicle A according to the progress, a target speed at each target position, and the like. The trajectory generation unit 75 sequentially provides the generated travel trajectory to the vehicle control ECU 80 as a control command to be followed by the vehicle A in autonomous driving.

With the autonomous driving system including the above autonomous driving ECUs 60 and 70, at least level 2 and level 3 equivalent autonomous driving can be executed in the vehicle A. In the following, the state in which the autonomous driving operation equivalent to level 2 is being executed may be referred to as "level 2 execution mode", and the state in which the autonomous driving operation equivalent to level 3 is being executed may be referred to as "level 3 execution mode".

The vehicle control ECU 80 is an electronic control device that performs acceleration and deceleration control and steering control of the vehicle A. The vehicle control ECU 80 includes a steering ECU that performs steering control, a power unit control ECU and a brake ECU that perform acceleration and deceleration control, and the like. The vehicle control ECU 80 acquires detection signals output from respective sensors such as the steering angle sensor, the vehicle speed sensor, and the like mounted on the subject vehicle, and outputs a control signal to an electronic control throttle, a brake actuator, an EPS (Electronic Power Steering) motor, and the like. The vehicle control ECU 80 controls each driving control device so as to realize autonomous driving according to the control instruction by acquiring the control instruction of the vehicle A from the first autonomous driving ECU 60 or the second autonomous driving ECU 70.

Further, the vehicle control ECU 80 is connected to an in-vehicle sensor 81 that detects driving operation information of a driving element by a driver. The in-vehicle sensor 81 includes, for example, a pedal sensor that detects the amount of depression of the accelerator pedal, a steering sensor that detects the amount of steering of the steering wheel, and the like. The vehicle control ECU 80 sequentially provides the detected driving operation information to the HCU 100.

The DSM27 includes a near-infrared light source, a near-infrared camera, and a control unit for controlling the near-infrared light source and the near-infrared camera. The DSM 27 is installed, for example, on the upper surface of the steering wheel column portion or the upper surface of an instrument panel 9, so that the near-infrared camera faces the headrest portion of the driver's seat. The DSM 27 uses the near-infrared camera to capture the driver's face to which the near-infrared light is emitted from the near-infrared light source. The control unit performs an image analyzing process to the image captured by the near infrared light camera. The control unit extracts information such as the position of the driver's eye point and the line-of-sight direction from the captured image, and provides the extracted driver state information to the HCU 100 and the like via the communication bus 99.

Next, details of each of the plurality of display devices, the audio device 24, the operation device 26, and the HCU 100 included in the HMI system will be described.

The plurality of display devices include a head-up display (hereinafter, HUD) 21, a meter display 22, a center information display (hereinafter, CID) 23, and the like. The plurality of display devices may further include each display EMB, EML, EMR of the electronic mirror system. The HUD 21, the meter display 22, and the CID 23 are display devices that present image contents such as still images or moving images to the driver as visual information.

The HUD 21 projects the light of the image formed in front of the driver onto the projection area PA defined by the windshield WS or the like based on the control signal and the video data acquired from the HCU 100. The light of the image reflected on the vehicle interior side by the windshield WS is perceived by the driver sitting in the driver's seat. In this way, the HUD 21 displays a virtual image in the space in front of the projection area PA. The driver visually recognizes the virtual image in the angle of view VA displayed by the HUD 21 so as to overlap the foreground of the vehicle A.

The meter display 22 and the CID 23 mainly include, for example, a liquid crystal display or an OLED (Organic Light Emitting Diode) display. The meter display 22 and the CID 23 display various images on the display screen based on the control signal and the video data acquired from the HCU 100. The meter display 22 is installed, for example, in front of the driver's seat. The CID 23 is provided in the central region in the vehicle width direction in front of the driver. For example, the CID 23 is installed above the center cluster in the instrument panel 9. The CID 23 has a touch panel function, and detects, for example, a touch operation and a swipe operation on the display screen by a driver or the like. The CID23 is an example of a "central display".

The audio device 24 has a plurality of speakers installed in the vehicle interior. The audio device 24 presents a notification sound, a voice message, or the like as auditory information to the driver based on the control signal and voice data acquired from the HCU 100. That is, the audio device 24 is an information presentation device capable of presenting information in a mode different from visual information. Auditory information is an example of "information in a specific mode different from visual information".

The operation device 26 is an input unit that receives an operation of user, such as a driver or the like. For example, user operations related to the start and stop of each level of the autonomous driving function are input to the operation device 26. The operation device 26 includes, for example, a steering switch provided in the spoke portion of the steering wheel, an operation lever provided in the steering wheel column portion, a voice input device for recognizing the utterance content of the driver, and the like.

The HCU 100 controls the presentation of information to the driver based on the information from the first autonomous driving ECU 60, the second autonomous driving ECU 70, and the like described above. The HCU 100 mainly includes a computer including a processor 102, a memory 101, an input/output interface, a bus connecting these components, and the like. The processor 102 is a hardware for arithmetic processing. The processor 102 includes, as a core, at least one type of, for example, a CPU (Central Processing Unit), a GPU (Graphics Processing Unit), an RISC (Reduced Instruction Set Computer) CPU, and so on.

The memory 101 is at least one type of non-transitory tangible storage medium, such as a semiconductor memory, a magnetic storage medium, and an optical storage medium, for non-transitory storing or memorizing computer readable programs and data. The memory 101 stores various programs executed by the processor 102, such as a presentation control program described later.

The processor 102 executes a plurality of instructions included in the presentation control program stored in the memory 101. As a result, the HCU 100 provides a plurality of functional units for controlling the presentation to the driver. As described above, in the HCU 100, the presentation control program stored in the memory 101 causes the processor 102 to execute a plurality of instructions, thereby constructing a plurality of functional units. Specifically, as shown in FIG. 2, the HCU 100 provides functional units such as a periphery state grasp unit 110, a driving state determination unit 120, a driver state estimation unit 130, and a presentation information adjustment unit 140.

The periphery state grasp unit 110 acquires the recognition result of the traveling environment from the environment recognition unit 63 of the first autonomous driving ECU 60 or the environment recognition unit 73 of the second autonomous driving ECU 70. The periphery state grasp unit 110 grasps the peripheral state of the vehicle A based on the acquired recognition result. Specifically, the periphery state grasp unit 110 grasps the approach to the AD area, the approach to the AD area, the approach to the ST section, the approach to the ST section, and the like. The periphery state grasp unit 110 sequentially provides the grasped peripheral state information to the driving state determination unit 120. The periphery state grasp unit 110 may grasp the peripheral state based on the information directly acquired from the locator ECU 34, the peripheral monitoring sensor 40, and the like, instead of the recognition result acquired from each of the autonomous driving ECUs 60 and 70.

The driver state estimation unit 130 estimates the driver state based on the information from the DSM 27, the vehicle control ECU 80, and the like. For example, the driver state estimation unit 130 estimates whether or not the driver is involved in the driving operation of each body part as the driver state. Specifically, the driver state estimation unit 130 determines whether or not the driver's eye portion is performing peripheral monitoring based on the state information regarding the driver's line-of-sight direction acquired from the DSM 27. Further, the driver state estimation unit 130 determines whether or not the driver is holding the steering wheel by hand based on the steering amount acquired from the vehicle control ECU 80. In addition, the driver state estimation unit 130 determines whether or not the driver has put the driver's foot on the accelerator pedal based on the amount of depression of the accelerator pedal acquired from the vehicle control ECU 80.

In the following, the state in which the eye portion is monitoring the periphery may be referred to as an eye's on state, and the state in which the eye portion is not monitoring the periphery may be referred to as an eye's off state. Further, the state in which the steering wheel is gripped by hand may be referred to as a hands-on state, and the state in which the steering wheel is not gripped by hand may be referred to as a hands-off state. In addition, the state in which the foot is placed on the accelerator pedal may be referred to as a leg-on state, and the state in which the foot is not placed on the accelerator pedal may be referred to as a leg-off state. The driver state estimation unit 130 sequentially provides the estimated state of each body part to the drive state determination unit 120. The driver state estimation unit 130 may also determine whether or not the driver conditions described later are satisfied.

The drive state determination unit 120 determines the drive state related to the autonomous driving operation in collaboration with the second autonomous driving ECU 70 and the first autonomous driving ECU 60. Specifically, the drive state determination unit 120 determines the autonomous driving operation level permitted to the driver and the autonomous driving operation level actually executed as the drive state.

Based on the information from the periphery state grasp unit 110, the drive state determination unit 120 determines that the autonomous driving cannot be permitted when the vehicle A is traveling in the MD area. On the other hand, the drive state determination unit 120 determines that autonomous driving of level 2 or higher can be permitted when traveling in the AD area. The state of traveling in the AD area is an example of the "autonomous driving permission state". Further, the drive state determination unit 120 determines that level 2 autonomous driving can be permitted when traveling in a non-ST section of the AD area, and determines that the level 3 autonomous driving can be permitted when traveling in an ST section.

In the following, a state in which the level 2 autonomous driving is permitted may be referred to as a "level 2 permission state", and a state in which level 3 autonomous driving is permitted may be referred to as a "level 3 permission state". In addition, a state in which autonomous driving itself is prohibited may be referred to as an "autonomous driving prohibition state". Further, the autonomous driving level 0 to level 2 is an example of the "specific act prohibition state", and the level 3 permission state is an example of the "specific action permission state".

In addition, when the drive state determination unit 120 determines that the autonomous driving of the level 2 is permitted, the drive state determination unit 120 determines whether or not the hands-off is permitted at the level 2. Specifically, when the drive state determination unit 120 determines that the specific condition is satisfied based on the execution state of the LTA, the presence/absence of high-precision map data around the vehicle A, the lane state, the driver's peripheral monitoring state, the road shape around the vehicle A, and the like, the drive state determination unit 120 determines that the hands-off is permitted.

The specific condition includes, for example, at least one of: the LTA control being executed; the presence of the high-precision map data around vehicle A; at least one of the left and right lane markings of the current lane being detectable; the execution of the driver monitoring of the surroundings being determined; and the traveling section not a complicated section of the road structure. The complex section of the road structure includes, for example, a merge section, a branch section, and the like. In the following, the state in which the hands-off is permitted may be referred to as "a hands-off permission state", and the state in which the hands-off is prohibited may be referred to as "a hands-off prohibition state". The hands-off permission state is an example of the "hand release permission state", and the hands-off prohibition state is an example of the "hand release prohibition state". The autonomous driving level 2 in the hands-off prohibition state is an example of the "both prohibition state".

Further, the drive state determination unit 120 permits leg-off when at least ACC is executed in the autonomous driving operation of level 2 or lower. In the following, the state in which the leg-off is permitted may be referred to as "a leg-off permission state", and the state in which the leg-off is prohibited may be referred to as "a leg-off prohibition state". In addition, the drive state determination unit 120 permits eye's off when level 3 autonomous driving is permitted. That is, it can be said that the level 3 permission state is the eyes-off permission state.

The drive state determination unit 120 determines the autonomous driving operation level to be actually executed based on the currently permitted autonomous driving operation level, the driver state information, the input information to the operation device 26, and the like. That is, the drive state determination unit 120 determines the execution of the autonomous driving level when the currently permitted start instruction of the autonomous driving level is acquired as input information. Here, when the level 2 autonomous driving operation is being executed and the level 3 automatic operation is permitted under the hands-on state, the drive state determination unit 120 determines the execution of the level 3 without acquiring the input information. The above-mentioned drive state determination unit 120 is an example of an "identification unit".

The presentation information adjustment unit 140 has a presentation information selection unit 141, a content adjustment unit 142, and a presentation information generation unit 143 as sub-function units. The presentation information adjustment unit 140 is an example of the "presentation control unit".

The presentation information selection unit 141 controls the presentation of content related to autonomous driving in cooperation with the content adjustment unit 142 based on the information acquired from the periphery state grasp unit 110, the drive state determination unit 120, and the driver state estimation unit 130. Specifically, the presentation information selection unit 141 selects the content to be presented to each presentation device based on various information.

The content adjustment unit 142 adjusts the content to be displayed on each display device. The content adjustment unit 142 comprehensively determines the priority of each content based on various information from the presentation information selection unit 141. The content adjustment unit 142 selects the content determined to have a high priority as the content to be presented. In addition, the content adjustment unit 142 can sequentially change the display size and display layout of each content to be displayed on each display device according to the priority. As an example, the content adjustment unit 142 increases the display size as the priority content increases. As another example, the content adjustment unit 142 arranges the content on the near side of each display area as the content has a higher priority.

The presentation information generation unit 143 generates the control signal and video data to be provided to each display device, and the control signal and audio data to be provided to the audio device 24, based on the selection result of the presentation information selection unit 141 and the adjustment result of the content adjustment unit 142. The presentation information generation unit 143 outputs the generated control signal and each data to each presentation device, so that the presentation information is presented by each presentation device.

Figure 4:
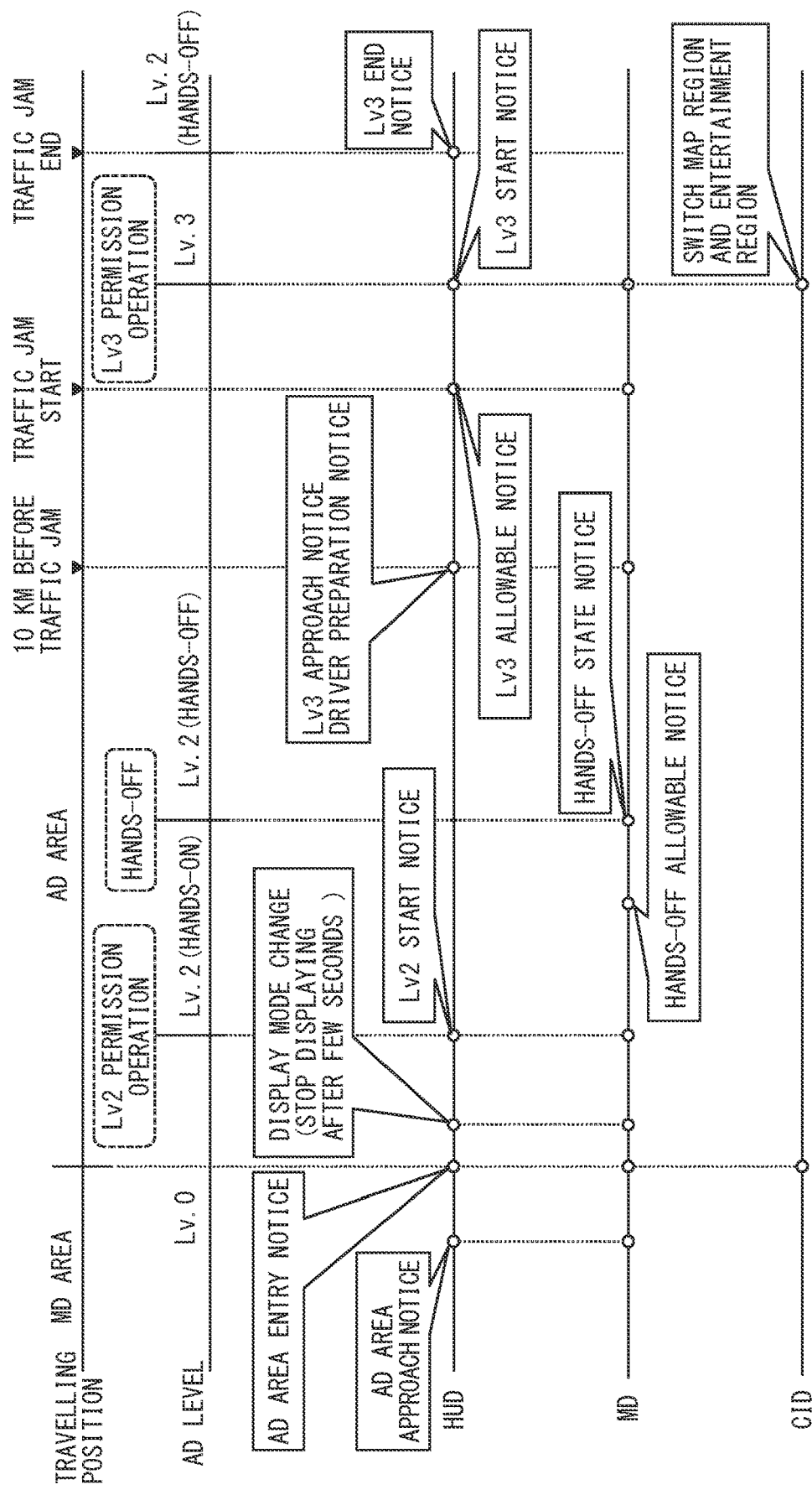
FIG. 4 is a time chart showing an example of a notification executed in each display device.

Next, the contents presented by the HCU 100 will be described below with reference to FIGS. 5 to 18 with reference to the time chart of FIG. 4. The HCU 100 provides AD area approach notification, AD area approach notification, level 2 start notification, level 3 approach notification, driver preparation notification, level 3 allowable notification, level 3 start notification, level 3 end notification, and the like in relation to autonomous driving.

Figure 5:
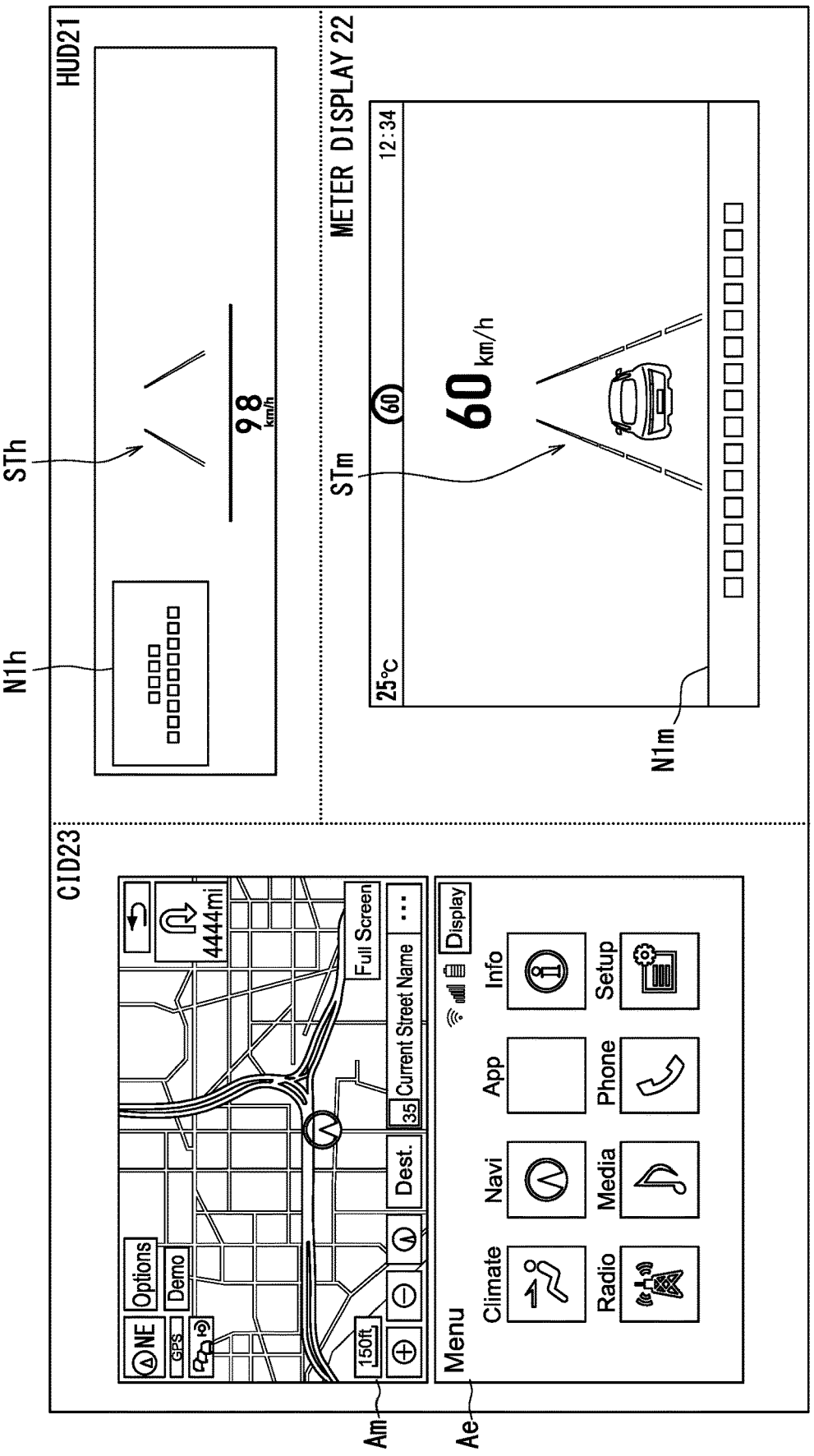
FIG. 5 is a diagram showing an example of information presentation.

The AD area approach notification is performed when the user approaches the AD area while traveling in the MD area. Specifically, the AD area approach notification is executed when the periphery state grasp unit 110 determines that the distance from the vehicle A to the AD area is less than the threshold distance. In the AD area approach notification, the presentation information adjustment unit 140 displays the AD area approach messages N1h and N1m on the HUD 21 and the meter display 22 as shown in FIG. 5.

The AD area approach messages N1h and N1m are image contents representing the approach to the AD area as visual information. The AD area approach message N1h to be displayed on the HUD 21 is displayed in the angle of view VA together with the digital speedometer, the drive status STh, and the like. The AD area approach message N1h is arranged to the left or right of the drive status STh arranged in the central region in the view angle VA. The AD area approach message N1h is configured to include a message image and a frame-shaped window image surrounding the message image. The message image is, for example, textual information of a description indicating the approach of the AD area, such as "The vehicle will enters in an autonomous driving allowable area soon".

The AD area approach message N1*m* to be displayed on the meter display 22 is displayed in the display screen together with the drive status STm and the like. The AD area approach message N1*m* is arranged, for example, at the lower edge in the display screen. The AD area approach message N1*m* is displayed on the near side of the drive status STm. The AD area approach message N1*m* is configured to include a message image and a band-shaped window image in which the message image is arranged on the near side. Similar to the HUD21, the message image is text information indicating the approach of the AD area. The window image has a display color (for example, blue) different from the background of the drive status STm.

The above AD area approach notification is carried out regardless of the allowable level of autonomous driving operation after entering the AD area. That is, not only when the vehicle approaches from the MD area to the AD area where the level 2 operation is allowable as shown in FIG. 4, but also when the vehicle approaches from the MD area to the AD area where the autonomous driving operation of level 3 or higher is allowable, the AD area approach notification will be executed.

Figure 6:
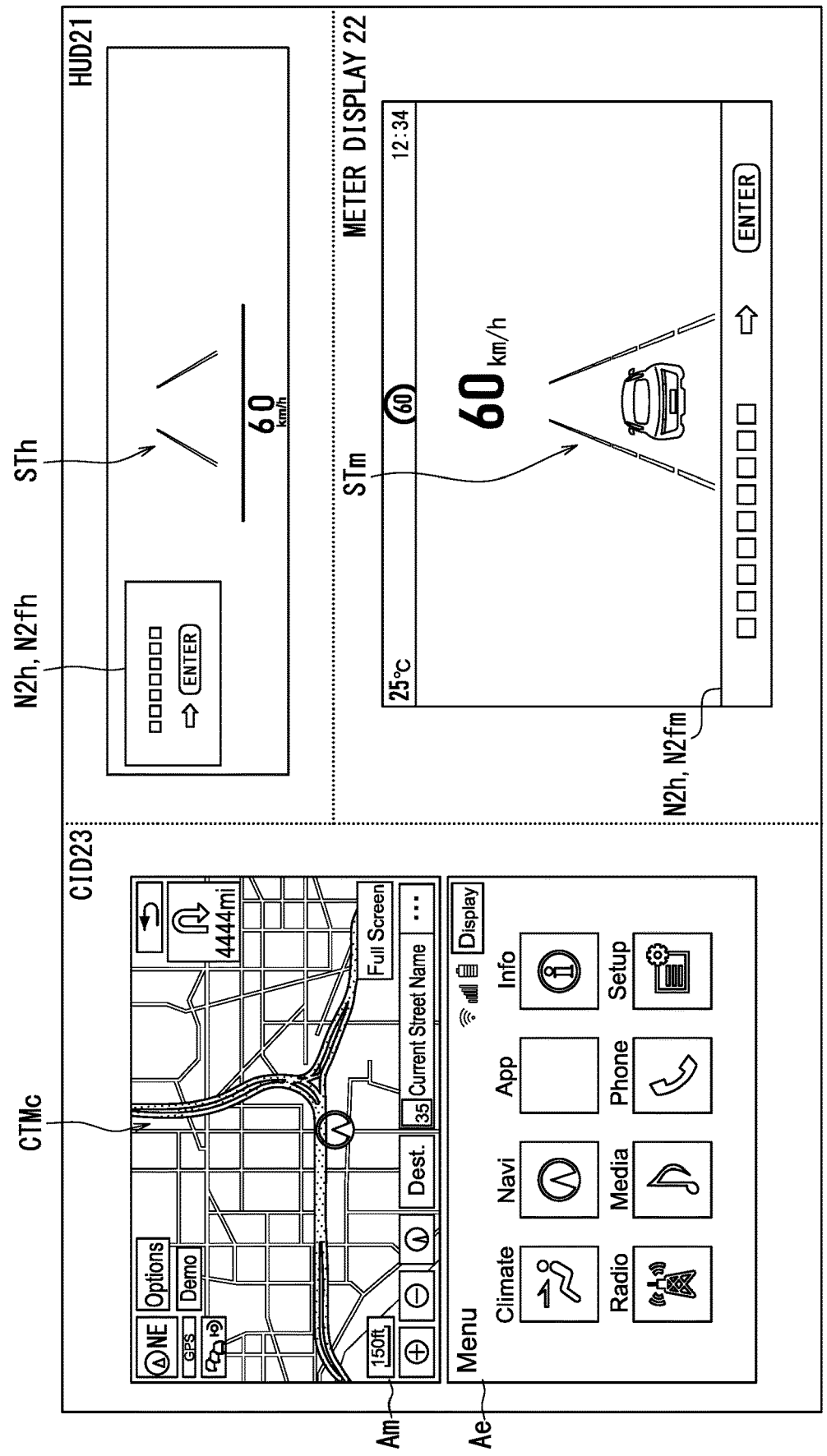
FIG. 6 is a diagram showing an example of information presentation.
Figure 7:
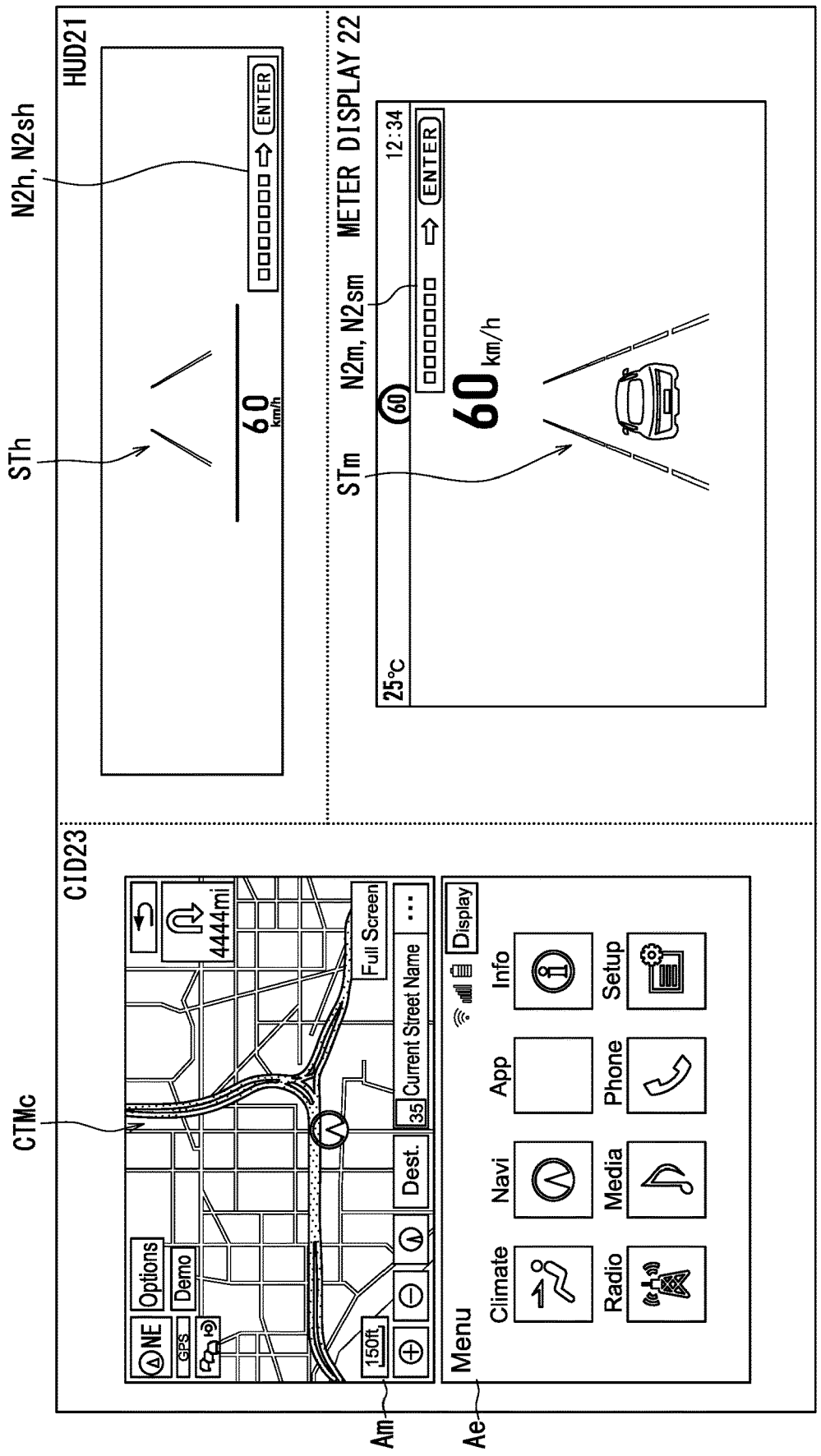
FIG. 7 is a diagram showing an example of information presentation.
Figure 8:
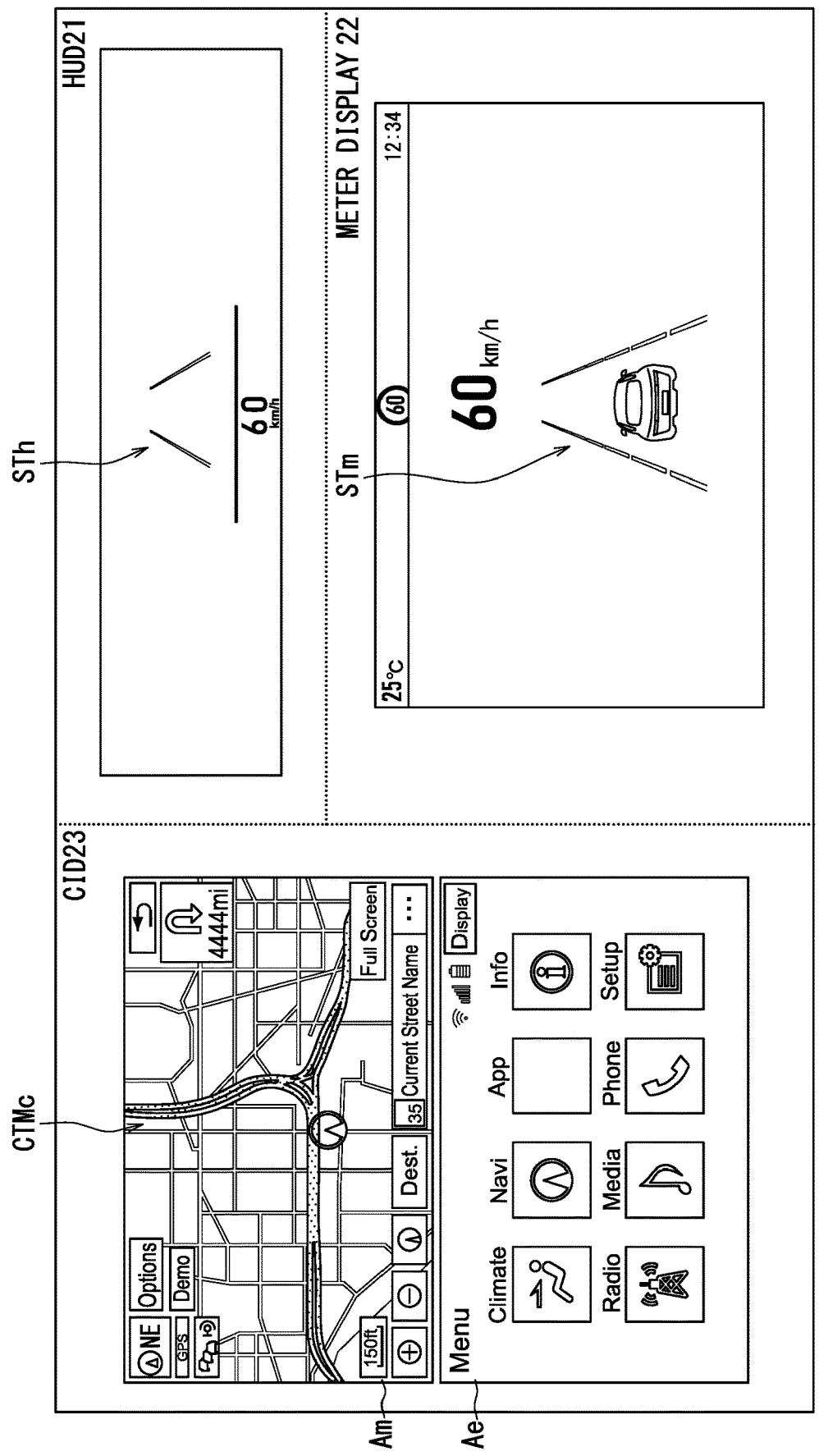
FIG. 8 is a diagram showing an example of information presentation.

The AD area approach notification is executed when the periphery state grasp unit 110 determines that the vehicle A has entered the AD area after the AD area approach notification. The AD area entry notification is an example of "autonomous driving permission information". In the AD area entry notification, the presentation information adjustment unit 140 displays the AD area entry messages N2*h* and N2*m* on the HUD 21 and the meter display 22, and displays the AD area notification content CTMc on the CID 23 as shown in FIGS. 6, 7 and 8.

The AD area entry messages N2*h*, N2*m*, and N2*c* are image contents representing the entry into the AD area as visual information. The display mode of the AD area entry messages N2*h* and N2*m* displayed on the HUD 21 and the meter display 22 is changed after a predetermined change time has elapsed from the start of the display. In the following, the AD area entry message before the change is referred to as the first AD area entry message N2*fh*, N2*fm*, and the AD area entry message after the change is referred to as the second AD area entry message N2*sh*, N2*sm*.

The first AD area entry message N2*fh* to be displayed on the HUD 21 is arranged at substantially the same position as the AD area approach message N1*h*, and is configured to include a message image and a frame-shaped window image similar to the AD area approach message N1*h*. The message image is text information related to the entry into the AD area, and for example, a message indicating a method of starting autonomous driving operation is described. Specifically, the message image includes a description of "autonomous driving mode", a description of "ENTER" indicating an input to the operation device 26, and an arrow pointing to the "ENTER". As a result, the first AD area approach message N1*fh* notifies the driver that the autonomous driving mode can be started when input to the operation device 26, and thus indicates to the driver that the vehicle A has entered the AD area where autonomous driving is allowable.

The first AD area entry message N2*fm* to be displayed on the meter display 22 is arranged at substantially the same position as, for example, the AD area approach message N1*m*. The first AD area entry message N2*fm* is configured to include a message image and a band-shaped window image in which the message image is arranged on the near side, similarly to the AD area approach message N1*m*. The message image is text information related to the entry into the AD area as in the case of the first AD area entry message N2*fh*. Specifically, the message image includes a description of "autonomous driving mode in use", a description of "ENTER" indicating an input to the operation device 26, and an arrow pointing to the "ENTER".

The above first AD area entry messages N2*fh* and N2*fm* are changed to the second AD area entry messages N2*sh* and N2*sm* after a predetermined change time (for example, several seconds) has elapsed. The second AD area entry messages N2*sh* and N2*sm* are displayed in a display mode having lower visibility than the first AD area entry messages N2*fh* and N2*fm*. Specifically, at least one of the display size reduction, display color change, display position change, display brightness reduction, partial non-display, and the like is applied to the second AD area entry message N2*sh*, N2*sm*, so that it is a display mode with low visibility. For example, in the second AD area entry message N2*sh* displayed on the HUD 21, the window image is hidden, the display position is set to the lower display position in the angle of view VA, and the display size is further reduced. Further, in the second AD area entry message N2*sm* displayed on the meter display 22, a part of the message image and the window image are hidden, and the display size is reduced.

The AD area notification content CTMc displayed on the CID 23 is a map image displayed in the map display area Am in a display mode different from that before the notification of the AD area. For example, the AD area notification content CTMc is a map image showing the AD area in the periphery area of the vehicle A separately from the MD area. Specifically, it is a region image displayed in different display colors. When it is determined that the vehicle A has entered the AD area, the AD area notification image N2*c* is started to be displayed substantially at the same time as the first AD area entry messages N2*fh* and N2*fm*. The display mode of the AD area notification content CTMa is not changed even after the predetermined change time has elapsed.

Of the above AD area entry messages N2*h*, N2*m*, and CTMc, the AD area entry messages N2*h*, N2*m* displayed on the HUD 21 and the meter display 22 are displayed for an allowable display time (for example, about 5 to 10 seconds). If the input information for starting the autonomous driving operation is not acquired from the operation device 26 during the allowable display time, the AD area entry messages N2*h* and N2*m* are hidden after the allowable time has elapsed. On the other hand, the AD area notification content CTMc continues to be displayed even after the allowable display time has elapsed (see FIG. 8). That is, after the allowable display time has elapsed, the entry notification will be continued in fewer display devices. The AD area notification content CTMc is continuously displayed until, for example, input information for starting the autonomous driving operation is acquired.

Figure 9:
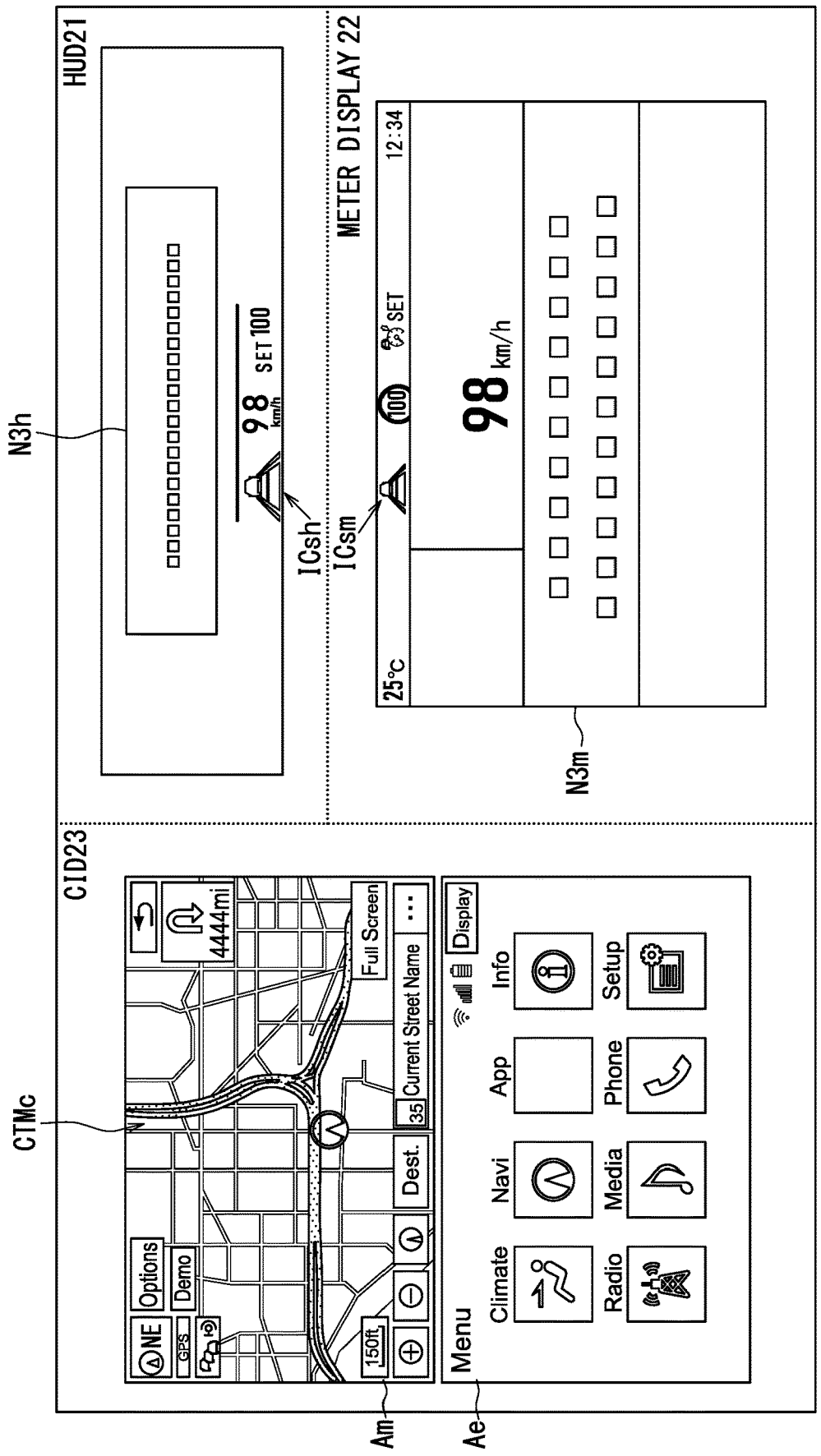
FIG. 9 is a diagram showing an example of information presentation.

The level 2 start notification is executed when the drive state determination unit 120 determines that the level 2 autonomous driving operation has started. In the level 2 start notification, the presentation information adjustment unit 140 displays the level 2 start messages N3*h* and N3*m* on the HUD 21 and the meter display 22 as shown in FIG. 9.

The level 2 start messages N3*h* and N3*m* are image contents representing the start of level 2 autonomous driving operation as visual information. The level 2 start messages N3*h* and N3*m* are configured to include, for example, a message image in which character information related to the start of autonomous driving operation is described, and a window image for partitioning the message image in the display area. The message image is a description that there is a possibility that the autonomous driving to be started may be canceled, for example, "autonomous driving will be canceled depending on the surrounding road conditions". Each level 2 start message N3h, N3m is arranged in the central portion in the display area. The level 2 start messages N3h and N3m are displayed on the near side of the drive status STh and STm.

Figure 13:
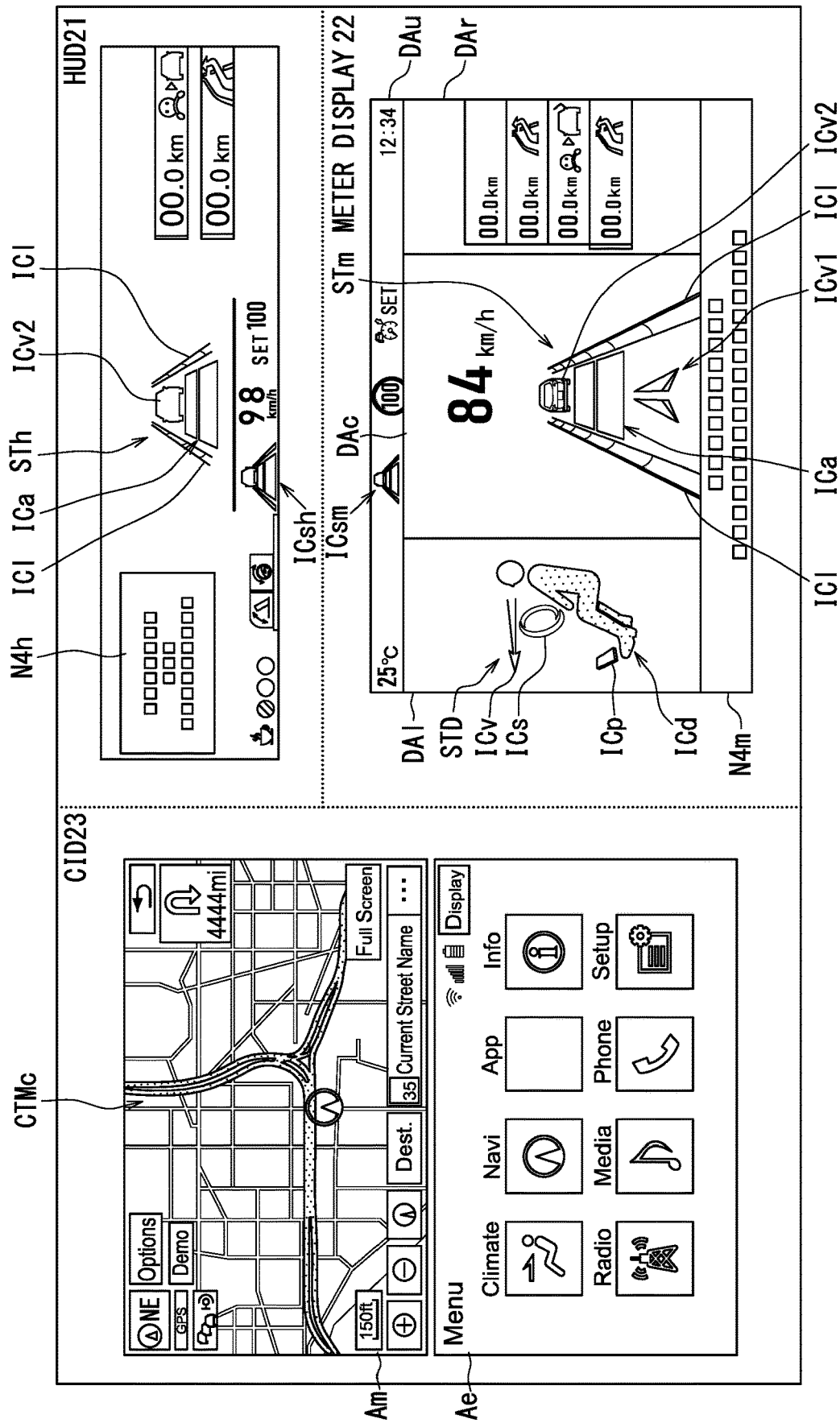
FIG. 13 is a diagram showing an example of information presentation.

The level 3 approach notification notifies the approach to the ST section where the level 3 autonomous driving is allowable. The level 3 approach notification is executed when the remaining distance from the vehicle A to the ST section falls below the threshold value (for example, about 10 km) while traveling in the MD area or the non-ST section of the AD area. In the level 3 approach notification, the presentation information adjustment unit 140 displays the level 3 approach messages N4h and N4m on the HUD 21 and the meter display 22 as shown in FIG. 13.

The level 3 approach messages N4h and N4m are image contents representing the approach to the ST section as visual information. The level 3 approach message N4h to be displayed on the HUD 21 is arranged at substantially the same position as the AD area approach message N1h, and is configured to include a message image and a frame-shaped window image similar to the AD area approach message N1h. The message image is, for example, character information of a description indicating the approach of the ST section, such as "traffic jam about 10 km ahead, and second task available".

The level 3 approach message N4m displayed on the meter display 22 is arranged at substantially the same position as, for example, the AD area approach message N1m. The level 3 approach message N4m is configured to include a message image and a band-shaped window image in which the message image is arranged on the near side, similarly to the AD area approach message N1m. The message image is, for example, character information of a description indicating the approach of the ST section, as in the display of HUD21, such as "a traffic jam about 10 km ahead, and second task available during traffic jam".

When transitioning from the autonomous driving prohibition state to the level 3 allowable state (i.e., in case of a first transition), the level 3 approach notification and the AD area approach notification are simultaneously executed. At this time, the level 3 approach notification and the AD area approach notification may be performed as one notification.

Figure 14:
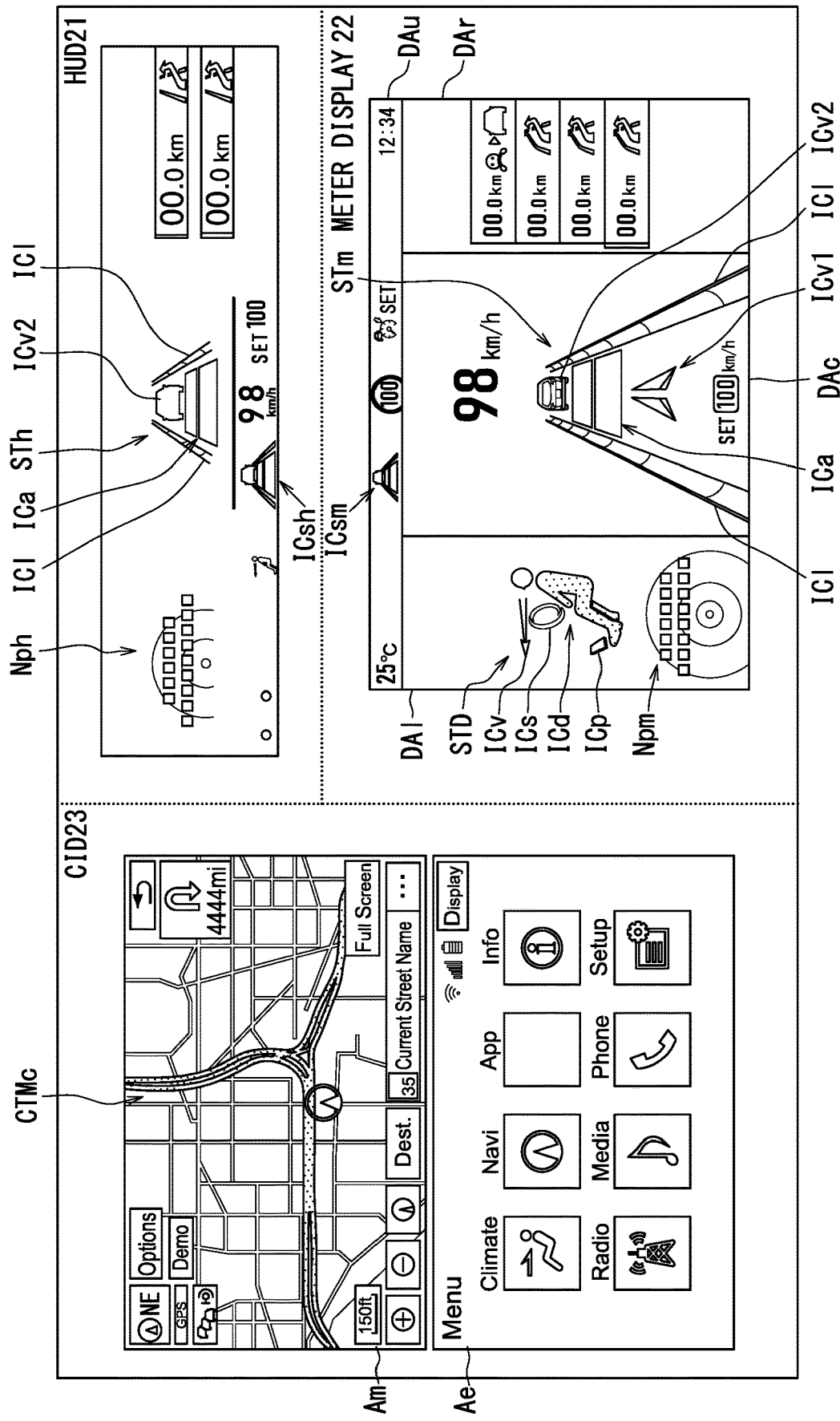
FIG. 14 is a diagram showing an example of information presentation.

The driver preparation notification is a notification urging the driver to satisfy the condition (i.e., the driver condition) for executing the level 3 operation. The driver preparation notification is executed when the driver condition is not satisfied at the start of the level 3 approach notification. The driver condition is, for example, that the awareness degree of the driver exceeds the threshold level, the posture type of the driver is a predetermined posture type, and the like. Further, the driver condition may be that the stress level falls below the threshold level, the elapsed time from the start of traveling exceeds a predetermined time, and the like. The establishment of the driver condition corresponds to the state in which the driver is ready for the autonomous driving level 3. The driver preparation notification may be executed at the same time as the level 3 approach notification. For example, it is started after executing the level 3 approach notification. As shown in FIG. 14, the presentation information adjustment unit 140 causes the HUD 21 and the meter display 22 to display the driver preparation messages Nph and Npm in the driver preparation notification.

Each driver preparation message Nph, Npm is configured to include, for example, a window image and a message image. The message image is a description that urges the driver to take a predetermined action so that the driver condition not satisfied will be satisfied. The driver preparation message Nph displayed on the HUD 21 is displayed at the same position as, for example, the level 3 approach message N4h. The driver preparation message Npm displayed on the meter display 22 is displayed below the driver status STD, for example, in the same display area as the driver status STD.

The level 3 allowable notification notifies that the level 3 allowable state has been reached by entering the ST section. The level 3 allowable notification is executed when entering the ST section from the non-ST section of the AD area, that is, when transitioning from the level 2 allowable state to the level 3 allowable state (i.e., the second transition). In addition, the level 3 allowable notification is executed when the vehicle enters the ST section from the MD area, that is, when transitioning from the autonomous driving prohibition state to the level 3 allowable state (i.e., the first transition). That is, the level 3 allowable notification may be executed at the same time as the AD area entry notification. Further, the level 3 allowable notification and the AD area entry notification may be performed as one notification. Here, the level 3 allowable notification is an example of "transition allowable information". Further, the level 3 allowable notification when transitioning from the autonomous driving prohibition state (i.e., the manual driving state) to the level 3 allowable state is an example of "manual transition allowable information". Further, the level 3 allowable notification when transitioning from the level 2 allowable state to the level 3 allowable state where hands-off is permitted is an example of "hands-off transition allowable information". Further, the level 3 allowable notification when transitioning from the level 2 allowable state to the level 3 allowable state where the hands-off is prohibited is an example of "both prohibition transition allowable information".

Figure 15:
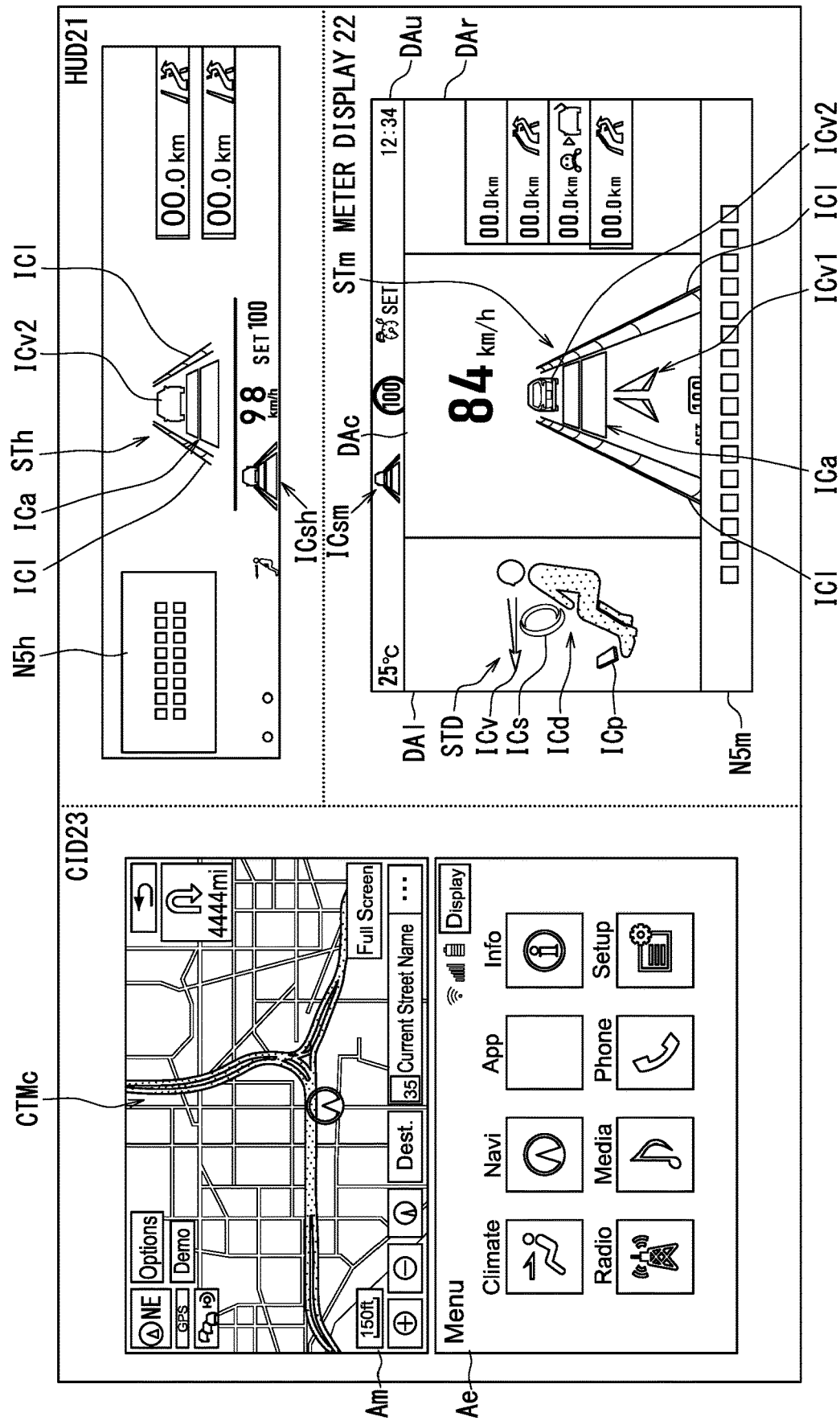
FIG. 15 is a diagram showing an example of information presentation.

In the level 3 allowable notification, the presentation information adjustment unit 140 displays the level 3 allowable messages N5h and N5m on the HUD 21 and the meter display 22 as shown in FIG. 15. In addition, the presentation information adjustment unit 140 causes the audio device 24 to present the level 3 allowable notification sound when the first transition occurs. As a result, the presentation information adjustment unit 140 presents the information regarding the first transition (i.e., the manual transition information) to the driver with emphasis over the information regarding the second transition.

The level 3 allowable messages N5h and N5m are image contents representing the entry to the ST section as visual information. The level 3 allowable message N5h to be displayed on the HUD 21 is arranged at substantially the same position as the AD area approach message N1h, and is configured to include a message image and a frame-shaped window image similar to the AD area approach message N1h. The message image is, for example, character information of a description indicating entry into the ST section, such as "second task has become available".

The level 3 allowable message N5m displayed on the meter display 22 is arranged at substantially the same position as, for example, the AD area approach message N1m. The level 3 approach message N4m is configured to include a message image and a band-shaped window image in which the message image is arranged on the near side, similarly to the AD area approach message N1m. The message image is substantially the same as that displayed on the HUD 21, for example.

The level 3 allowable notification sound is a sound content indicating that level 3 autonomous driving has become possible as auditory information. The level 3 allowable notification sound may be a sound effect or a voice message.

Figure 16:
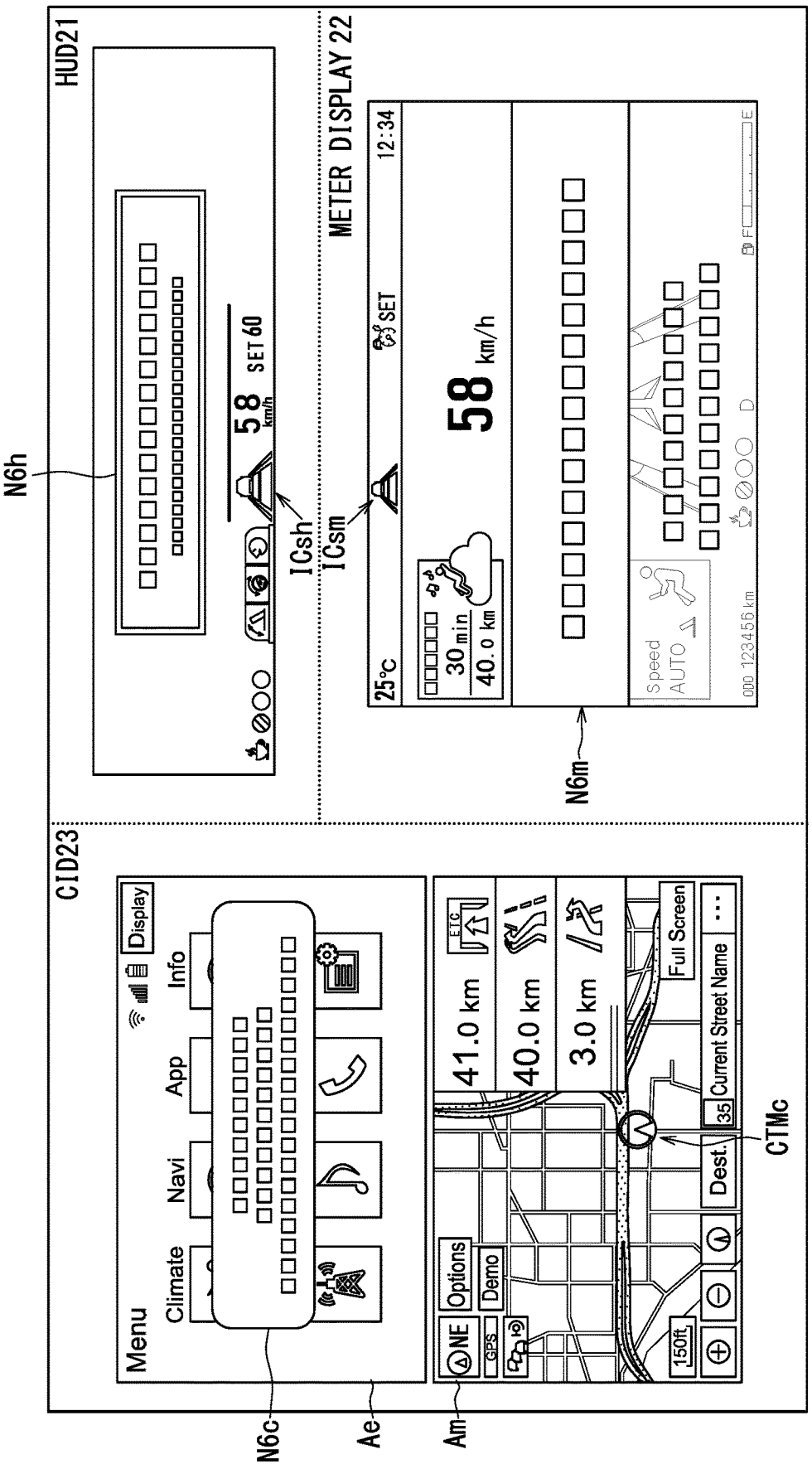
FIG. 16 is a diagram showing an example of information presentation.
Figure 17:
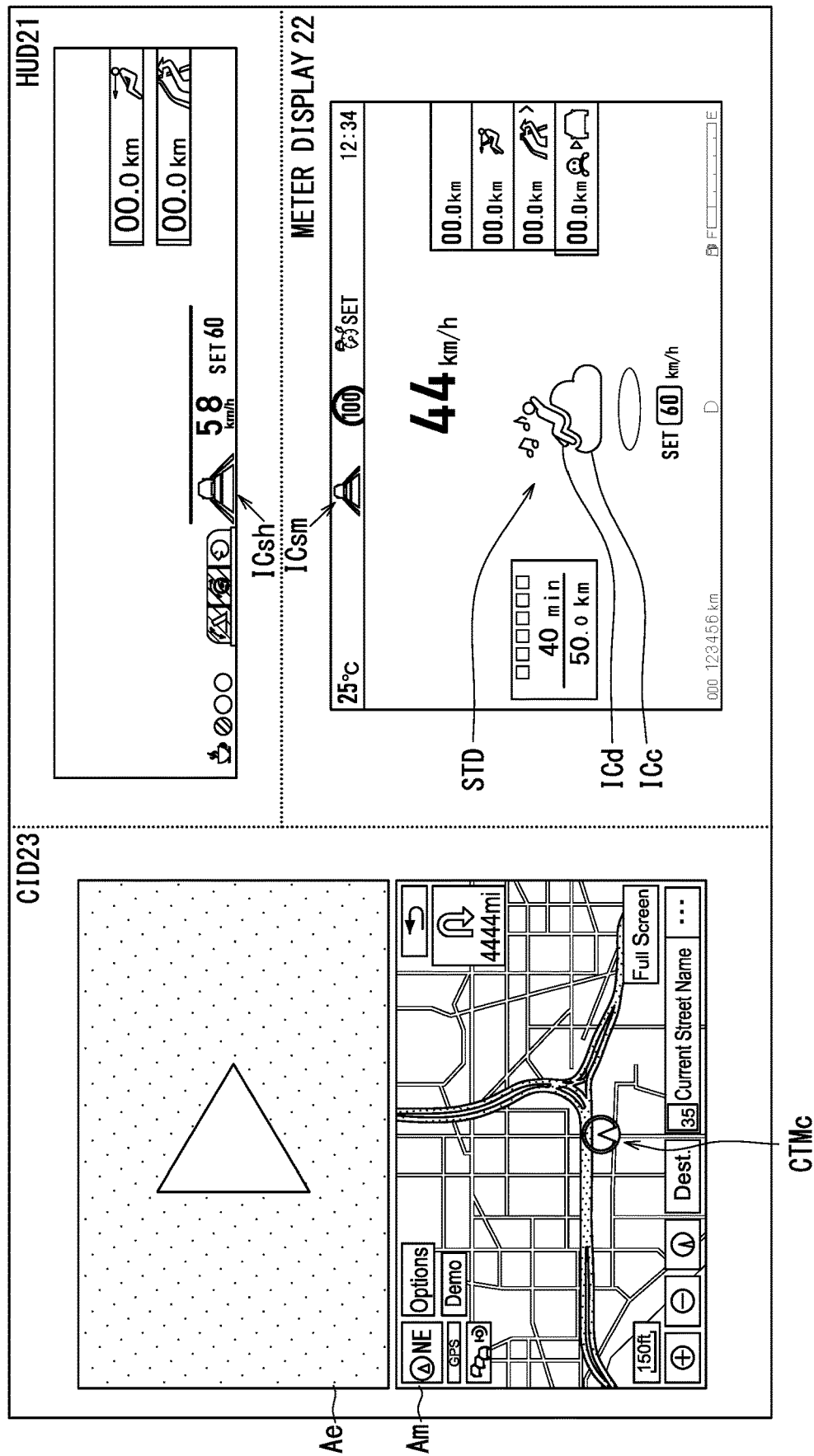
FIG. 17 is a diagram showing an example of information presentation.

The level 3 start notification notifies the start of level 3 autonomous driving operation. In the first embodiment, the level 3 start notification is executed after receiving the level 3 start instruction by the driver in the case of transitioning from manual operation state, the level 1 or level 2 hands-on state to the level 3 state. On the other hand, in the case of transitioning from the hands-off of level 2 state to the level 3 state, the level 3 start notification will be executed when entering the ST section. In this case, the level 3 start notification is executed at the same time as the level 3 allowable notification. Here, the level 3 start notification is an example of "transition execution information". Further, the level 3 start notification when transitioning from the autonomous driving prohibition state to the level 3 allowable state is an example of "manual transition execution information". Further, the level 3 execution notification when transitioning from the level 2 allowable state to the level 3 allowable state where hands-off is permitted is an example of "hands-off transition execution information". Further, the level 3 execution notification when transitioning from the level 2 allowable state to the level 3 allowable state where the hands-off is prohibited is an example of "both prohibition transition execution information". In the level 3 start notification, the presentation information adjustment unit 140 displays the level 3 start messages N6h, N6m and N6c on the HUD 21, the meter display 22 and the CID 23 as shown in FIG. 16

The level 3 start messages N6h, N6m and N6c are image contents representing the start of level 3 autonomous driving operation as visual information. The level 3 start message N6h displayed on the HUD 21 is arranged at substantially the same position as the level 2 start message N3h, and includes a message image and a frame-shaped window image. The message image is textual information related to the start of Level 3 autonomous driving, such as "Please be careful about the information from the vehicle system. Automatic driving will be canceled depending on the surrounding road conditions."

The level 3 start message N6m displayed on the meter display 22 is arranged at substantially the same position as the level 2 start message N3h, and includes a message image and a frame-shaped window image. The message image is substantially the same as that displayed on the HUD 21, for example.

The level 3 start message N6c displayed on the CID 23 is displayed, for example, near the central area of the entertainment display area Ae. The level 3 start message N6c is displayed in the near side of other display contents in the entertainment display area Ae. The level 3 start message N6c is configured to include a message image and a window image arranged in the far side of the message image. The message image is a description related to the start of level 3 autonomous driving, which is similar to the message image on the HUD 21 and meter display 22, such as "Autonomous driving will be canceled due to the surrounding road environment. Please pay attention to the information transmitted from the vehicle system".

In addition, in the level 3 start notification, the presentation information adjustment unit 140 replaces the map display area Am and the entertainment display area Ae of the CID23. Specifically, the presentation information adjustment unit 140 displays the entertainment display area Ae above the map display area Am.

Figure 18:
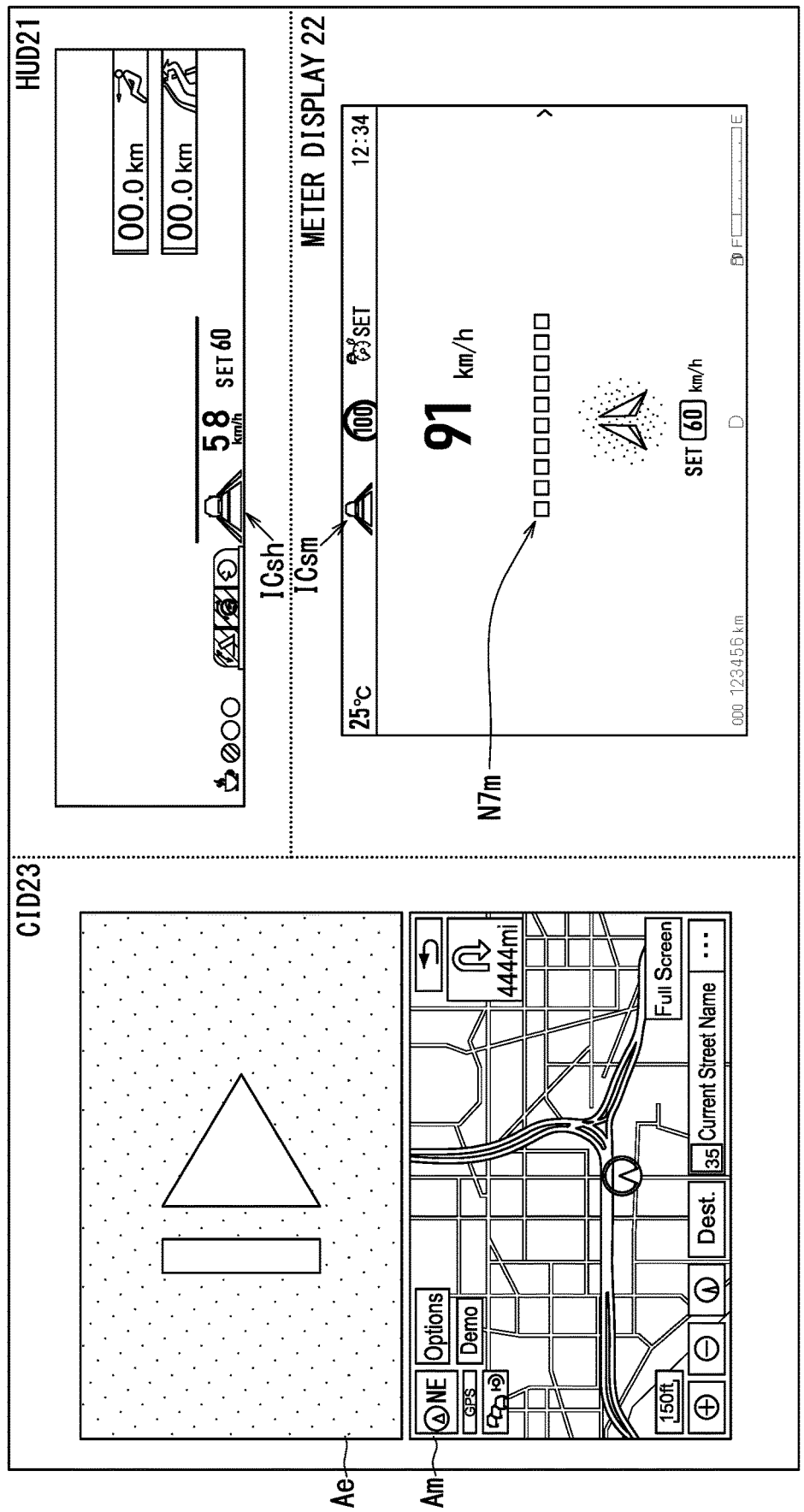
FIG. 18 is a diagram showing an example of information presentation.

The level 3 end notification is executed when transitioning from the level 3 autonomous driving to the level 2 or lower autonomous driving or manual driving. When transitioning from the level 3 autonomous driving to the level 2 permission state, the presentation information adjustment unit 140 performs a transition from the information presentation of FIG. 17 to the information presentation of FIG. 10 or FIG. 11 as a level 3 end notification. Further, when transitioning from the level 3 autonomous driving state to the manual driving state, the presentation information adjustment unit 140 performs a transition from the information presentation of FIG. 17 to the information presentation of FIG. 8 as a level 3 end notification. In addition, the presentation information adjustment unit 140 displays the level 3 end message N7m on the meter display 22 as a level 3 end notification, as shown in FIG. 18. In addition, the presentation information adjustment unit 140 causes the audio device 24 to output the level 3 end notification sound.

The level 3 end message N7m is an image content indicating the end of the level 3 autonomous driving as visual information. For example, in the case of transitioning to manual operation, the level 3 end message N7m is a message image including text information of a description related to the end of autonomous driving such as "autonomous driving mode is cancelling" (see FIG. 18). Further, in the case of transitioning to the autonomous driving of level 2 or lower, the message image may include the character information of the description that urges the end of the second task, the start of the necessary driving operation, and the like.

It should be noted that the presentation information adjustment unit 140 executes the notification indicating that the autonomous driving mode is temporarily cancelled as shown in FIG. 18 when an override is performed such that the driver operates the steering wheel during autonomous driving of level 2 or higher. Then, the presentation information adjustment unit 140 stops or hides the display content of the entertainment display area Ae during the override.

The level 3 end notification sound is a sound content indicating the end of level 3 autonomous driving as auditory information. The level 3 end notification sound may be a sound effect or a voice message.

Here, when transitioning to the hands-off permission state (i.e., the fourth transition), the presentation information adjustment unit 140 interrupts the presentation of the level 3 end notification sound. That is, the presentation information adjustment unit 140 presents a level 3 end notification sound when transitioning to the hands-off prohibition state (i.e., the third transition), and does not present the level 3 end notification when hands-on is not required after the transition. As a result, the presentation information adjustment unit 140 presents the information regarding the third transition to the driver with emphasis over the information regarding the fourth transition.

Figure 10:
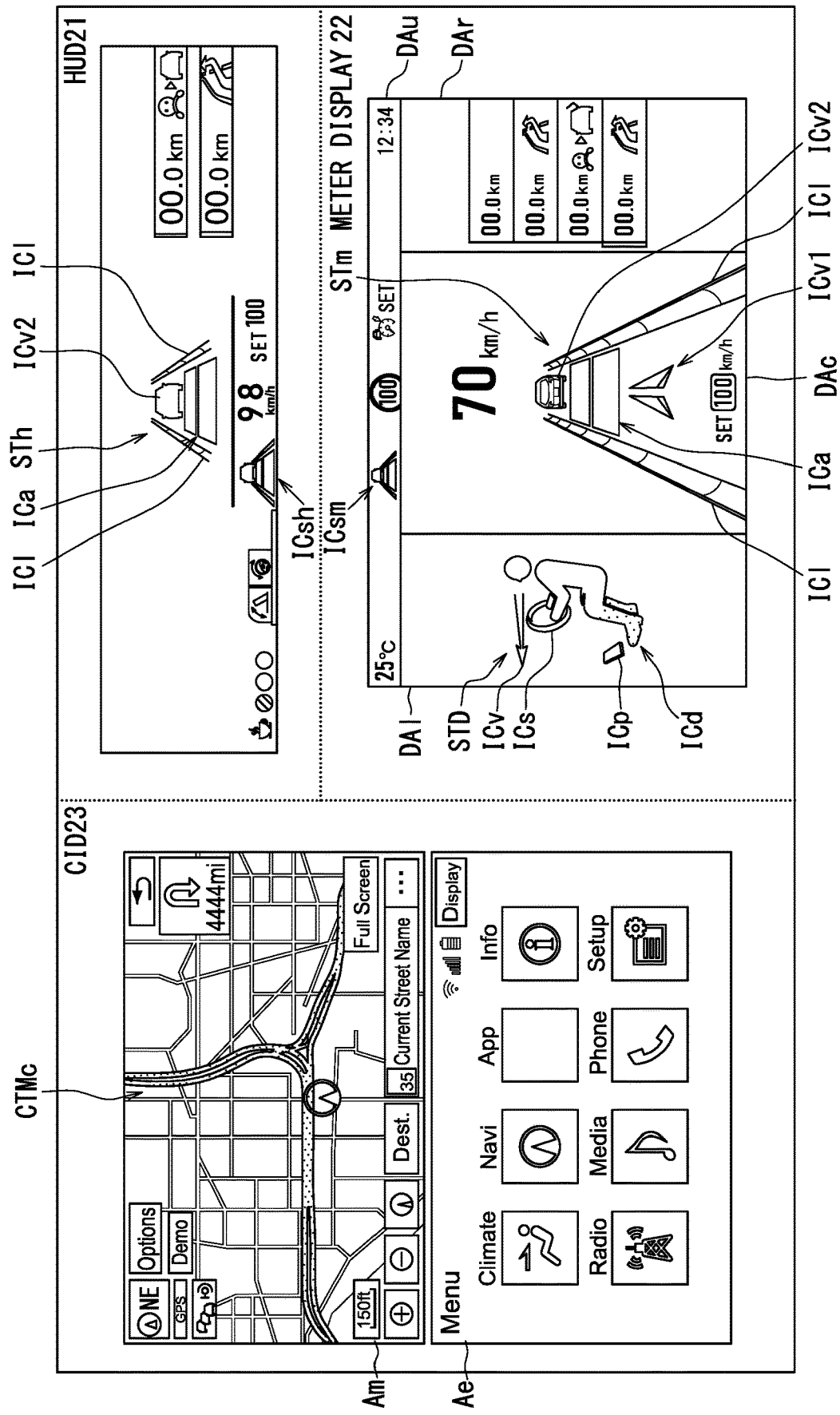
FIG. 10 is a diagram showing an example of information presentation.

Here, the contents continuously displayed by the presentation information adjustment unit 140 during the implementation of the autonomous driving will be described with reference to FIGS. 10 to 12 and the like. The presentation information adjustment unit 140 displays the driving status STh, STm, the status icon ICsh, ICsm, the driver status STD, and the like during the execution of autonomous driving of level 2 or lower.

The driving statuses STh and STm are contents displayed on the HUD 21 and the meter display 22. The driving statuses STh and STm present the operating states of the longitudinal control and the lateral control, that is, the ACC function and the LTA function in the autonomous driving of level 2 or lower. Each driving status STh, STm includes another vehicle icon ICv2, ACC icon ICa, and LTA icon ICl. In addition to the above-mentioned contents, the own vehicle icon ICv1 is also displayed on the driving status STm displayed on the meter display 22.

The other vehicle icon ICv2 is an icon that imitates another vehicle, and is displayed at least during the execution of the ACC function or the detection of the preceding vehicle. The ACC icons ICah and ICam are icons that indicate the execution of the ACC control, and are displayed during the execution of the ACC control, and are hidden or displayed in a different mode from those during the execution when the ACC control is stopped. The ACC icon ICa is a figure arranged below the other vehicle icon ICv2, and is visually recognized as being arranged following the preceding vehicle indicated by the other vehicle icon ICv2 according to the perspective method. The LTA icons ICLh and ICLm are icons that indicate the execution of the LTA control, are displayed during the execution of the LTA control, and are hidden or displayed in a different mode from those during the execution when the LTA control is stopped. The LTA icon ICl is arranged on both the left and right sides of the other vehicle icon ICv2 and the ACC icon ICa, and is visually recognized as a pair of lines extending from the near side to the far side.

The driving status STm on the meter display 22 is displayed collectively in one of the display areas obtained by dividing the display screen of the meter display 22 into a plurality of parts. The display area of the meter display 22 is divided into four, for example, an upper area DAu, a lower left area DAl, a lower center area DAc, and a lower right area DAr. It should be noted that each display area is apparently divided by the change of the background color for each display area the display of the frame image, and the like by the presentation information adjustment unit 140. The driving status STm is displayed in the lower central region DAc.

The status icons ICsh and ICsm are icons indicating the execution states of the longitudinal direction control and the lateral direction control, as in the driving status STh and STm. The status icon ICsm is displayed in the upper area DAu. The status icons ICsh and ICsm are simplified from the driving status STh and STm, for example, by simplifying an icon imitating another vehicle, an icon indicating the execution of ACC control, and an icon indicating the execution of LTA control. The status icons ICsh and ICsm may be continuously displayed even in autonomous driving of level 3 or higher.

The future action content is content for notifying the scheduled future action of the vehicle A, and is displayed in the lower right area DAr. The future action content includes, for example, an icon showing the future action and a numerical image showing the distance to the point where the future action will be performed. Future actions include lane changes, left and right turns, merging, and the like. In addition, the future action may include an exchange in a driving control right with the driver, a change in the level of autonomous driving, and the like.

The driver status STD is content that presents the driver's status regarding the driving operation. The driver status STD is displayed in the lower left region DAL of the meter display 22. The driver status STD presents, for each of the plurality of types of body parts of the driver, a state corresponding to one of an interruption permission state in which the interruption of the driving operation is permitted and an interruption prohibition state in which the interruption of the driving operation is prohibited. For example, the driver status STD presents an interruption permission state or an interruption prohibition state for the driving operation such as monitoring the periphery by the eye, grasping the steering wheel by hand, and placing the foot on the pedal. The driver status STD is displayed in the same display area for the state of each body part.

Specifically, the driver status STD includes a driver icon ICd, a steer icon ICs, a pedal icon ICp, and a line-of-sight icon ICv. The driver icon ICd is a humanoid icon. More specifically, the driver icon ICd has a shape imitating a human body including the head which is a part including the eye, the wrist, and the foot, as a body part. That is, the driver icon ICd is a content that collectively displays each body part. As a result, the driver icon ICd presents the body parts close to each other in the lower left region DAL. The driver icon ICd may be a single piece of content, or may be content in which the body parts are separated from each other.

The steer icon ICs is an icon image that imitates the steering wheel. The pedal icon ICp is an icon that imitates an accelerator pedal. The line-of-sight icon ICv is an icon indicating the line-of-sight of the driver. The line-of-sight icon ICv has, for example, an arrow shape extending from the vicinity of the head of the driver icon ICd in the direction in which the head is facing (e.g., leftward in the case of FIGS. 10 to 12 and the like).

The driver status STD displays the status permitted to the driver regarding the driving operation by the collaboration of each icon. For example, in the hands-off prohibition state in which the hands-off operation is prohibited, the hand portion of the driver icon ICd and the steer icon ICs are displayed overlapping with each other. In the hands-off permission state where the hands-off operation is permitted, the hand part of the driver icon ICd and the steer icon ICs are displayed separately from each other. In addition, the visibility of the steer icon ICs is reduced.

Further, in the case of the leg-off prohibition state in which the leg-off operation is prohibited, the foot of the driver icon ICd and the pedal icon ICp are displayed overlapping with each other. In addition, the visibility of the pedal icon ICp is reduced. In the leg-off permission state, the foot of the driver icon ICd and the pedal icon ICp are displayed apart from each other. Further, in the eye-off prohibition state in which the eye-off operation is prohibited, the line-of-sight icon ICv is displayed, and in the eye-off permission state in which the eye-off operation is permitted, the visibility of the line-of-sight icon ICv is lowered.

The presentation information adjustment unit 140 notifies the state transition between the interruption prohibition state and the interruption permission state for each body part by using the above-mentioned driver status STD (i.e., the transition notification). The interruption prohibition state includes a hands-off prohibition state, a leg-off prohibition state, and an eyes-off prohibition state. The interruption permission state includes the hands-off permission state, the leg-off permission state, and the eyes-off permission state. At this time, the presentation information adjustment unit 140 changes the mode of the driver status STD by displaying an animation. Specifically, the presentation information adjustment unit 140 presents the state transition of the driver icon ICd for the display part corresponding to the body part where the state changes by animation display. In addition, the presentation information adjustment unit 140 improves the brightness of the display portion of the driver icon ICd corresponding to the body portion to which the state shifts, and emphasizes the body portion to which the state shifts.

The animation display is stopped when it is estimated that the corresponding driver's body part has actually transitioned to the state corresponding to the state. Further, the presentation information adjustment unit 140 also stops the animation even if the corresponding driver's body part does not transition to the interruption state (i.e., the hands-off state, the leg-off state, or the eyes-off state) within a predetermined period. In this case, the presentation information adjustment unit 140 may set the mode after the animation is stopped as a display mode of the interruption prohibition state, that is, a mode corresponding to the current state of the body part.

Figure 11:
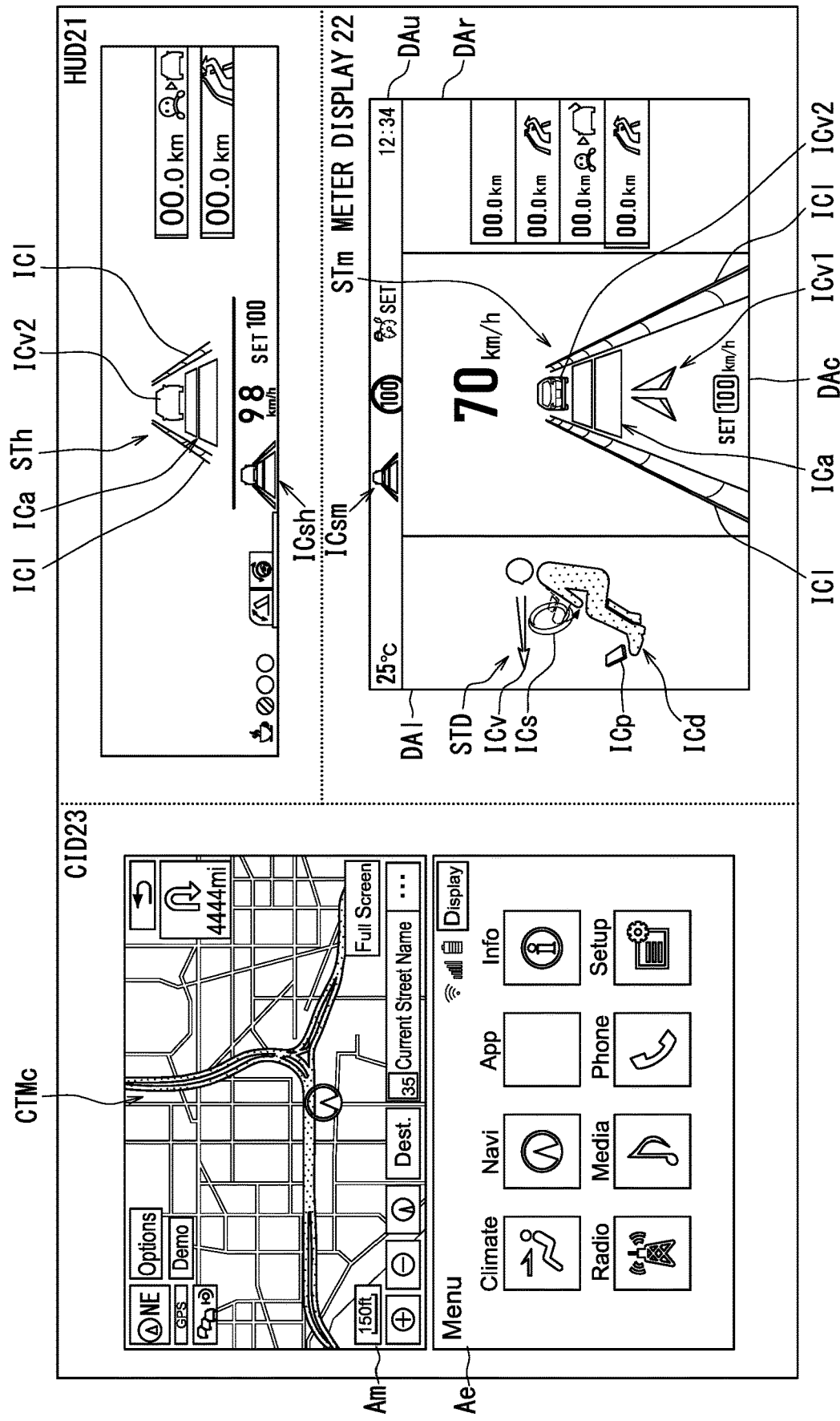
FIG. 11 is a diagram showing an example of information presentation.
Figure 12:
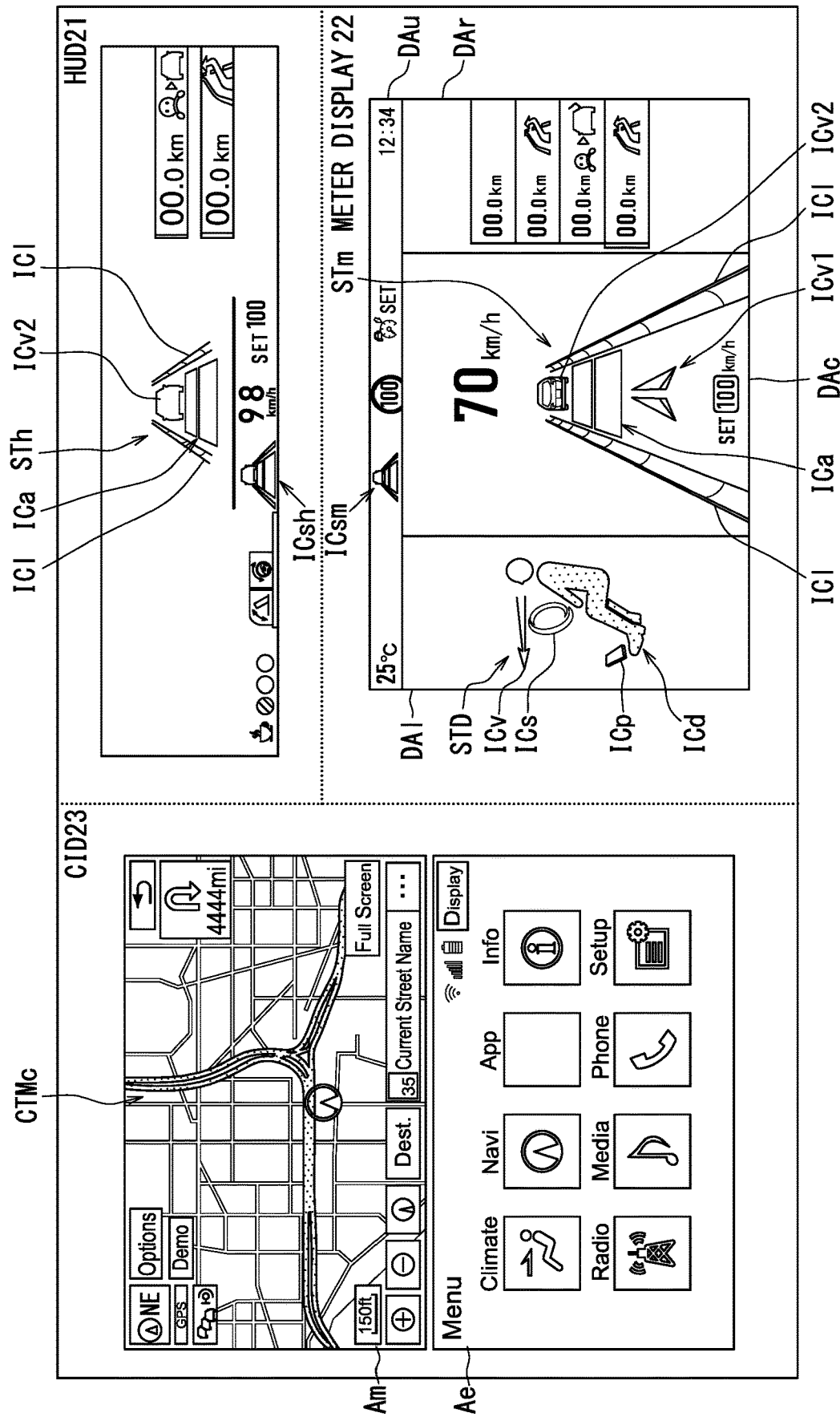
FIG. 12 is a diagram showing an example of information presentation.

For example, the presentation information adjustment unit 140 displays an animation in which the hand part of the driver icon ICd moves from the position in the hands-off prohibition state to the position in the hands-off permission state when shifting from the hands-off prohibition state to the hands-off permission state (in FIG. 11). The presentation information adjustment unit 140 repeatedly displays the above animation. When the driver actually transitions to the hands-off state, the presentation information adjustment unit 140 stops the animation and sets the display mode of the hands-off state (see FIG. 12).

In addition, when transitioning from the hands-off prohibition state to the hands-off permission state, the presentation information adjustment unit 140 reduces the visibility of the steer icon ICs by lowering the brightness and the like. The presentation information adjustment unit 140 may repeatedly execute the reduction of the visibility of the steer icon ICs in synchronization with the animation display of the driver icon ICd, or may execute it after the animation of the driver icon ICd is stopped.

Further, the presentation information adjustment unit 140 also displays an animation in which the foot of the driver icon ICd moves from the position in the leg-off prohibition state to the position in the leg-off permission state when transitioning from the leg-off prohibition state to the leg-off permission state. In addition, the presentation information adjustment unit 140 reduces the visibility of the pedal icon ICp.

In addition, the presentation information adjustment unit 140 also presents the transition of the state by the animation display even when transitioning from the interruption permission state to the interruption prohibition state. In this case, the presentation information adjustment unit 140 may continue the animation display until the corresponding driver's body part actually transitions to the driving involvement state.

Further, the driver status STD in the level 3 execution state is displayed in a mode different from that in the state of level 2 or lower. For example, the driver status STD in the level 3 execution state is displayed in a display mode in which the driver icon ICd is seated on the chair icon ICc. At this time, the driver icon ICd is displayed as a humanoid shape with a posture of reclining backward compared to the case of level 2 or lower. The steer icon ICs and pedal icon ICp are hidden.

The line-of-sight icon ICv, the steering wheel icon ICs, and the pedal icon ICp may be hidden separately from reducing the visibility. The line-of-sight icon ICv, the steer icon ICs, and the pedal icon ICp may be displayed when there is a change in the driving operation that needs to be displayed together with the driver icon ICd.

In addition, when transitioning from the level 3 autonomous driving state to the hands-on level 2 autonomous driving state, the line-of-sight icon ICv and the steer icon ICs are switched from a hidden state to a display state, or from a display state to a highlighted display state in order to promote the eyes-on operation and the hands-on operation. At this time, the line-of-sight icon ICv and the steer icon ICs may be displayed at the same time, or may be displayed in order.

By displaying the line-of-sight icon ICv and the steer icon ICs at the same time, it is possible to quickly inform the driver of the state permitted to the driver regarding the driving operation.

On the other hand, when transitioning from the level 3 autonomous driving state to the hands-on level 2 autonomous driving state, the driver may need to perform many driving operations, which increases the number of tasks for the driver and causes confusion. Therefore, by displaying the line-of-sight icon ICv and the steer icon ICs in order, the driver can be made to perform tasks that should be performed one by one, so that the driving operation can be performed safely.

Next, the flowchart of the presentation control method executed by the HCU 100 in collaboration with the functional blocks will be described below according to FIGS. 19 to 24 with reference to FIGS. 2 to 18. In FIGS. 19 to 24, the meter display 22 is described as "MD". In a flowchart to be described later, "S" means multiple steps of the flowchart to be executed by multiple instructions included in the presentation control program.

Figure 19:
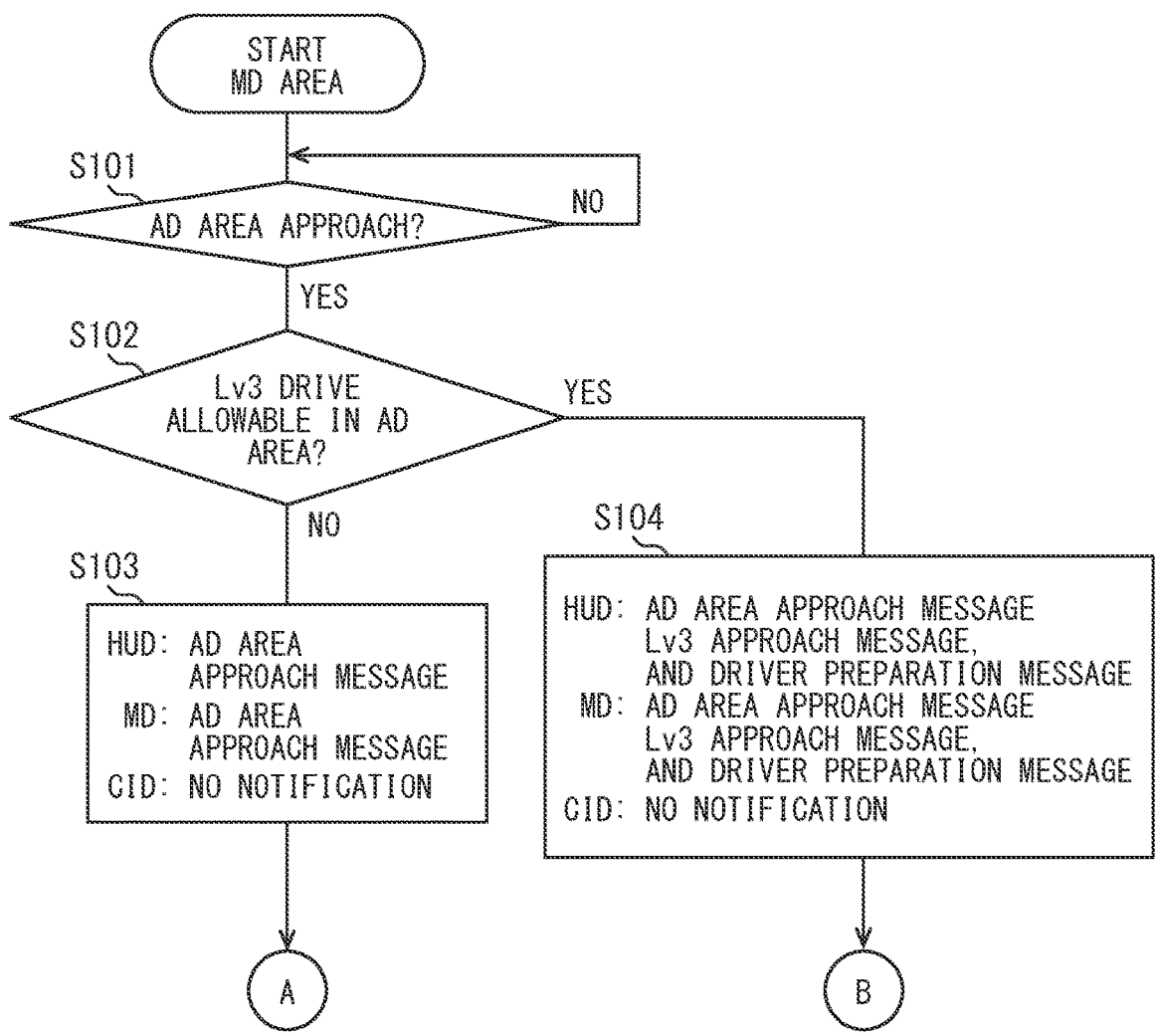
FIG. 19 is a flowchart showing an example of a presentation control method executed by the HCU.

First, the flow in the scene of entering the AD area from the MD area will be described (see FIGS. 19 to 21). In S101 of FIG. 19, the periphery state grasp unit 110 determines whether or not the vehicle is approaching the AD area. If it is determined that the vehicle is not approaching the AD area, the process waits until the vehicle is approaching the AD area. When it is determined that the vehicle is approaching the AD area, in S102, the periphery state grasp unit 110 determines whether or not level 3 autonomous driving is possible after entering the AD area. If it is determined that level 3 autonomous driving is not possible, that is, only level 2 or lower autonomous driving is possible, the process proceeds to S103.

In S103, the presentation information adjustment unit 140 executes the AD area approach notification. Specifically, the AD area approach messages N1*h* and N1*m* are displayed on the HUD 21 and the meter display 22.

Figure 20:
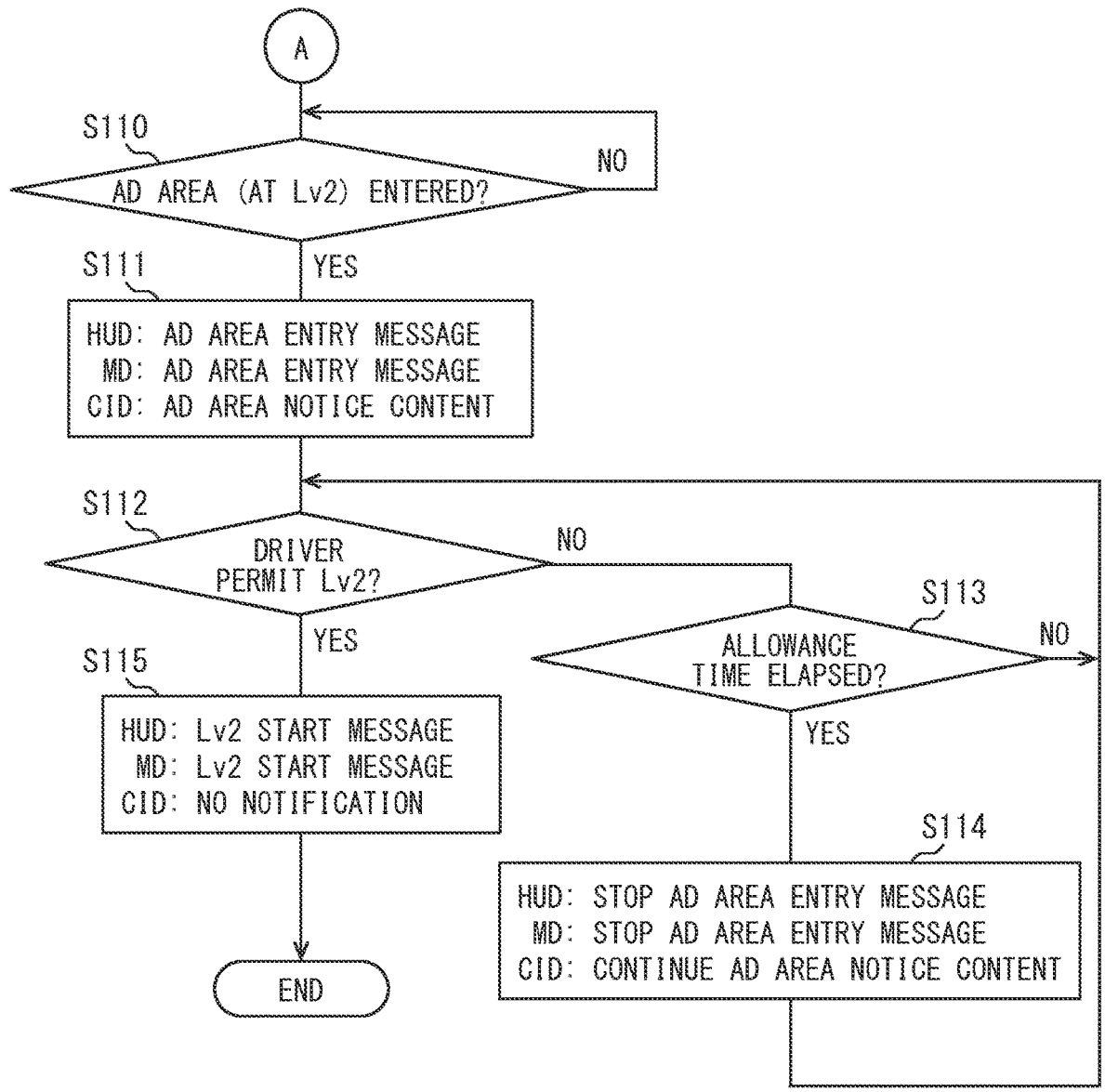
FIG. 20 is a flowchart showing an example of a presentation control method executed by the HCU.

After S103, the process proceeds to S110 in FIG. 20. In S100, the periphery state grasp unit 110 determines whether or not the vehicle has been entered the AD area. When it is determined that the vehicle has entered the AD area, the process proceeds to S111 and the AD area entry notification is executed.

Next, in S112, the drive state determination unit 120 determines whether or not the driver has permitted level 2 autonomous driving. If it is determined that the driver has not permitted, the presentation information adjustment unit 140 determines in S113 whether or not the allowable time has elapsed from the entry into the AD area. If it is determined that the allowable time has not elapsed, the process returns to S112. On the other hand, when it is determined that the allowable time has elapsed, in S114, the presentation information adjustment unit 140 stops the AD area entry notification on the HUD 21 and the meter display 22, and continues the AD area entry notification on the CID 23. Then, it returns to S112.

If it is determined in S112 that the driver has permitted level 2 autonomous driving, the process proceeds to S115. In S115, the presentation information adjustment unit 140 executes the level 2 start notification. After performing the processing in S115, the series of processing is terminated.

Figure 21:
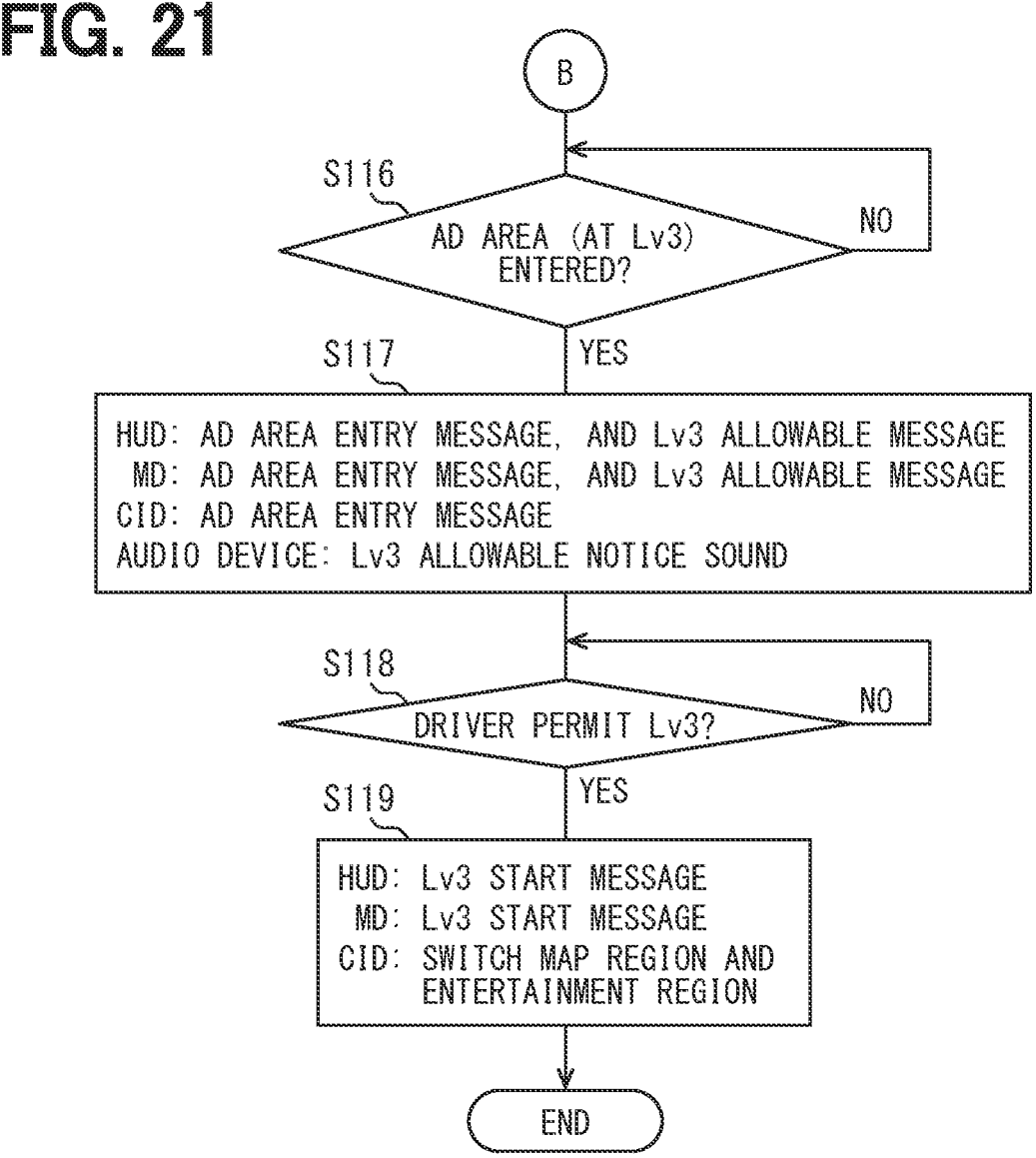
FIG. 21 is a flowchart showing an example of a presentation control method executed by the HCU.
Figure 23:
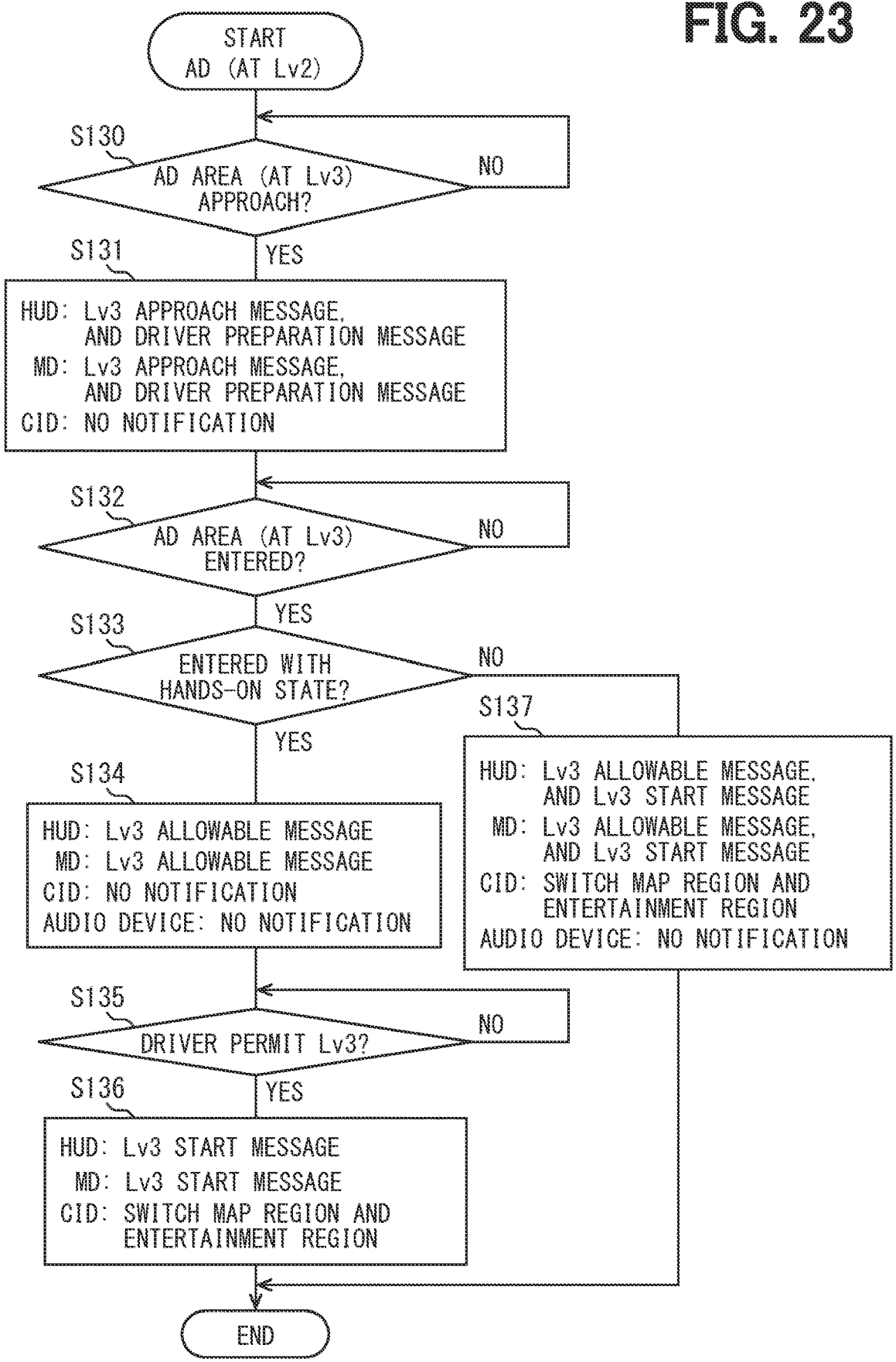
FIG. 23 is a flowchart showing an example of a presentation control method executed by the HCU.

On the other hand, if the periphery state grasp unit 110 determines in S102 of FIG. 21 that level 3 autonomous driving is possible after entering the AD area, the process proceeds to S116 of FIG. 23. In S116, the periphery state grasp unit 110 determines whether or not the vehicle has been entered the AD area. When it is determined that the vehicle has entered the AD area, the process proceeds to S117, and the presentation information adjustment unit 140 executes the AD area entry notification and the level 3 allowable notification. Next, in S118, the drive state determination unit 120 determines whether or not the level 3 start instruction has been acquired from the driver. When it is determined that the start instruction has been acquired, the presentation information adjustment unit 140 executes the level 3 start notification in S119. After performing the processing in S119, the series of processing is terminated.

Figure 22:
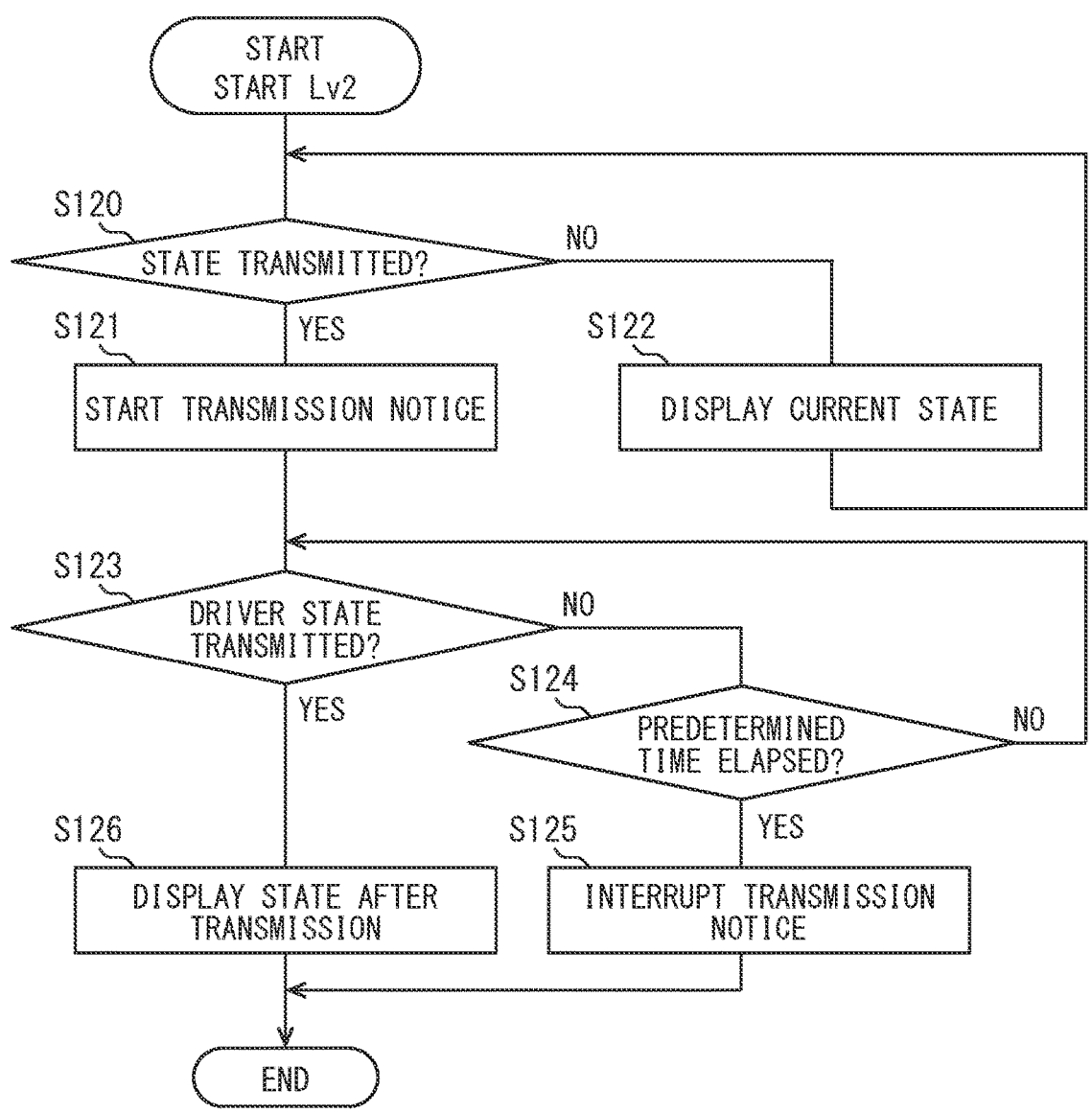
FIG. 22 is a flowchart showing an example of a presentation control method executed by the HCU.

Next, the flow of the driver state presentation control method in the level 2 autonomous driving will be described with reference to FIG. 22. First, in S120, the drive state determination unit 120 determines whether or not the state (i.e., the interruption permission state and interruption prohibition state) relating to the driver's body part has changed. If it is determined that there is no change, the display of the current state is maintained in S122. On the other hand, when it is determined that the state has changed, the presentation information adjustment unit 140 starts the state change notification in S121.

After that, in S123, the driver state estimation unit 130 determines whether or not the actual operation state of the driver has shifted to the state related to the corresponding state. If the transition has not occurred, in S124 it is determined whether or not a predetermined time has elapsed from the start of the transition notification, and if not elapsed, the process returns to S123. If it is determined that the predetermined time has elapsed, the presentation information adjustment unit 140 interrupts the transition notification in S125 and ends a series of processing. On the other hand, if it is determined in S123 that the transition has occurred, the status after the transition is displayed and a series of processes is terminated.

Next, the presentation control method in the case of transition from the level 2 autonomous driving to the level 3 autonomous driving will be described with reference to the flow of FIG. 23.

First, in S130, the periphery state grasp unit 110 determines whether or not the vehicle is approaching the ST section. If it is determined that the vehicle is not approaching the ST section, the process waits until the vehicle is approaching the ST section. When it is determined that the vehicle is approaching the ST section, the presentation information adjustment unit 140 executes the level 3 approach notification and the driver preparation notification in S131. If the driver preparation notification is unnecessary, the driver preparation notification may be interrupted.

After S131, it move to S132. In S132, the periphery state grasp unit 110 determines whether or not the vehicle has been entered the ST section. When it is determined that the vehicle has entered the ST section, the process proceeds to S133, and the drive state determination unit 120 determines whether or not the vehicle has entered the ST section under the hands-on state.

If it is determined in S133 that the vehicle has entered the ST section with the hands-on state, the process proceeds to S134. In S134, the presentation information adjustment unit 140 executes the level 3 allowable notification. Next, in S135, the drive state determination unit 120 determines whether or not the driver has instructed the level 3 autonomous driving control. When it is determined that the driver has instructed, the presentation information adjustment unit 140 executes the level 3 start notification in S136. After performing the processing in S136, the series of processing is terminated.

On the other hand, if it is determined in S133 that the vehicle has entered the ST section in the hands-off state, the process proceeds to S137. In S137, the level 3 allowable notification and the level 3 start notification are executed at the same time, and a series of processing is terminated.

Figure 24:
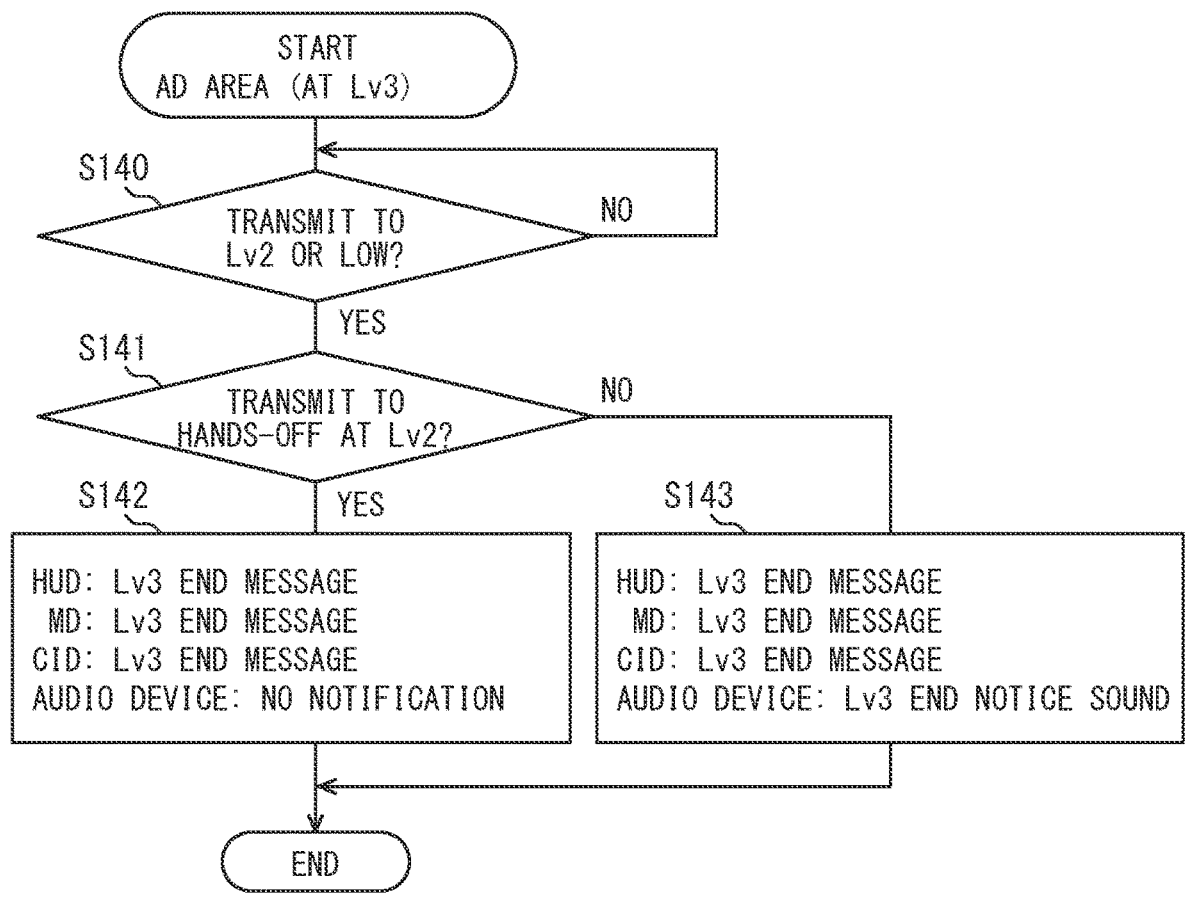
FIG. 24 is a flowchart showing an example of a presentation control method executed by the HCU.

Next, the presentation control method when the level 3 autonomous driving ends will be described with reference to the flow of FIG. 24.

In S140, the drive state determination unit 120 determines whether or not to transition to the drive control of level 2 or lower. If it is determined that the transition is made, the process proceeds to S141, and the drive state determination unit 120 determines whether or not to transition to the level 2 hands-off permission state. When it is determined that the state shifts to the level 2 hands-off permission state, the process proceeds to S142, and the presentation information adjustment unit 140 executes the level 3 end notification. Specifically, the display device displays the level 3 end message N7m. After the execution of the processing of S142, a series of processing is terminated.

On the other hand, if it is determined in S141 that the state is transitioned to the state other than the level 2 hands-off state, that is, it is determined that the state is transitioned to one of the level 2 hands-on state, the level 1 state and the level 0 (i.e., the manual operation state), the process proceeds to S143. In S143, the presentation information adjustment unit 140 executes the level 3 end notification. Specifically, in addition to the level 3 end message N7m on the display device, the level 3 end notification sound output on the audio device 24 is executed.

The above-mentioned S116, S132, S133, S134, S135, S136, S137 are examples of the "determination process", and S117, S119, S134, S136, S137 are examples of the "presentation control process".

According to the above first embodiment, when transitioning from the both prohibition state to the specific action permission state, the level 3 allowable notification is presented prior to the level 3 start notification. Then, when transitioning from the hands-off permission state to the specific action permission state, the level 3 allowable notification and the level 3 start notification are presented at the same time. Therefore, in the case of the transition from the hands-off permission state to the specific action permission state, which is likely to have been released the hands from the steering wheel in advance, the driver can be made to recognize the level 3 allowable notification and the level 3 start notification at the same time. From the above, it is possible to present highly convenient information.

According to the above first embodiment, when transitioning from the autonomous driving prohibition state to the specific action permission state, the level 3 allowable notification is presented prior to the level 3 start notification. Then, when transitioning from the hands-off permission state to the specific action permission state, the level 3 allowable notification and the level 3 start notification are presented at the same time. Therefore, in the case of the transition from the hands-off permission state to the specific action permission state, which is likely to have been released the hands from the steering wheel in advance, the driver can be made to recognize the level 3 allowable notification and the level 3 start notification at the same time. From the above, it is possible to present highly convenient information.

Second Embodiment

The second embodiment will be described as a modification of the HCU 100 described in the first embodiment. In the second embodiment, when transitioning from the level 3 permission state to the level 2 permission state, the presentation information adjustment unit 140 controls the audio device 24 to output the transition notification sound even in the transition to the hands-off permission state. That is, when transitioning from the level 2 permission state to the level 3 permission state, the presentation information adjustment unit 140 notifies by the display device. Then, when transitioning from the level 3 permission state to the level 2 permission state, the presentation information adjustment unit 140 notifies using the audio device 24 in addition to the notification by the display device.

As a result, the presentation information adjustment unit 140 presents the information on each transition in different presentation modes depending on a case where the state in which the second task is prohibited is transitioned to the state in which the second task is permitted (that is the permission transition) and a case where the state in which the second task is permitted is transitioned to the state in which the second task is prohibited (that is the prohibition transition). In particular, in the present embodiment, the information regarding the prohibition transition is presented with more emphasis than the information regarding the permission transition.

Figure 25:
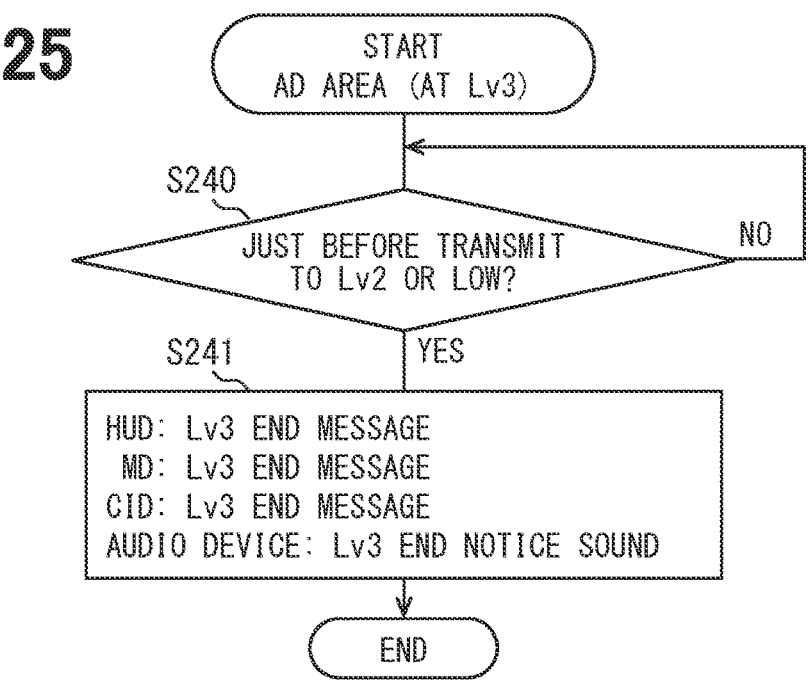
FIG. 25 is a flowchart showing an example of a presentation control method executed by the HCU in the second embodiment.

In the second embodiment, the flow of the presentation control method executed by the HCU 100 will be described below with reference to FIG. 25. The process of S240 is the same as the process of S140 in the first embodiment. When it is determined in S240 that the vehicle shifts to the level 2 or lower driving operation, the presentation information adjustment unit 140 executes the level 3 end notification in S241. Specifically, in addition to the display of the level 3 end message by each display device, the level 3 end sound output by the audio device 24 is executed. After performing the processing in S241, the series of processing is terminated.

In the second embodiment, the above-mentioned S132 and S240 are examples of the "determination process", and S134, S137 and S241 are examples of the "presentation control process".

According to the second embodiment described above, the prohibition transition information regarding the transition from the specific action permission state to the specific action prohibition state is presented in the presentation mode emphasized more than the permission transition information regarding the transition from the specific action prohibition state to the specific action permission state. Therefore, the driver can more reliably recognize the transition from the specific action permission state to the specific action prohibition state, which requires more attention. From the above, it is possible to present highly convenient information.

In addition, instead of or in addition to the level 3 end sound output, the presentation information adjustment unit 140 may display the level 3 end message in the prohibited transition in a display mode emphasized more than the level 3 end message in the permission transition. For example, the presentation information adjustment unit 140 may emphasize the level 3 end message more than the permission transition by changing the display color, size, and the like of the level 3 end message.

Third Embodiment

The third embodiment will be described as a modification of the HCU 100 described in the first embodiment. In the third embodiment, the second autonomous driving ECU 70 shifts to the autonomous driving of level 3 or higher when the level 2 hands-off is permitted and there is no override by the driver, that is, the hands-off state is actually achieved.

In this case, when it is determined that the driver state is the hands-on state in the hands-off permission state, the presentation information adjustment unit 140 executes a transition disable notification for notifying that the vehicle system can not transition to the autonomous driving of level 3 or higher. In the transition disable notification, for example, a message image is displayed on the HUD 21 and the meter display 22. The message image may directly describe that the transition is not possible, or indirectly indicate that the transition is not possible by describing that the transition can be allowable to level 3 if the hands-off operation is performed.

Even if the driver operates the steering wheel in the level 2 hands-off state, the level 2 hands-off state is maintained up to a predetermined torque amount. On the other hand, when the torque is equal to or more than a predetermined amount, an override state is set.

Figure 26:
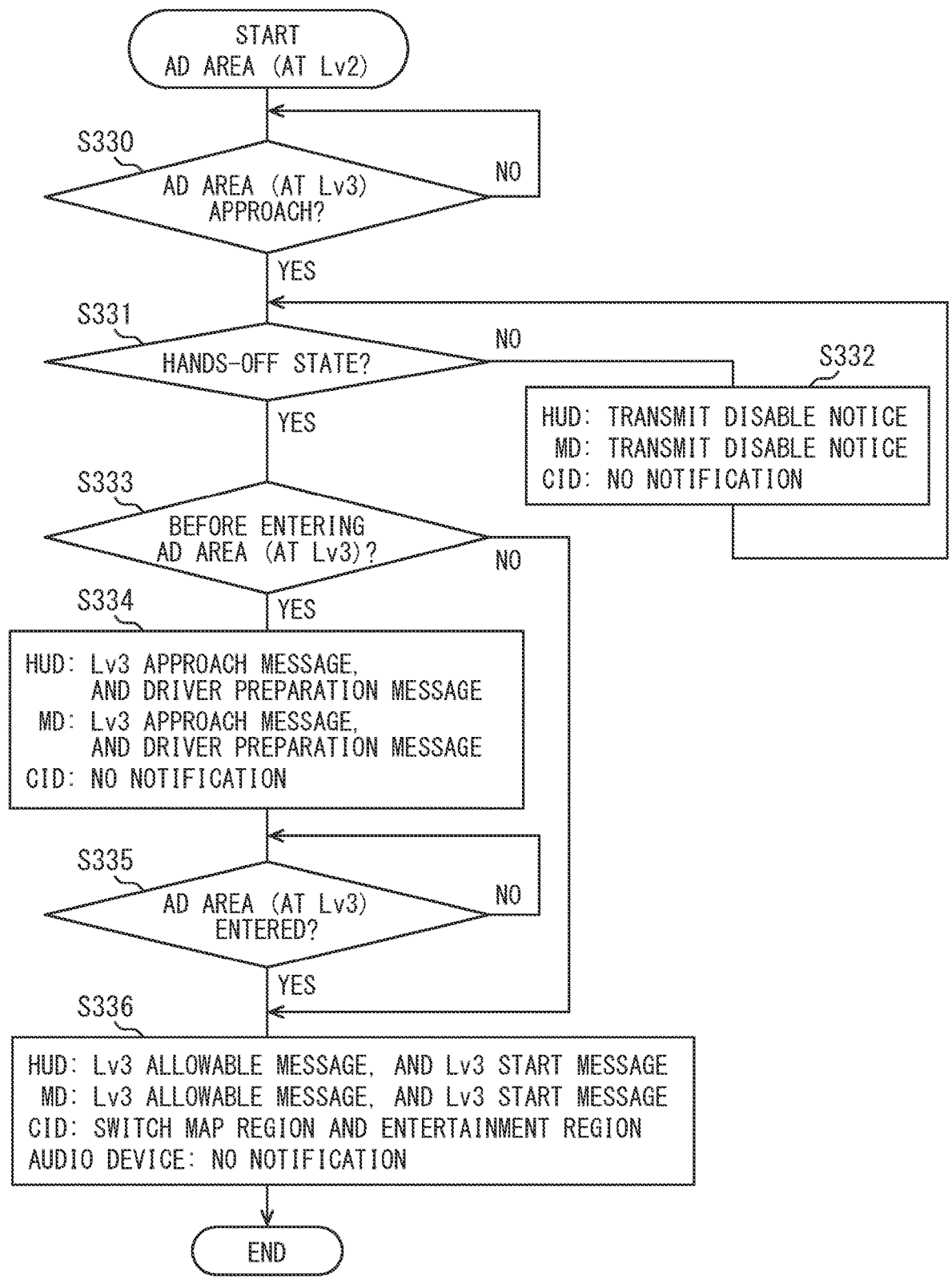
FIG. 26 is a flowchart showing an example of a presentation control method executed by the HCU in the third embodiment.

In the third embodiment, the flow of the presentation control method executed by the HCU 100 will be described below with reference to FIG. 26. The process of S330 is the same as the process of S130 in the first embodiment. When the approach of the ST section is determined in S330, the driver state estimation unit 130 determines in S331 whether or not the current driver state is in the hands-off state. If it is determined that the state is not in the hands-off state (the state is in the hands-on state), the presentation information adjustment unit 140 executes the transition disable notification in S332.

On the other hand, if it is determined in S331 that it is in the hands-off state, in S333, the periphery state grasp unit 110 determines whether or not it is before entering the ST section at the stage where it is in the hands-off state. If it is determined that the vehicle has not entered the ST section, the process proceeds to S334. S334 is the same as the processing of S131. In S335, the periphery state grasp unit 110 determines whether or not the vehicle has been entered the ST section. If it is determined that the vehicle has entered the ST section, the process proceeds to S336. S336 is the same as the processing of S137. On the other hand, if it is determined in S333 that the vehicle has already entered the ST section at the stage of the hands-off state, S334 and S335 are skipped and the process proceeds to S336. After performing the processing in S336, the series of processing is terminated.

In the present embodiment, the presentation information adjustment unit 140 is configured to present the transition disable notification before entering the ST section, alternatively, the unit 140 may present the notification after entering the ST section. Further, in the present embodiment, the presentation information adjustment unit 140 presents a transition disable notification when the vehicle is not in the hands-off state while approaching the ST section. Instead of this, if the driver state is the hands-on state in the hands-off permission state, the presentation information adjustment unit 140 may be configured to present a transition disable notification regardless of whether or not the vehicle is approaching the ST section.

Fourth Embodiment

In the level 3 end notification of the above-described embodiment, the presentation information adjustment unit 140 causes the audio device 24 to present the level 3 allowable notification sound when the first transition occurs, so that the information regarding the first transition can be presented to the driver to be emphasized more that the information relating to the second transition. Instead of this, the presentation information adjustment unit 140 may emphasize the information relating to the first transition more than the information relating to the second transition by setting the level 3 allowable messages N5h and N5m to be displayed on the display device in the first transition into a display mode in which the level 3 allowable messages N5h and N5m are emphasized more than the second transition. For example, the presentation information adjustment unit 140 may emphasize the level 3 allowable messages N5h and N5m more than the second transition by changing the display color, size and the like of the level 3 allowable messages N5h and N5m.

Fifth Embodiment

Figure 27:
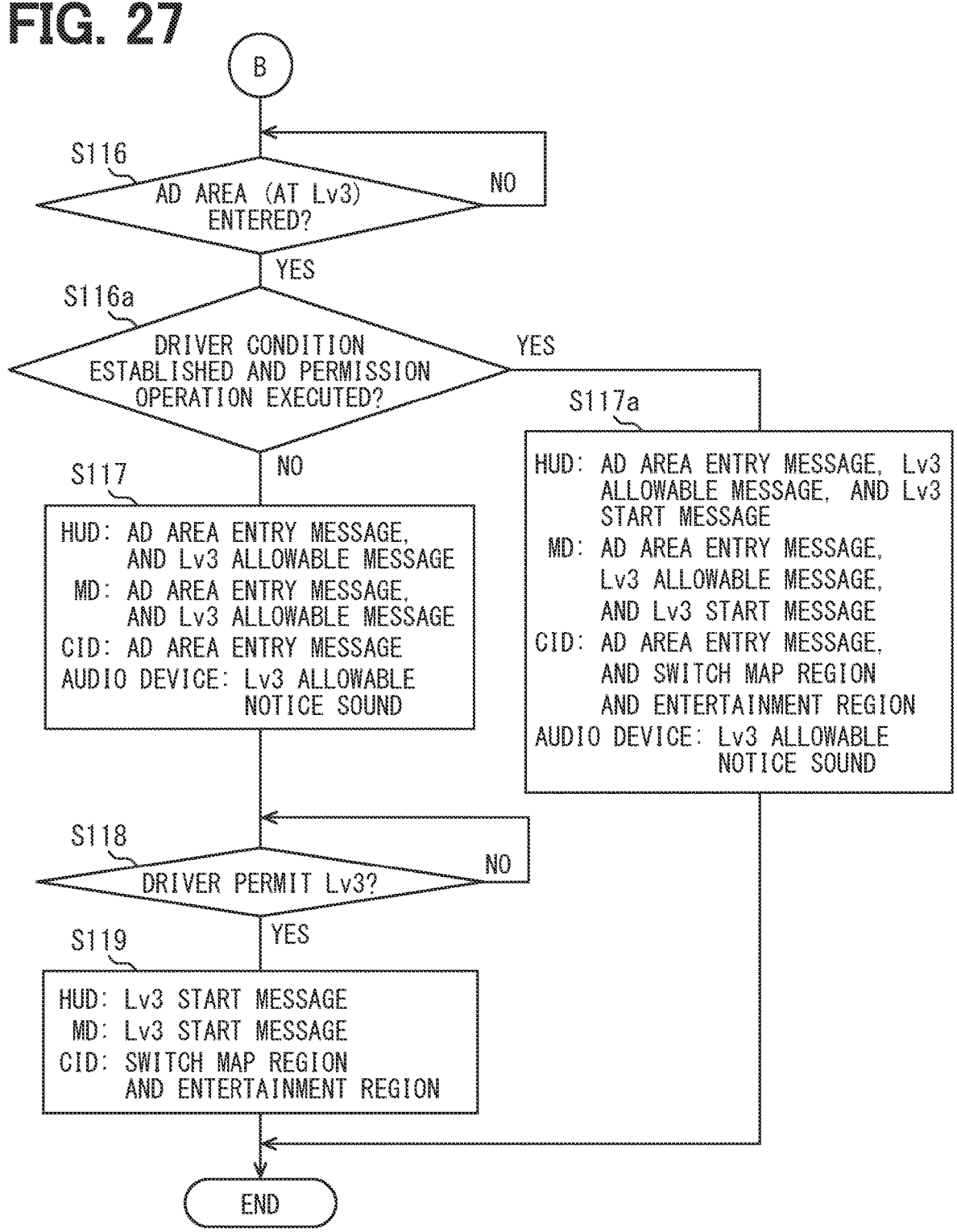
FIG. 27 is a flowchart showing an example of a presentation control method executed by the HCU in the fifth embodiment.
Figure 28:
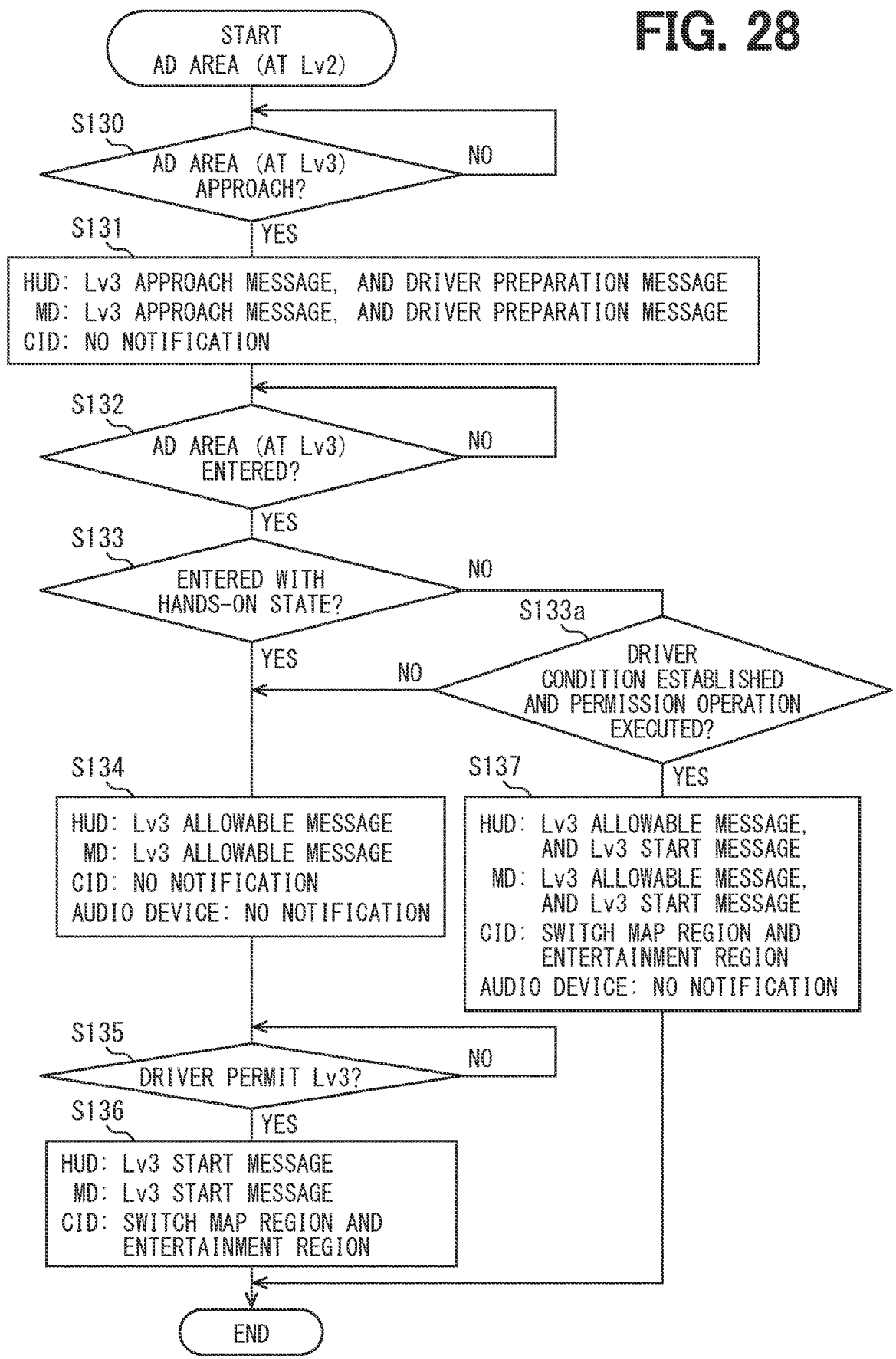
FIG. 28 is a flowchart showing an example of a presentation control method executed by the HCU in the fifth embodiment.

The fifth embodiment will be described as a modification of the HCU 100 described in the first embodiment. In FIGS. 27 and 28, components denoted by the same reference symbols as those in the drawings of the first embodiment are similar components and exhibit the same operation and effects.

In the fifth embodiment, the presentation information adjustment unit 140 determines whether the driver condition for executing the level 3 driving operation by the driver is established, and the driver has executed the start operation of the autonomous driving level 3 before entering the AD area where the autonomous driving level 3 is allowable. The presentation information adjustment unit 140 may perform the determination based on the information of the determination result about the driver condition from the driver state estimation unit 130 and the input information of the operation device 26 from the drive state determination unit 120. When it is determined that the driver condition is satisfied and the start operation has been executed, the presentation information adjustment unit 140 simultaneously executes the level 3 start notification and the level 3 allowable notification. On the other hand, when a negative determination is made for at least one of the establishment of the driver condition and the execution of the start operation, the presentation information adjustment unit 140 presents the level 3 allowable notification prior to the level 3 start notification. The level 3 start notification and the level 3 allowable notification may be presented at the same time as one notification or may be presented as different notifications at the same time.

The process executed by the HCU 100 in the fifth embodiment will be described with reference to the flows of FIGS. 27 and 28. First, when it is determined in S116 of FIG. 27 that the vehicle has entered the AD area, this flow shifts to S116a. In S116a, the presentation information adjustment unit 140 determines whether or not the driver condition is satisfied and the start operation of the autonomous driving level 3 has been executed. When a negative determination is made for either the satisfaction of the driver condition or the execution of the start operation, this flow shifts to S117.

On the other hand, when it is determined that the driver condition is satisfied and the start operation has been executed, this flow shifts to S117a. In S117a, the presentation information adjustment unit 140 simultaneously presents a level 3 allowable notification and a level 3 start notification in addition to the AD area entry notification. When the process of S117a is executed, this flow ends.

If it is determined in S133 of FIG. 28 that the vehicle has entered the ST section in the hands-off state, this flow shifts to S133a. In S133a, the presentation information adjustment unit 140 determines whether or not the driver condition is satisfied and the start operation of the autonomous driving level 3 has been executed. When a negative determination is made for either the satisfaction of the driver condition or the execution of the start operation, this flow shifts to S134.

On the other hand, when it is determined that the driver condition is satisfied and the start operation has been executed, this flow shifts to S137a. In S137a, the presentation information adjustment unit 140 presents the level 3 allowable notification and the level 3 start notification at the same time. When the process of S137a is executed, this flow ends. In this flow, the above-mentioned S116a and S133a are examples of the "determination process", and S117, S117a, S119, S134, S136 and S137 are examples of the "presentation control process".

According to the fifth embodiment described above, when it is determined that the driver condition is satisfied and the start operation has been executed, the level 3 start notification and the level 3 allowable notification are executed at the same time. Therefore, in a situation where the autonomous driving level 3 can be executed immediately, the level 3 start notification can be recognized by the driver together with the level 3 allowable notification. Therefore, it may be possible to present highly convenient information.

Sixth Embodiment

Figure 29:
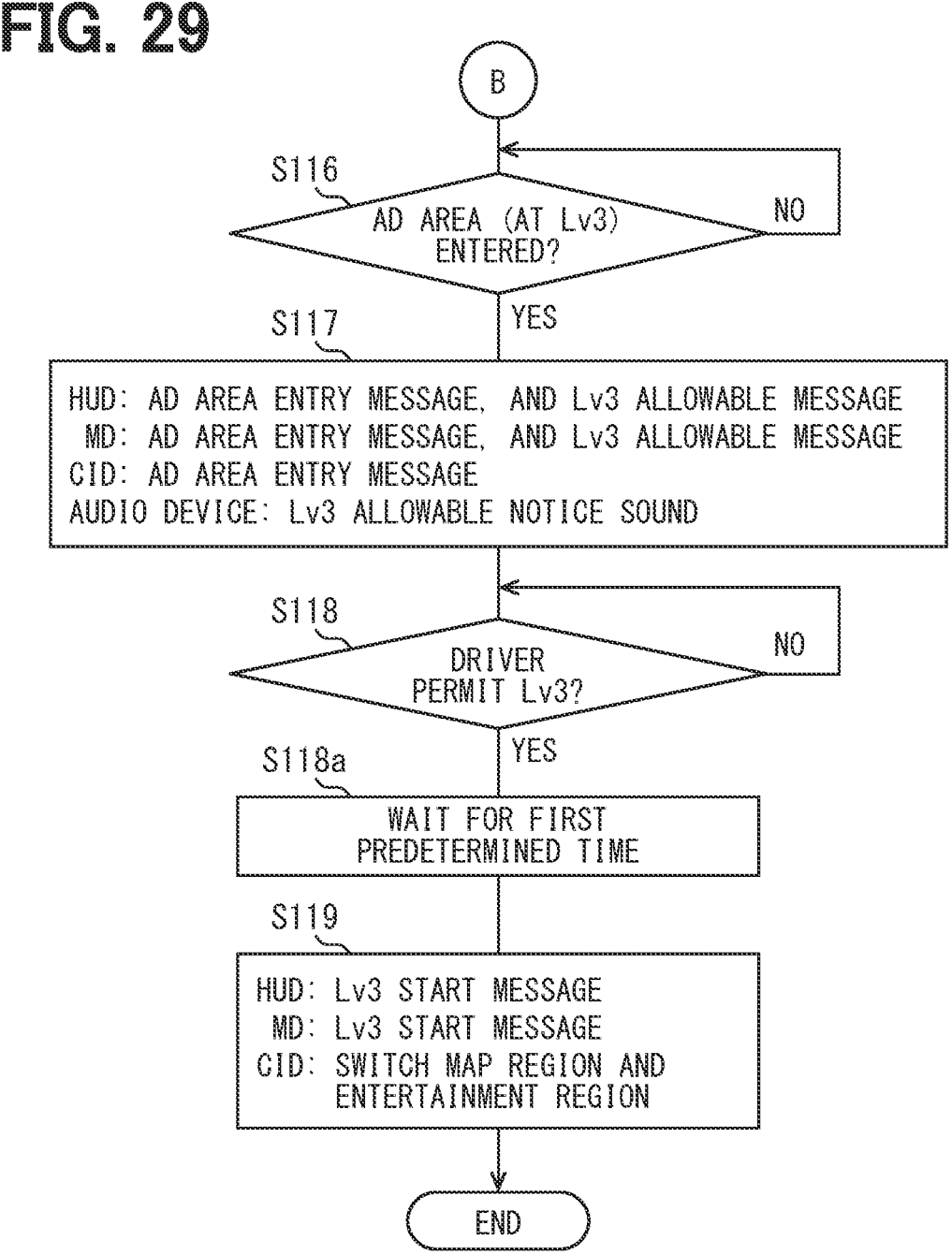
FIG. 29 is a flowchart showing an example of a presentation control method executed by the HCU in the sixth embodiment.
Figure 30:
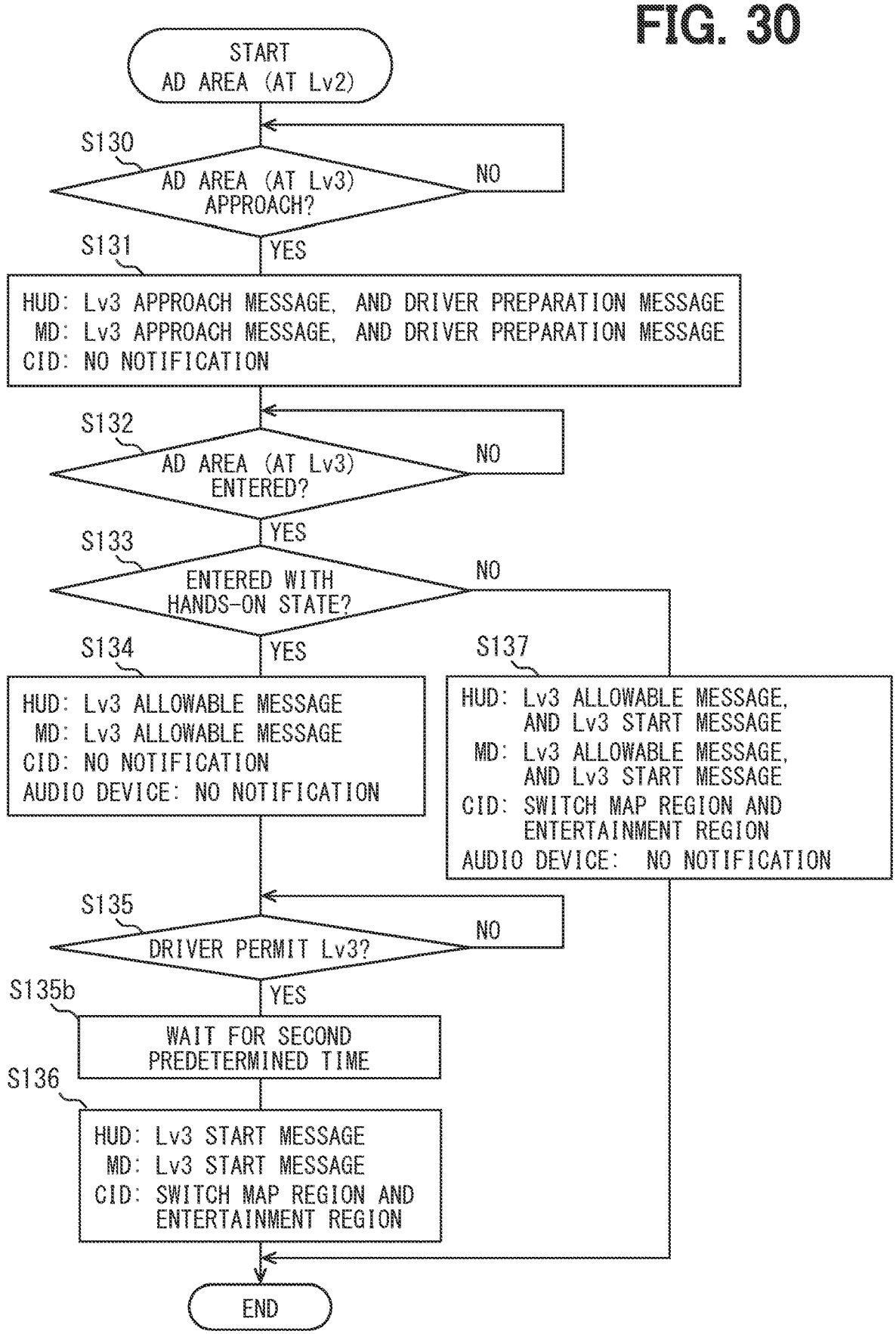
FIG. 30 is a flowchart showing an example of a presentation control method executed by the HCU in the sixth embodiment.

The sixth embodiment will be described as a modification of the HCU 100 described in the first embodiment. In FIGS. 29 and 30, components denoted by the same reference symbols as those in the drawings of the first embodiment are similar components and exhibit the same operation and effects.

In the sixth embodiment, the presentation information adjustment unit 140 changes the execution timing of the level 3 start notification according to the immediately preceding autonomous driving level. For example, the presentation information adjustment unit 140 increases the time difference between the time when the execution of the autonomous driving level 3 is permitted and the time when the level 3 start notification is executed, as the level of the autonomous driving immediately before is lower. Further, the presentation information adjustment unit 140 increases the time difference, between the time when the execution of the autonomous driving level 3 is permitted and the time when the level 3 start notification is executed, in a case where the immediately preceding autonomous driving level is the autonomous driving level 2 and the vehicle is in the hands-on state, to be larger than a case where the immediately preceding autonomous driving level is the autonomous driving level 2 and the vehicle is in the hands-off state.

Specifically, when the immediately preceding autonomous driving level is level 0, that is, the manual operation level, the presentation information adjustment unit 140 stands by for a first predetermined time (for example, about 10 seconds) after the execution of autonomous driving level 3 is permitted. After waiting, the presentation information adjustment unit 140 executes the level 3 start notification. Then, when the autonomous driving level immediately before is level 2 and the vehicle is in the hands-on state, the presentation information adjustment unit 140 stands by for a second predetermined time (for example, about 5 seconds), which is slightly smaller than the first predetermined time, after the execution of autonomous driving level 3 is permitted. After waiting, the presentation information adjustment unit 140 executes the level 3 start notification. When the autonomous driving level immediately before is level 2 and the hands-off state is set, the presentation information adjustment unit 140 may execute the level 3 start notification at the time of entering the ST section as in the first embodiment.

The process executed by the HCU 100 in the sixth embodiment will be described with reference to the flows of FIGS. 29 and 30. First, in S118 of FIG. 29, when the drive state determination unit 120 determines that the level 3 start instruction has been acquired from the driver, this flow shifts to S118a. In S118a, the presentation information adjustment unit 140 waits for the execution of the level 3 start notification for the first predetermined time. After that, this flow shifts to S119, and the level 3 start notification is executed.

In S135 of FIG. 30, when the drive state determination unit 120 determines that the driver has instructed the level 3 autonomous driving control, that is, has executed the start operation of the autonomous driving level 3, this flow shifts to S135b. In S133a, the presentation information adjustment unit 140 waits for the execution of the level 3 start notification for a second predetermined time. After that, this flow shifts to S136, and the level 3 start notification is executed. In this flow, in addition to the steps of the first embodiment, S118a and S135b are included in an example of the "presentation control process".

According to the sixth embodiment described above, the execution timing of the level 3 start notification is changed according to the immediately preceding autonomous driving level. Therefore, the level 3 allowable notification can be recognized by the driver at a timing suitable for the driver's state estimated from the immediately preceding autonomous driving level. Therefore, it may be possible to present highly convenient information.

Seventh Embodiment

Figure 31:
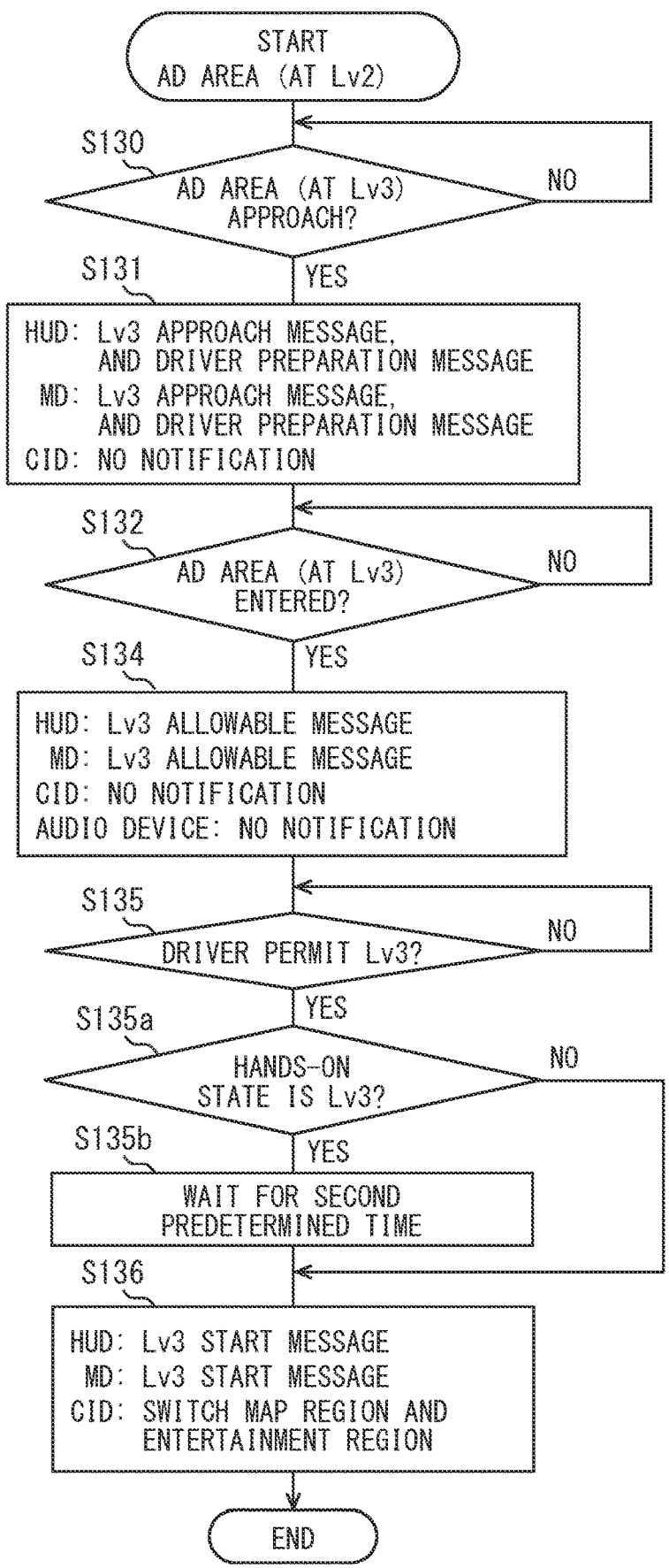
FIG. 31 is a flowchart showing an example of a presentation control method executed by the HCU in the seventh embodiment.

The seventh embodiment will be described as a modification of the HCU 100 described in the first embodiment. In FIG. 31, components denoted by the same reference symbols as those in the drawings of the first embodiment are similar components and exhibit the same operation and effects.

In the seventh embodiment, the drive state determination unit 120 permits the transition to the autonomous driving level 3 when it is determined that the driver has executed the permission operation even in the hands-off state of the autonomous driving level 2. Further, in the seventh embodiment, the presentation information adjustment unit 140 changes the execution timing of the level 3 start notification according to the immediately preceding autonomous driving level, as in the sixth embodiment. In this case, if the state immediately before the autonomous driving level 3 is permitted is the autonomous driving level 2 and the hands-off state, the presentation information adjustment unit 140 executes the level 3 start notification at substantially the same time as the permission operation of the autonomous driving level 3. As a result, the level 3 start notification is executed earlier than the case where the immediately preceding state is the hands-on state of the autonomous driving level 2. It should be noted that the drive state determination unit 120 may determine whether or not the state immediately before the autonomous driving level 3 is permitted is the autonomous driving level 2 and the hands-off state.

The process executed by the HCU 100 in the seventh embodiment will be described with reference to the flows of FIG. 31. In FIG. 31, when the periphery state grasp unit 110 determines in S132 that the vehicle has entered the ST section, this flow shifts to S134. After that, when the drive state determination unit 120 determines in S135 that the driver has instructed the level 3 autonomous driving control, this flow shifts to S135a.

In S135a, the drive state determination unit 120 determines whether or not the state immediately before the permission operation is the hands-on state. If it is determined that the hands-on state has been established, the flow proceeds to S136 after passing through S135b. On the other hand, if it is determined that the state immediately before the permission operation is the hands-off state, this flow skips S135b and shifts to S136a. In this flow, in addition to the steps of the first embodiment, S118a and S135b are included in an example of the "presentation control process".

Eighth Embodiment

Figure 32:
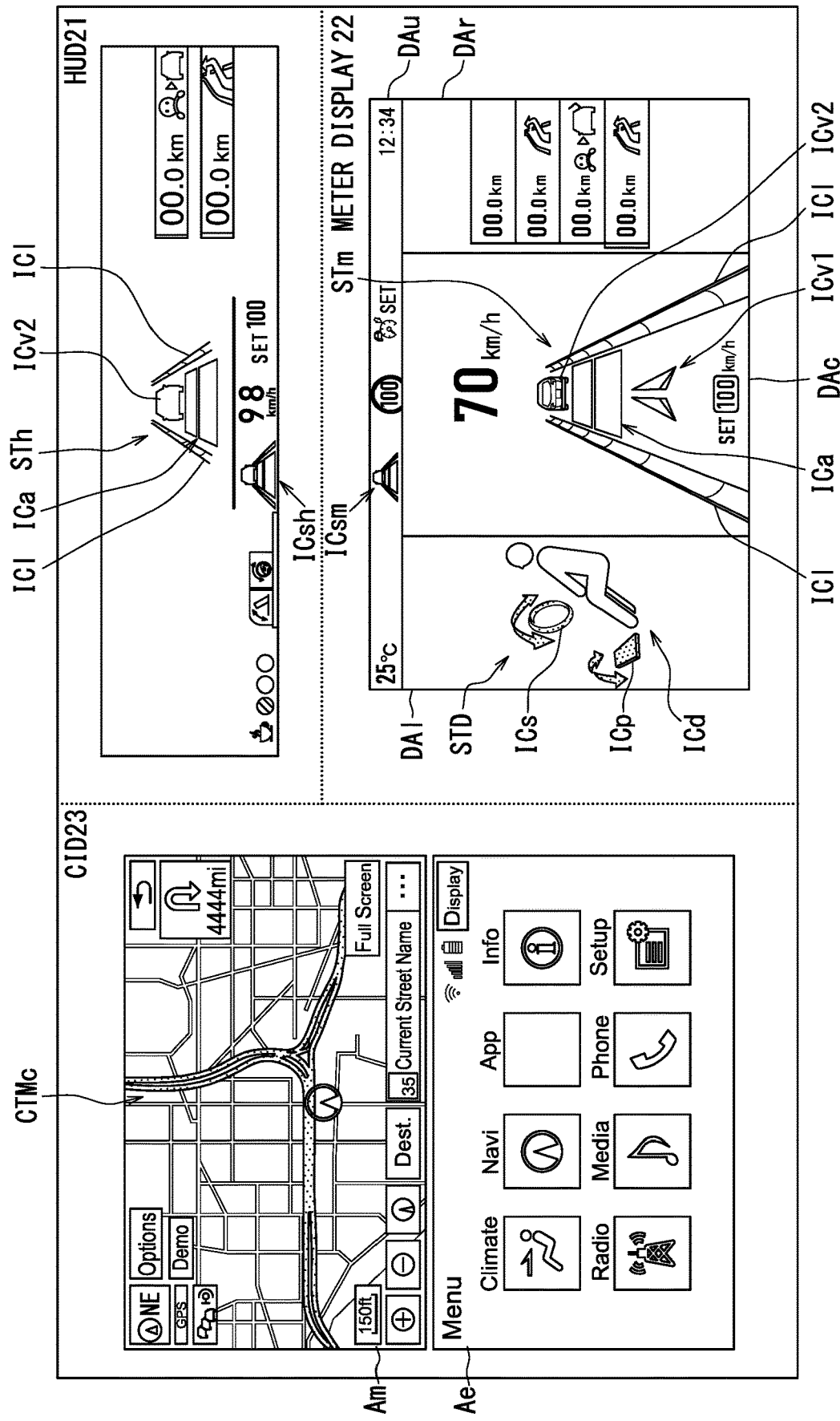
FIG. 32 is a diagram showing an example of information presentation in the eighth embodiment.
Figure 33:
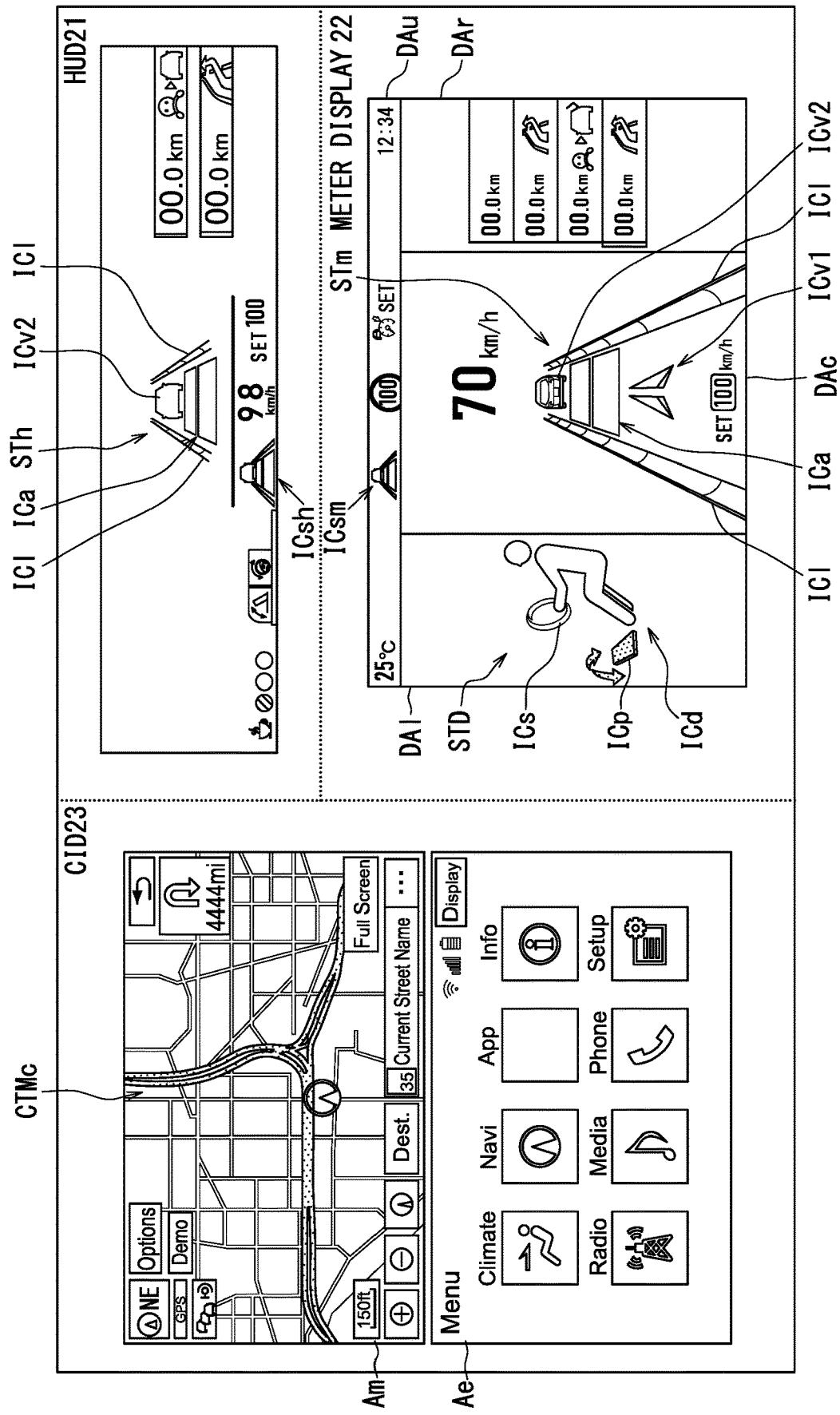
FIG. 33 is a diagram showing an example of information presentation in the eighth embodiment.

The eighth embodiment will be described as a modification of the HCU 100 described in the first embodiment. In FIGS. 32 and 33, components denoted by the same reference symbols as those in the drawings of the first embodiment are similar components and exhibit the same operation and effects.

In the eighth embodiment, the presentation information adjustment unit 140 provides the presentation method for the state transition between the interruption prohibition state and the interruption permission state for each body part of the driver, which is different from the first embodiment. Specifically, the presentation information adjustment unit 140 presents the state transition by highlighting and displaying the icon corresponding to the vehicle member operated by the body part of the driver instead of highlighting and displaying the display part corresponding to the body part whose state changes in the driver icon ICd.

For example, the presentation information adjustment unit 140 highlights the steer icon ICs when the state transition from the hands-off prohibition state to the hands-off permission state is made (see FIG. 32). Further, the presentation information adjustment unit 140 highlights the pedal icon ICp when the transition from the leg-off prohibition state to the leg-off permission state is made (see FIG. 33).

Other Embodiments

The disclosure in the present specification is not limited to the above-described embodiments. The present disclosure includes embodiments described above and modifications of the above-described embodiments made by a person skilled in the art. For example, the present disclosure is not limited to a combination of the components and/or elements described in the embodiments. The present disclosure may be executed by various different combinations. The present disclosure may include additional configuration that can be added to the above-described embodiments. The present disclosure also includes modifications which include partial components/elements of the above-described embodiments. The present disclosure includes replacements of components and/or elements between one embodiment and another embodiment, or combinations of components and/or elements between one embodiment and another embodiment. The disclosed technical scope is not limited to the description of the embodiment.

In the above-described embodiment, the presentation information adjustment unit 140 presents the auditory information by the audio device 24 as the information of the specific mode different from the visual information, but the information of the specific mode may not be limited to this feature. For example, the presentation information adjustment unit 140 may be configured to present tactile information. Specifically, the presentation information adjustment unit 140 presents tactile information by vibrating a vibrating member provided in a seat on which the driver sits, a steering wheel, a seatbelt device, or the like. The presentation information adjustment unit 140 may emphasize the information presentation by presenting both the auditory information and the tactile information. Further, the presentation information adjustment unit 140 may combine the visual information of the emphasized display mode with the auditory information and/or the tactile information.

Figure 34:
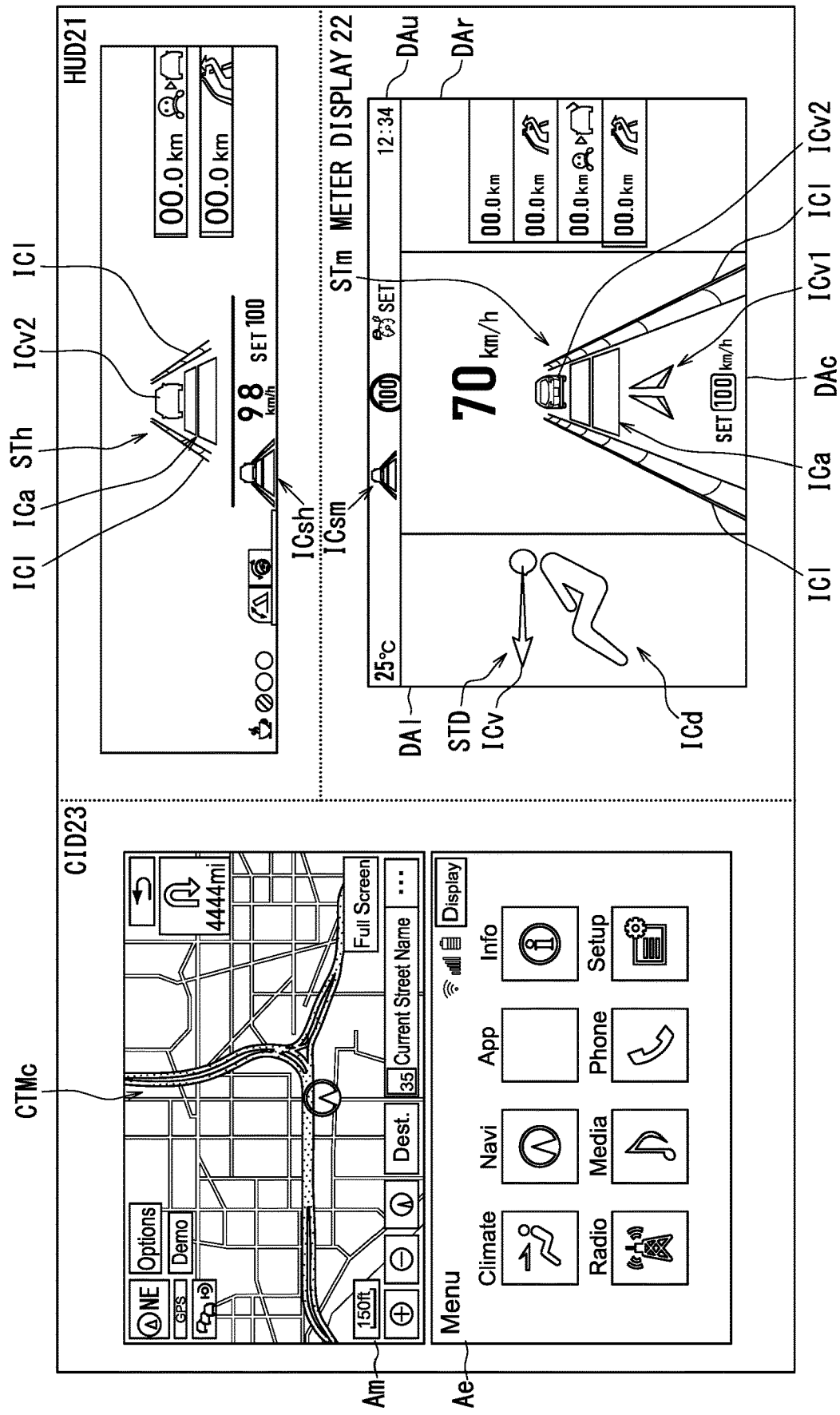
FIG. 34 is a diagram showing an example of information presentation in another embodiment.

As a modification of the above-described embodiment, the presentation information adjustment unit 140 may present the display portion of the driver icon ICd corresponding to the limbs and feet in a state where eyes-off is prohibited and hands-off and leg-off are permitted without highlighting (see FIG. 34). In this case, the presentation information adjustment unit 140 may set the driver icon ICd in a sitting posture in which the driver does not operate the steering wheel and pedals. Further, the presentation information adjustment unit 140 may hide the steer icon ICs and the pedal icon ICp.

Figure 35:
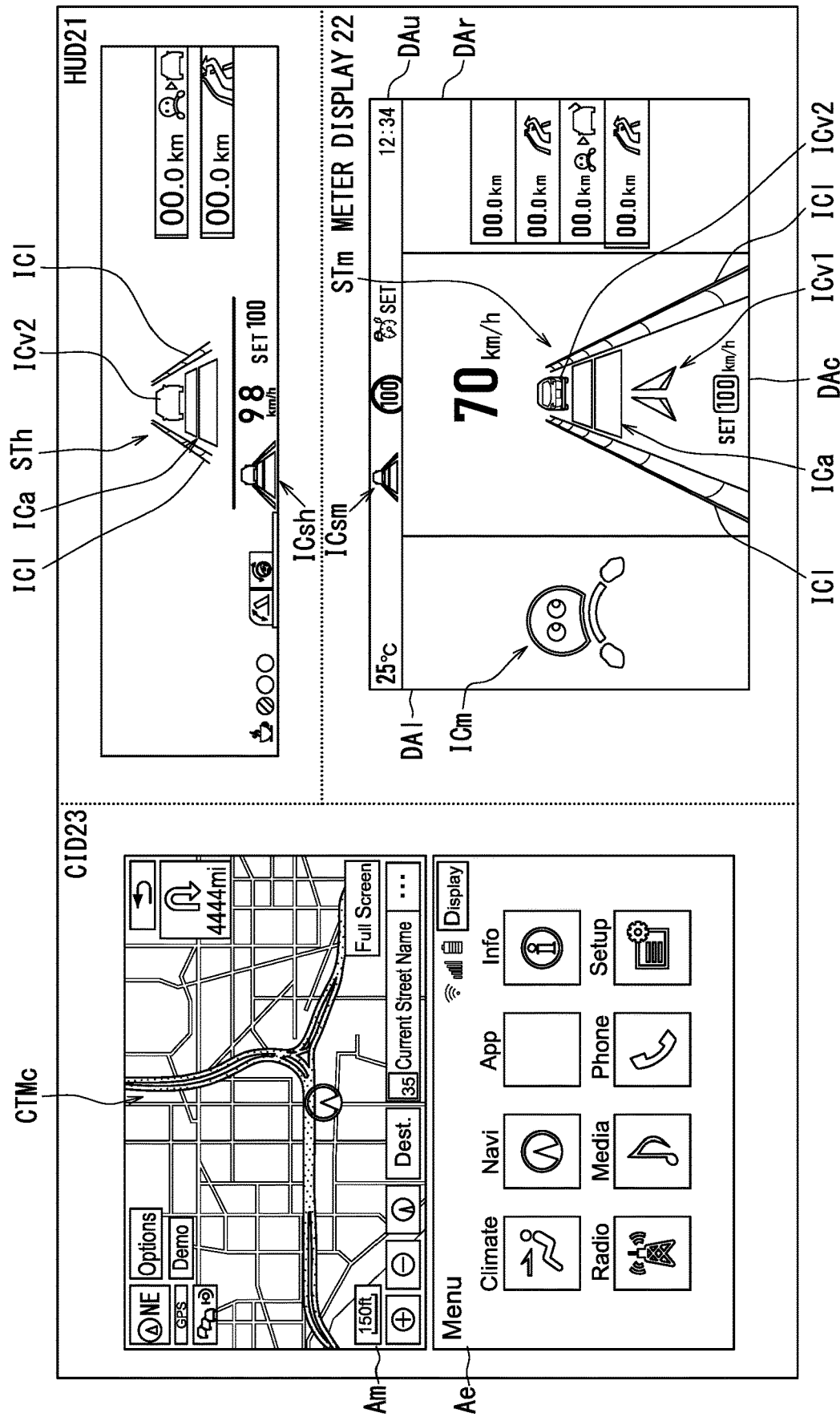
FIG. 35 is a diagram showing an example of information presentation in another embodiment.

As a modification of the above-described embodiment, the presentation information adjustment unit 140 may present a state in which eyes-off is prohibited and hands-off and leg-off are permitted using the periphery monitoring icon ICm instead of the driver status STD. Periphery monitoring icon ICm is an icon that schematically represents the state of monitoring the surroundings. The periphery monitoring icon ICm may be, for example, an icon that imitates the face of a person who looks at the surroundings, as shown in FIG. 35.

Figure 36:
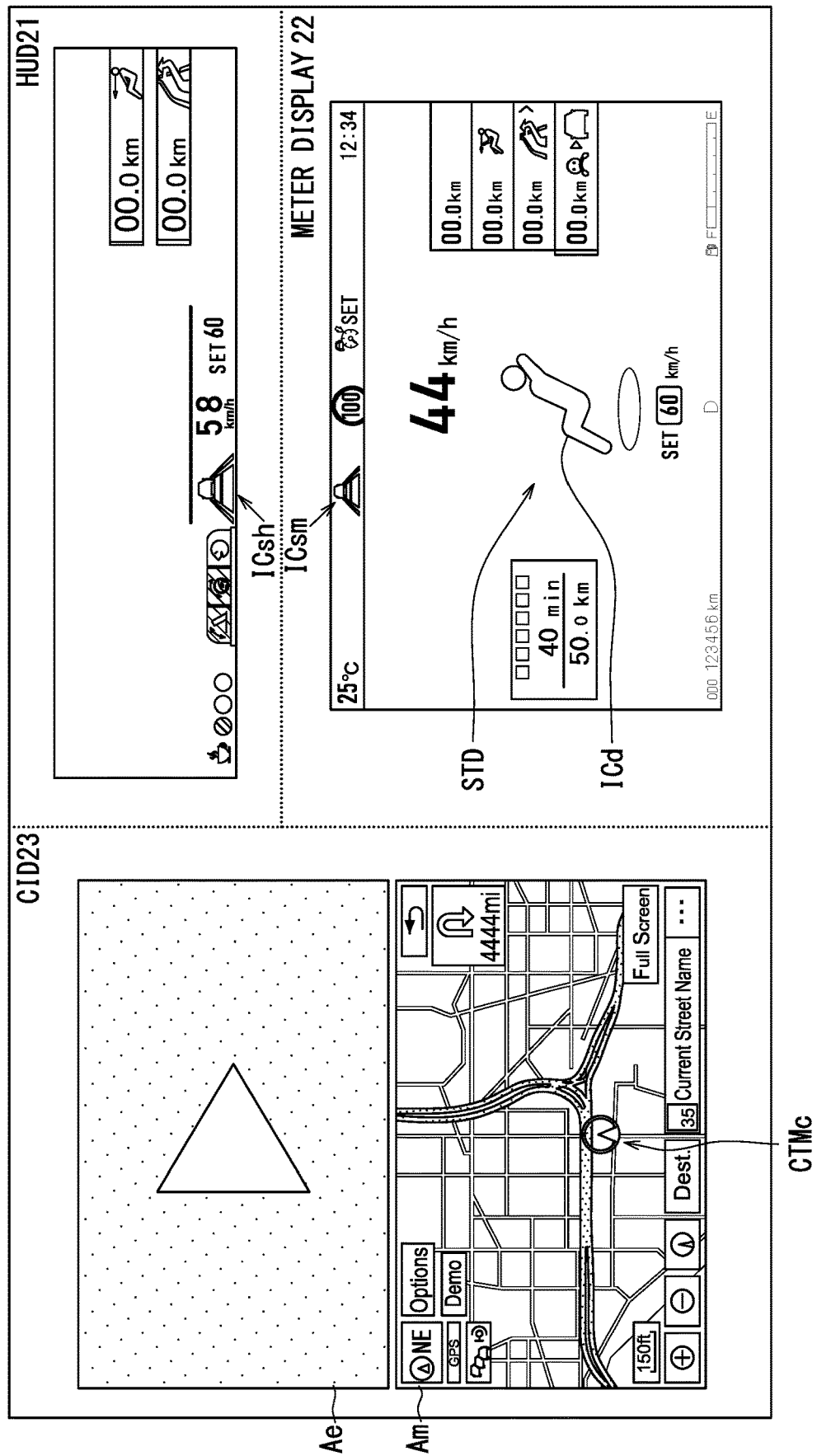
FIG. 36 is a diagram showing an example of information presentation in another embodiment.
Figure 37:
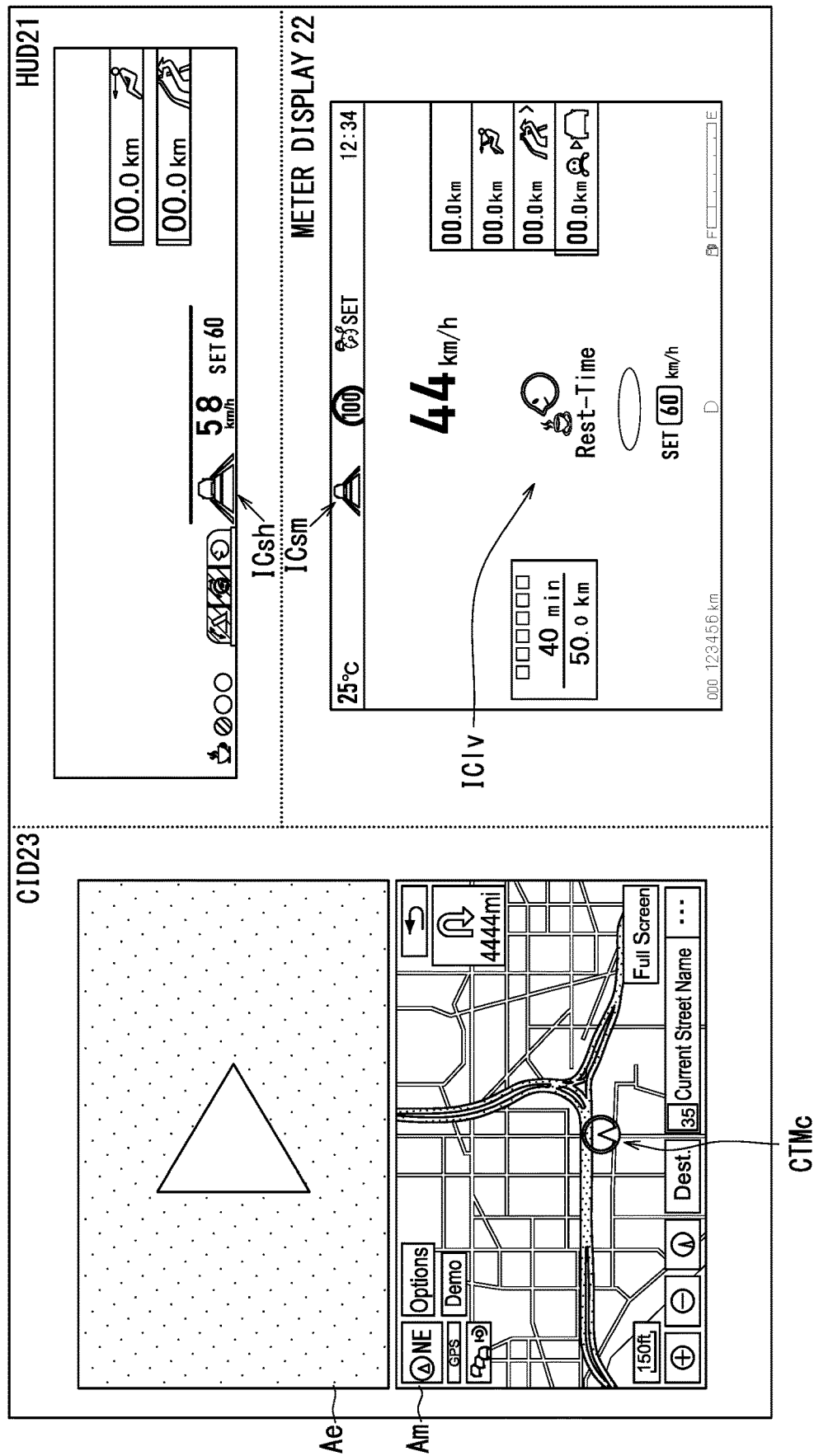
FIG. 37 is a diagram showing an example of information presentation in another embodiment.

As a modification of the above-described embodiment, the presentation information adjustment unit 140 may omit the chair icon ICc in the driver status STD in a state where eyes-off, hands-off, and leg-off are permitted (i.e., the level 3 execution state) (see FIG. 36). Further, the presentation information adjustment unit 140 may omit the musical note-shaped icon shown in FIG. 17 or the like. Further, as shown in FIG. 37, the presentation information adjustment unit 140 may display the level 3 status icon IClv indicating a state that eyes-off, hands-off, and leg-off are permitted, instead of the driver status STD including a driver icon ICd representing the whole body of a person. The level 3 state icon IClv may be, for example, an icon representing a state in which the driver is not performing a driving operation and is resting, as shown in FIG. 37.

As a modification of the above-described embodiment, the presentation information adjustment unit 140 may rotate the display angle of the driver status STD so as to change the angle when the driving operation required for the driver changes. For example, the presentation information adjustment unit 140 may rotate the display angle of the driver status STD in the level 3 execution state to change the humanoid shape of the driver icon ICd into a shape as seen from behind.

In the above-described embodiment, the specific action permission state has been described mainly as a state in which the autonomous driving level 3 is permitted, but the state may be the state in which the automatic driving level 4 or higher may be permitted. Further, although the specific action prohibition state has been described as a state in which the autonomous driving level 2 is permitted, the state may be the state in which the autonomous driving level 1 may be permitted.

The HCU 100 may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The HCU 100 may be a set of computer resources linked by a computer or a data communication device. For example, some of the functions provided by the HCU 100 in the above-described embodiment may be realized by another ECU.

Next, the technical idea that can be grasped from the above-described embodiment is added below.

(Note 1)

A presentation control device that controls a presentation of information to a driver of a vehicle (A) capable of performing autonomous driving, the presentation control device includes:

a determination unit (120) that determines whether each of a plurality of types of body parts of the driver is in an interruption permission state for permitting an interruption of a driving operation or an interruption prohibition state for prohibiting the interruption of the driving operation; and a presentation control unit (140) that displays a determined state of each body part within a same display area on a specific display unit.

(Note 2)

A presentation control program that is stored in a storage medium (101) and includes instructions to be executed by a processor (102) in order to control a presentation of information to a driver of a vehicle (A) capable of executing autonomous driving, the instructions include:

a determination process (S120, S123) for determining whether each of a plurality of types of body parts of the driver is in an interruption permission state for permitting an interruption of a driving operation or an interruption prohibition state for prohibiting the interruption of the driving operation; and a presentation control process (S121, S122, S126) for displaying a determined state of each body part within a same display area on a specific display unit.

In autonomous driving, there is a possibility that the interruption of the driving operation may be permitted or the interruption of the driving operation may be prohibited for a plurality of body parts of the driver. The technique of displaying the state of a plurality of body parts to the driver in an easy-to-understand manner has not been disclosed so far.

According to the embodiments of Supplementary Note 1 and Supplementary Note 2, it is displayed in the same display area on a specific display unit whether each of the body parts is in the interruption permission state or the interruption prohibition state. Therefore, the driver can grasp the state of each of the plurality of body parts by visually recognizing the state in the same display area. Therefore, it is possible to provide a presentation control device and a presentation control program capable of displaying in an easy-to-understand manner.

(Note 3)

A presentation control device that controls a presentation of information to a driver of a vehicle (A) capable of performing autonomous driving, the presentation control device includes:

a determination unit (120) that determines an autonomous driving permission state that permits an autonomous driving and an autonomous driving prohibition state that prohibits the autonomous driving, and acquires a start instruction of the autonomous driving from the driver; and a presentation control unit (140) that displays autonomous driving permission information related to the autonomous driving permission state on a specific display unit.

The presentation control unit interrupts displaying the autonomous driving permission information when determining that the start instruction has not been acquired within an allowable time.

(Note 4)

A presentation control program that is stored in a storage medium (101) and includes instructions to be executed by a processor (102) in order to control a presentation of information to a driver of a vehicle (A) capable of executing autonomous driving, the instructions include:

a determination process (S110, S112, S113) for determining an autonomous driving permission state that permits an autonomous driving and an autonomous driving prohibition state that prohibits the autonomous driving, and acquiring a start instruction of the autonomous driving from the driver; and a presentation control process (S111, S114) for displaying autonomous driving permission information related to the autonomous driving permission state on a specific display unit.

The presentation control process includes: interrupting displaying the autonomous driving permission information when determining that the start instruction has not been acquired within an allowable time.

In recent years, it has been required to start autonomous driving based on a driver's start instruction after displaying that autonomous driving is allowable. However, when the driver did not give the instruction to start the autonomous driving, it may be continuously displayed that the autonomous driving is allowable, which may be a complicated display. Techniques for avoiding this complicated display have not been disclosed so far.

According to the embodiments of Supplementary notes 3 and 4, the display of the autonomous driving permission information is interrupted when it is determined that the autonomous driving start instruction has not been acquired within the allowable time. Therefore, it is possible to prevent the autonomous driving permission information from being continuously displayed when the driver does not give the instruction to start the autonomous driving. Therefore, it is possible to provide a presentation control device and a presentation control program that can display in an easy-to-understand manner while avoiding annoyance.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A presentation control device that controls a presentation of information to a driver of a vehicle capable of performing autonomous driving, the presentation control device comprising:

a determination unit that identifies a specific action permission state that allows the driver to perform a specific action other than a driving operation during the autonomous driving, a hand release permission state that prohibits the specific action and permits hand release from a steering wheel during the autonomous driving, and a both prohibition state that prohibits both the specific action and the hand release during the autonomous driving, determines whether a transition is allowable between each state, and determines an execution of the transition; and a presentation control unit that presents both prohibition transition allowable information indicating that the transition from the both prohibition state to the specific action permission state is allowable, both prohibition transition execution information indicating that the transition from the both prohibition state to the specific action permission state is executed, hand release transition allowable information indicating that the transition from the hand release permission state to the specific action permission state is allowable, and hand release transition execution information indicating that the transition from the hand release permission state to the specific action permission state is executed, wherein:

when transitioning from the both prohibition state to the specific action permission state, the presentation control unit presents the both prohibition transition allowable information prior to the both prohibition transition execution information; and when transitioning from the hand release permission state to the specific action permission state, the presentation control unit presents the hand release transition allowable information and the hand release transition execution information at a same time.

2. A presentation control device that controls a presentation of information to a driver of a vehicle capable of performing autonomous driving, the presentation control device comprising:
a determination unit that identifies a specific action permission state that allows the driver to perform a specific action other than a driving operation during the autonomous driving, a hand release permission state that prohibits the specific action and permits hand release from a steering wheel during the autonomous driving, a both prohibition state that prohibits both the specific action and the hand release during the autonomous driving, and an autonomous driving prohibition state that prohibits an execution of the autonomous driving, determines whether a transition is allowable between each state, and determines an execution of the transition; and
a presentation control unit that presents manual transition allowable information indicating that the transition from the autonomous driving prohibition state to the specific action permission state is allowable, manual transition execution information indicating that the transition from the autonomous driving prohibition state to the specific action permission state is executed, hand release transition allowable information indicating that the transition from the hand release permission state to the specific action permission state is allowable, and hand release transition execution information indicating that the transition from the hand release permission state to the specific action permission state is executed, wherein:
when transitioning from the autonomous driving prohibition state to the specific action permission state, the presentation control unit presents the manual transition allowable information prior to the manual transition execution information; and
when transitioning from the hand release permission state to the specific action permission state, the presentation control unit presents the hand release transition allowable information and the hand release transition execution information at a same time.

3. The presentation control device according to claim 2, wherein:
the presentation control unit further presents both prohibition transition allowable information indicating that the transition from the both prohibition state to the specific action permission state is allowable, and both prohibition transition execution information indicating that the transition from the both prohibition state to the specific action permission state is executed; and
when transitioning from the both prohibition state to the specific action permission state, the presentation control unit presents the both prohibition transition allowable information prior to the both prohibition transition execution information.

4. The presentation control device according to claim 3, wherein:
the presentation control unit presents the manual transition execution information and the both prohibition transition execution information after the driver executes an operation for permitting the transition to the specific action permission state; and
a time interval from when the driver executes the operation to when the manual transition execution information is presented is longer than a time interval from when the driver executes the operation to when the both prohibition transition execution information is presented.

5. The presentation control device according to claim 3, wherein:
the presentation control unit presents the hand release transition execution information and the both prohibition transition execution information after the driver executes an operation for permitting the transition to the specific action permission state; and
a time interval from when the driver executes the operation to when the hand release transition execution information is presented is longer than a time interval from when the driver executes the operation to when the both prohibition transition execution information is presented.

6. The presentation control device according to claim 3, wherein:
the presentation control unit presents the manual transition execution information and the hand release transition execution information after the driver executes an operation for permitting the transition to the specific action permission state; and
a time interval from when the driver executes the operation to when the manual transition execution information is presented is longer than a time interval from when the driver executes the operation to when the hand release transition execution information is presented.

7. A presentation control device that controls a presentation of information to a driver of a vehicle capable of performing autonomous driving, the presentation control device comprising:
a determination unit that determines whether it is in a state in which the driver of the vehicle is ready for a specific action permission state that permits the driver to perform a specific action other than a driving operation during an execution of autonomous driving, and the driver has executed an operation that permits a transition to the specific action permission state; and
a presentation control unit that presents transition allowable information indicating that a transition from a specific action prohibition state in which the specific action is prohibited to a specific action permission state is allowable, and transition execution information indicating that the transition from the specific action prohibition state to the specific action permission state is executed, wherein:
when determining at least one of the state not ready for the specific action permission state and the state of the driver not executing the operation, the presentation control unit presents the transition allowable information prior to the transition execution information; and
when determining that the state ready for the specific action permission state and the state of the driver executing the operation, the presentation control unit presents the transition allowable information and the transition execution information at a same time.

8. The presentation control device according to claim 7, wherein:
the determination unit identifies the specific action permission state, a hand release permission state that prohibits the specific action and permits hand release from a steering wheel during an execution of the autonomous driving, both prohibition state that prohibits the specific action and the hand release during the execution of the autonomous driving, and an autonomous driving prohibition state that prohibits the execution of the autonomous driving, determines whether a transition is allowable between each state, and determines an execution of the transition;

the presentation control unit presents the transition execution information after the driver executes an operation for permitting the transition to the specific action permission state; and a time interval from when the driver executes the operation to when the transition execution information is presented in case of transitioning from the autonomous driving prohibition state to the specific action permission state is longer than a time interval from when the driver executes the operation to when the transition execution information is presented in case of transitioning from the both prohibition state to the specific action permission state.

9. The presentation control device according to claim 8, wherein:

the determination unit identifies the specific action permission state, a hand release permission state that prohibits the specific action and permits hand release from a steering wheel during an execution of the autonomous driving, both prohibition state that prohibits the specific action and the hand release during the execution of the autonomous driving, and an autonomous driving prohibition state that prohibits the execution of the autonomous driving, determines whether a transition is allowable between each state, and determines an execution of the transition;

the presentation control unit presents the transition execution information after the driver executes an operation for permitting the transition to the specific action permission state; and a time interval from when the driver executes the operation to when the transition execution information is presented in case of transitioning from the hand release permission state to the specific action permission state is longer than a time interval from when the driver executes the operation to when the transition execution information is presented in case of transitioning from the both prohibition state to the specific action permission state.

10. The presentation control device according to claim 7, wherein:

the determination unit identifies the specific action permission state, a hand release permission state that prohibits the specific action and permits hand release from a steering wheel during an execution of the autonomous driving, both prohibition state that prohibits the specific action and the hand release during the execution of the autonomous driving, and an autonomous driving prohibition state that prohibits the execution of the autonomous driving, determines whether a transition is allowable between each state, and determines an execution of the transition;

the presentation control unit presents the transition execution information after the driver executes an operation for permitting the transition to the specific action permission state; and a time interval from when the driver executes the operation to when the transition execution information is presented in case of transitioning from the autonomous driving prohibition state to the specific action permission state is longer than a time interval from when the driver executes the operation to when the transition execution information is presented in case of transitioning from the hand release permission state to the specific action permission state.

11. The presentation control device according to claim 1, wherein:

the determination unit further determines whether each of a plurality of types of body parts of the driver is in an interruption permission state for permitting an interruption of a driving operation or an interruption prohibition state for prohibiting the interruption of the driving operation; and the presentation control unit displays a state determined for each body part within a same display area of a specific display unit.

12. The presentation control device according to claim 11, wherein:

the presentation control unit displays the state with a humanoid content.

13. The presentation control device according to claim 12, wherein:

the presentation control unit highlights a display portion of the humanoid content corresponding to a body portion transitioning between the interruption permission state and the interruption prohibition state.

14. The presentation control device according to claim 1, wherein:

the determination unit further identifies an autonomous driving permission state that permits the autonomous driving, and an autonomous driving prohibition state that prohibits the autonomous driving, and acquires a start instruction of the autonomous driving from the driver in the autonomous driving permission state;

the presentation control unit displays autonomous driving permission information related to the autonomous driving permission state on a specific display unit; and the presentation control unit interrupts displaying the autonomous driving permission information when determining that the start instruction is not acquired within an allowable time.

15. The presentation control device according to claim 14, wherein:

the presentation control unit causes the specific display unit and an other display unit different from the specific display unit to display the autonomous driving permission information; and when determining that the start instruction is not acquired within the allowable time, the presentation control unit causes the other display unit to continue displaying the autonomous driving permission information.

16. The presentation control device according to claim 15, wherein:

the presentation control unit causes a central display unit arranged in a center area in a vehicle width direction to continue displaying the autonomous driving permission information.

17. A non-transitory computer readable storage medium comprising instructions being executed by a computer, the instructions for controlling a presentation of information to a driver of a vehicle capable of executing autonomous driving, the instructions include:

a determination process for identifying a specific action permission state that allows the driver to perform a specific action other than a driving operation during the autonomous driving, a hand release permission state that prohibits the specific action and permits hand release from a steering wheel during the autonomous driving, and a both prohibition state that prohibits both the specific action and the hand release during the autonomous driving, determining whether a transition is allowable between each state, and determining an execution of the transition; and a presentation control process for presenting both prohibition transition allowable information indicating that the transition from the both prohibition state to the specific action permission state is allowable, both prohibition transition execution information indicating that the transition from the both prohibition state to the specific action permission state is executed, hand release transition allowable information indicating that the transition from the hand release permission state to the specific action permission state is allowable, and hand release transition execution information indicating that the transition from the hand release permission state to the specific action permission state is executed, wherein:

when transitioning from the both prohibition state to the specific action permission state, the presentation control process includes presenting the both prohibition transition allowable information prior to the both prohibition transition execution information; and when transitioning from the hand release permission state to the specific action permission state, the presentation control process includes presenting the hand release transition allowable information and the hand release transition execution information at a same time.

18. A non-transitory computer readable storage medium comprising instructions being executed by a computer, the instructions for controlling a presentation of information to a driver of a vehicle capable of executing autonomous driving, the instructions include:
a determination process for identifying a specific action permission state that allows the driver to perform a specific action other than a driving operation during the autonomous driving, a hand release permission state that prohibits the specific action and permits hand release from a steering wheel during the autonomous driving, a both prohibition state that prohibits both the specific action and the hand release during the autonomous driving, and an autonomous driving prohibition state that prohibits an execution of the autonomous driving, determining whether a transition is allowable between each state, and determining an execution of the transition; and a presentation control process for presenting manual transition allowable information indicating that the transition from the autonomous driving prohibition state to the specific action permission state is allowable, manual transition execution information indicating that the transition from the autonomous driving prohibition state to the specific action permission state is executed, hand release transition allowable information indicating that the transition from the hand release permission state to the specific action permission state is allowable, and hand release transition execution information indicating that the transition from the hand release permission state to the specific action permission state is executed, wherein:

when transitioning from the autonomous driving prohibition state to the specific action permission state, the presentation control process includes presenting the manual transition allowable information prior to the manual transition execution information; and when transitioning from the hand release permission state to the specific action permission state, the presentation control process includes presenting the hand release transition allowable information and the hand release transition execution information at a same time.

19. A non-transitory computer readable storage medium comprising instructions being executed by a computer, the instructions for controlling a presentation of information to a driver of a vehicle capable of executing autonomous driving, the instructions include:
a determination process for determining whether it is in a state in which the driver of the vehicle is ready for a specific action permission state that permits the driver to perform a specific action other than a driving operation during an execution of autonomous driving, and the driver has executed an operation that permits a transition to the specific action permission state; and a presentation control process for presenting a transition allowable information indicating that a transition from a specific action prohibition state in which the specific action is prohibited to the specific action permission state is allowable, and a transition execution information indicating that the transition from the specific action prohibition state to the specific action permission state is executed, wherein:

when determining at least one of the state not ready for the specific action permission state and the state of the driver not executing the operation, the presentation control process includes presenting the transition allowable information prior to the transition execution information; and when determining that the state ready for the specific action permission state and the state of the driver executing the operation, the presentation control process includes presenting the transition allowable information and the transition execution information at a same time.

20. A presentation control device that controls a presentation of information to a driver of a vehicle capable of performing autonomous driving, the presentation control device comprising:

a determination unit that identifies a specific action permission state that allows the driver to perform a specific action other than a driving operation during the autonomous driving, a hand release permission state that prohibits the specific action and permits hand release from a steering wheel during the autonomous driving, and a both prohibition state that prohibits both the specific action and the hand release during the autonomous driving, determines whether a transition is allowable between each state, and determines an execution of the transition; and a presentation control unit that presents both prohibition transition allowable information indicating that the transition from the both prohibition state to the specific action permission state is allowable, both prohibition transition execution information indicating that the transition from the both prohibition state to the specific action permission state is executed, hand release transition allowable information indicating that the transition from the hand release permission state to the specific action permission state is allowable, and hand release transition execution information indicating that the transition from the hand release permission state to the specific action permission state is executed, wherein:

when transitioning from the both prohibition state to the specific action permission state, the presentation control unit presents the both prohibition transition allowable information prior to the both prohibition transition execution information;

the presentation control unit presents the both prohibition transition execution information after receiving a start instruction of the autonomous driving from the driver in the specific action permission state; and when transitioning from the hand release permission state to the specific action permission state, the presentation control unit presents the hand release transition execution information without receiving the start instruction from the driver.

21. The presentation control device according to claim 20, wherein:

a time interval from when a transition to the specific action permission state is allowable to when the hand release transition execution information is presented is shorter than a time interval from when a transition to the specific action permission state is allowable to when the both prohibition transition execution information is presented.

22. A non-transitory computer readable storage medium comprising instructions being executed by a computer, the instructions for controlling a presentation of information to a driver of a vehicle capable of executing autonomous driving, the instructions include:

a determination process for identifying a specific action permission state that allows the driver to perform a specific action other than a driving operation during the autonomous driving, a hand release permission state that prohibits the specific action and permits hand release from a steering wheel during the autonomous driving, and a both prohibition state that prohibits both the specific action and the hand release during the autonomous driving, determining whether a transition is allowable between each state, and determining an execution of the transition; and a presentation control process for presenting both prohibition transition allowable information indicating that the transition from the both prohibition state to the specific action permission state is allowable, both prohibition transition execution information indicating that the transition from the both prohibition state to the specific action permission state is executed, hand release transition allowable information indicating that the transition from the hand release permission state to the specific action permission state is allowable, and hand release transition execution information indicating that the transition from the hand release permission state to the specific action permission state is executed, wherein:

when transitioning from the both prohibition state to the specific action permission state, the presentation control process includes presenting the both prohibition transition allowable information prior to the both prohibition transition execution information;

the presentation control process includes: presenting the both prohibition transition execution information after receiving a start instruction of the autonomous driving from the driver in the specific action permission state; and when transitioning from the hand release permission state to the specific action permission state, the presentation control process includes: presenting the hand release transition execution information without receiving the start instruction from the driver.

23. The presentation control device according to claim 1, further comprising:

one or more processors; and a memory coupled to the one or more processors and storing program instructions that when executed by the one or more processors cause the one or more processors to provide at least: the determination unit; and the presentation control unit.

24. The presentation control device according to claim 2, further comprising:

one or more processors; and a memory coupled to the one or more processors and storing program instructions that when executed by the one or more processors cause the one or more processors to provide at least: the determination unit; and the presentation control unit.

25. The presentation control device according to claim 7, further comprising:

one or more processors; and a memory coupled to the one or more processors and storing program instructions that when executed by the one or more processors cause the one or more processors to provide at least: the determination unit; and the presentation control unit.

26. The presentation control device according to claim 20, further comprising:

one or more processors; and a memory coupled to the one or more processors and storing program instructions that when executed by the one or more processors cause the one or more processors to provide at least: the determination unit; and the presentation control unit.

* * * * *